(12) United States Patent
Noguchi et al.

(10) Patent No.: US 9,916,034 B2
(45) Date of Patent: *Mar. 13, 2018

(54) DISPLAY DEVICE WITH TOUCH DETECTION FUNCTION AND ELECTRONIC APPARATUS

(71) Applicant: Japan Display Inc., Tokyo (JP)

(72) Inventors: Koji Noguchi, Tokyo (JP); Hidetoshi Komatsu, Tokyo (JP); Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,809

(22) Filed: Feb. 2, 2017

(65) Prior Publication Data

US 2017/0147136 A1   May 25, 2017

Related U.S. Application Data

(63) Continuation of application No. 14/298,527, filed on Jun. 6, 2014, now Pat. No. 9,600,110.

(30) Foreign Application Priority Data

Jun. 11, 2013   (JP) ................................. 2013-123208

(51) Int. Cl.
*G06F 3/041*   (2006.01)
*G02F 1/1333*   (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS

2008/0024480 A1*  1/2008  Jee ........................ G06F 1/3203
                                                    345/212
2010/0214262 A1   8/2010  Ishizaki et al.
(Continued)

FOREIGN PATENT DOCUMENTS

| CN | 101814256 | 8/2010 |
| CN | 102402312 | 4/2012 |
| JP | 2011-044004 | 3/2011 |

OTHER PUBLICATIONS

Chinese Office Action dated Sep. 1, 2016 in corresponding Chinese Application No. 201410253990.x.

*Primary Examiner* — Jennifer Mehmood
*Assistant Examiner* — Krishna Neupane
(74) *Attorney, Agent, or Firm* — K&L Gates LLP

(57) ABSTRACT

A display device with a touch detection function includes a control device that performs, in normal operation mode, image display control so as to exhibit an image display function of a display function layer based on an image signal and performs touch detection control; a touch detecting unit that detects, in the normal operation mode, a position of an object in proximity to or in contact with the touch detection electrode based on a detection signal transmitted from the touch detection electrode; and a touch-detection controller that detects, in sleep mode, the proximity of the object to or the contact thereof with the touch detection electrode. When the touch-detection controller detects the proximity of the object to or the contact thereof with the touch detection electrode in the sleep mode, the control device controls a (Continued)

pixel electrode to a predetermined potential, and thereafter supplies a touch drive signal to a drive electrode.

10 Claims, 53 Drawing Sheets

(51) Int. Cl.
    *G02F 1/1362*    (2006.01)
    *G02F 1/1368*    (2006.01)
    *G06F 1/32*      (2006.01)
    *G06F 3/044*     (2006.01)
    *G09G 3/36*      (2006.01)

(52) U.S. Cl.
    CPC ...... *G02F 1/136286* (2013.01); *G06F 1/3231* (2013.01); *G06F 1/3262* (2013.01); *G06F 1/3265* (2013.01); *G06F 3/044* (2013.01); *G06F 3/0412* (2013.01); *G09G 3/3648* (2013.01); *G09G 3/3674* (2013.01); *G09G 3/3685* (2013.01); *G06F 2203/04108* (2013.01); *G09G 2300/0426* (2013.01); *G09G 2310/0291* (2013.01); *G09G 2310/0297* (2013.01); *G09G 2330/021* (2013.01); *G09G 2330/022* (2013.01); *G09G 2354/00* (2013.01); *G09G 2370/08* (2013.01); *Y02B 60/1242* (2013.01); *Y02B 60/1289* (2013.01); *Y02B 60/32* (2013.01)

(56) References Cited

U.S. PATENT DOCUMENTS

| | | | |
|---|---|---|---|
| 2011/0267293 A1* | 11/2011 | Noguchi | G06F 3/0416 345/173 |
| 2012/0062460 A1 | 3/2012 | Toyota et al. | |
| 2013/0293507 A1 | 11/2013 | Singh | |
| 2014/0043247 A1* | 2/2014 | Singh | G06F 1/3218 345/173 |
| 2014/0164806 A1* | 6/2014 | Mizuno | G06F 1/3265 713/323 |

\* cited by examiner

FIG.37
(A)
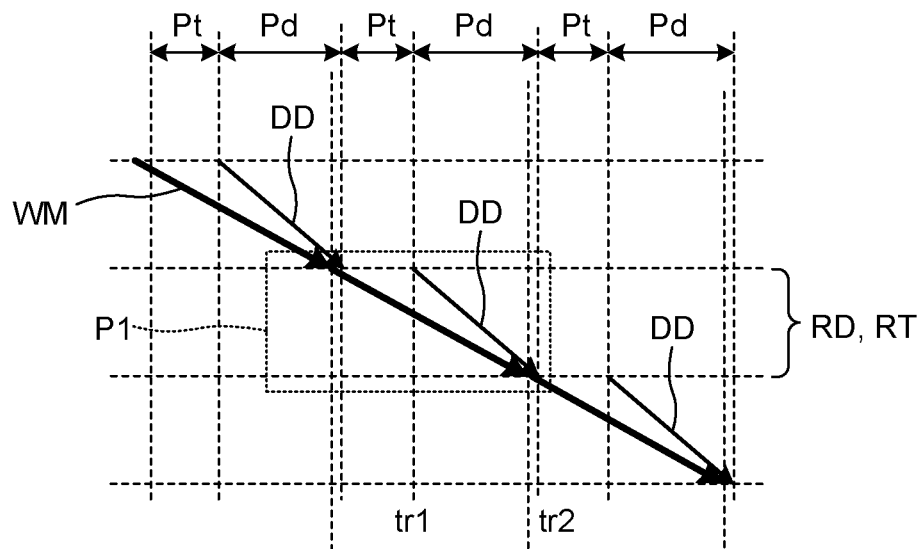
(B)
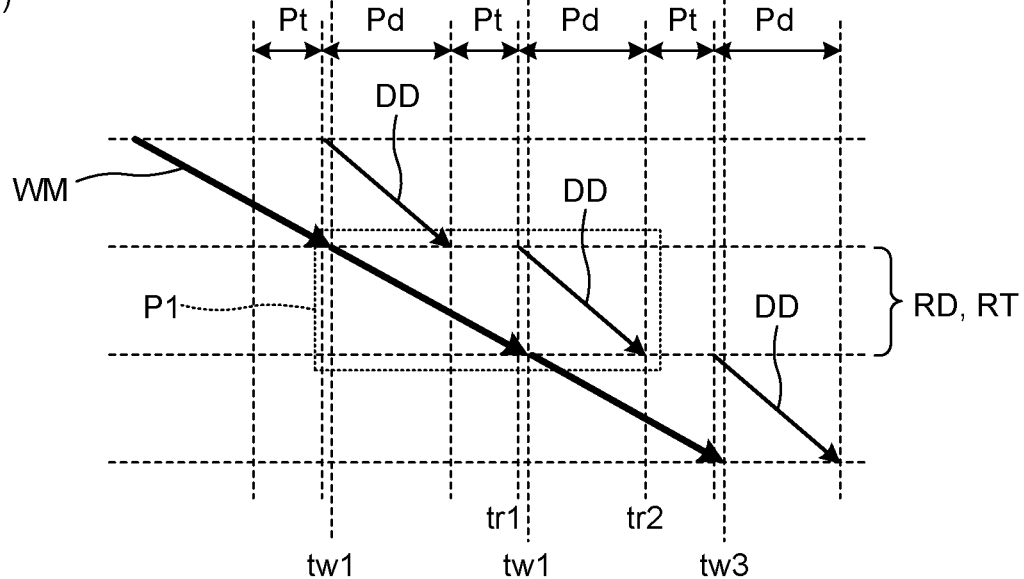

} COML

} COML

DISPLAY DEVICE WITH TOUCH DETECTION FUNCTION AND ELECTRONIC APPARATUS

CROSS REFERENCES TO RELATED APPLICATIONS

The present application is a continuation of U.S. patent application Ser. No. 14/298,527, filed on Jun. 6, 2014, which application claims priority to Japanese Priority Patent Application JP 2013-123208 filed in the Japan Patent Office on Jun. 11, 2013, the entire content of which is hereby incorporated by reference.

BACKGROUND

1. Technical Field

The present disclosure relates to a display device with a touch detection function and an electronic apparatus that are capable of detecting an external proximity object.

2. Description of the Related Art

In recent years, attention is paid to a touch detection device, which is referred to as a so-called touch panel, capable of detecting an external proximity object. The touch panel is used for a display device with a touch detection function in which it is mounted on the display device such as a liquid crystal display device (so-called on-cell type) or is integrated with the display device (so-called in-cell type). The display device with a touch detection function displays various button images and the like on the display device, and this allows information input using the touch panel instead of normal mechanical buttons. The use of the display device with a touch detection function having such a touch panel tends to increase in portable information devices such as mobile phones and tablets as well as computers because an input device such as a keyboard, a mouse, or a keypad is not required.

The display device with a touch detection function used in electronic apparatuses such as mobile phones and tablets preferably has a normal operation mode for performing image display and touch detection and a sleep mode for stopping image display and suspending operation of units when no operation is input for a given time in order to reduce power consumption.

For example, Japanese Patent Application Laid-open Publication No. 2011-44004 (JP-A-2011-44004) describes a capacitive touch panel. When an input-operation position detecting unit that operates in a normal mode detects no input operation for a predetermined period, the touch panel shifts to a sleep mode in which the operation of the input-operation position detecting unit is suspended and a plurality of capacity-time convertors and an input determination unit are intermittently operated. When the input determination unit that intermittently operates in the sleep mode determines that there is an input operation, the touch panel shifts to the normal mode in which the input-operation position detecting unit operates.

The capacitive touch panel described in JP-A-2011-44004 mounted on a display constitutes an on-cell type display device with a touch detection function in a manner mounted on a display, but does not constitute an in-cell type display device with a touch detection function.

The in-cell type display device with a touch detection function has a problem specific to the in-cell type such that burn-in may occur on a display screen when shifting from the sleep mode to the normal operation mode, and it is therefore preferred to suppress the burn-in.

For the capacitive touch panel described in JP-A-2011-44004, the problem specific to the in-cell type such that burn-in may occur on the display screen is not considered because the capacitive touch panel described therein constitutes the on-cell type display device with a touch detection function but does not constitute the in-cell type display device with a touch detection function.

The present disclosure has been made to solve the problems, and it is an object of the present disclosure to provide a display device with a touch detection function and an electronic apparatus that are capable of preventing burn-in occurring on a display screen.

SUMMARY

A display device with a touch detection function according to the present disclosure has a normal operation mode for performing image display and touch detection and a sleep mode for performing touch detection without performing the image display. The display device with a touch detection function includes: a display area in which a plurality of pixel electrodes are arranged in a matrix on a substrate; a drive electrode that is arranged opposite to the pixel electrodes and is divided into a plurality of portions; a touch detection electrode that is arranged opposite to the drive electrode and forms a capacitance with the drive electrode; a display function layer that has an image display function for displaying an image in the display area; a control device that performs image display control, in the normal operation mode, so as to apply a display drive voltage between the pixel electrode and the drive electrode based on an image signal to exhibit the image display function of the display function layer, and performs touch detection control so as to supply a touch drive signal to the drive electrode; a touch detecting unit that detects, in the normal operation mode, a position of an object in proximity to or in contact with the touch detection electrode based on a detection signal transmitted from the touch detection electrode; and a touch-detection controller that detects, in the sleep mode, the proximity of the object to or the contact thereof with the touch detection electrode. When the touch-detection controller detects the proximity of the object to or the contact thereof with the touch detection electrode in the sleep mode, the control device controls the pixel electrode to a predetermined potential, and thereafter supplies the touch drive signal to the drive electrode.

An electronic apparatus according to the present disclosure is provided with the display device with a touch detection function, and corresponds to, for example, television devices, digital cameras, personal computers, video cameras, or portable electronic apparatuses such as mobile phones.

Additional features and advantages are described herein, and will be apparent from the following Detailed Description and the figures.

BRIEF DESCRIPTION OF THE FIGURES

FIG. 37 is another timing chart of the memory write and the memory read in the display device with a touch detection function;

DETAILED DESCRIPTION

Exemplary embodiments of the present disclosure will be explained in detail below with reference to the accompanying drawings. The present disclosure is not limited by the contents described in the following embodiments. In addition, the components described as follows include those which can be easily conceived by persons skilled in the art and those which are substantially equivalent. Moreover, the components described as follows can be arbitrarily combined with each other. The explanation is performed in the following order.

Figure 1:
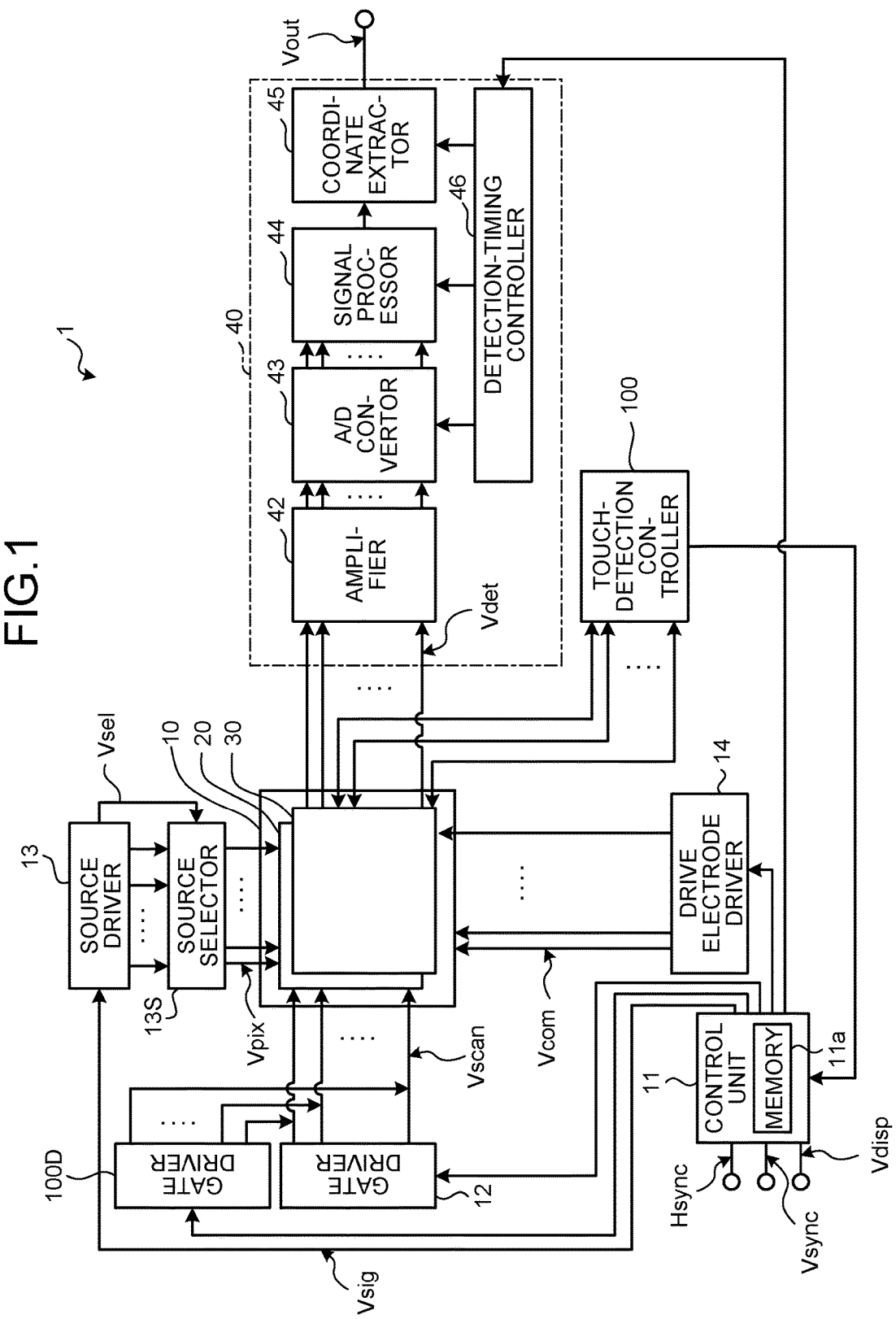
FIG. 1 is a block diagram of a configuration example of a display device with a touch detection function according to a first embodiment.

1. Embodiments (Display Device with Touch Detection Function)
 1-1. First Embodiment
 1-2. Second Embodiment
 1-3. Third Embodiment
 1-4. Fourth Embodiment
 1-5. Fifth Embodiment
 1-6. Sixth Embodiment
2. Application Examples (Electronic Apparatuses)
 Examples of applying the display device with a touch detection function according to the embodiments to electronic apparatuses.
3. Configuration of Present Disclosure 1-1. First Embodiment Configuration Example Entire Configuration Example FIG. 1 is a block diagram of a configuration example of a display device with a touch detection function according to a first embodiment. A display device with a touch detection function 1 includes a display unit with a touch detection function 10, a control unit 11, a gate driver 12, a source driver 13, a source selector 13S, a drive electrode driver 14, a touch detection unit 40, a touch-detection controller 100, and a gate driver 100D. The display device with a touch detection function 1 is a display device in which the display unit with a touch detection function 10 has a built-in touch detection function. The display unit with a touch detection function 10 is a so-called in-cell type device in which a liquid crystal display unit 20 using a liquid crystal display element as a display element and a capacitive-type touch detecting unit 30 are integrated. The display unit with a touch detection function 10 may be a so-called on-cell type device in which the capacitive-type touch detecting unit 30 is mounted on the liquid crystal display unit 20 using the liquid crystal display element as a display element.

Characteristics

The display device with a touch detection function 1 has a normal operation mode for performing image display and touch detection and a sleep mode for performing touch detection without performing the image display. When no touch operation is detected for a given period in the normal operation mode, the display device with a touch detection function 1 shifts to the sleep mode. When a predetermined gesture is detected in the sleep mode, the display device with a touch detection function 1 shifts to the normal operation mode.

The display device with a touch detection function 1 is configured so that, in the normal operation mode, the control unit 11, the gate driver 12, the source driver 13, the source selector 13S, the drive electrode driver 14, and the touch detection unit 40 mainly operate. In the normal operation mode, an application processor (host CPU, not illustrated) for executing an operating system program or the like to control an entire electronic apparatus and a backlight (not illustrated) for irradiating light from the back of the display device with a touch detection function 1 also operate. Meanwhile, the display device with a touch detection function 1 is configured so that, in the sleep mode, the control unit 11, the source driver 13, the source selector 13S, the drive electrode driver 14, the touch detection unit 40, the touch-detection controller 100, and the gate driver 100D mainly operate. In the sleep mode, the application processor, the backlight, and the like do not operate. This enables the electronic apparatus to reduce power consumption.

In the normal operation mode, the display device with a touch detection function 1 detects a touch operation using mutual capacitance method between a drive electrode COML explained later and a touch detection electrode TDL explained later. In the sleep mode, the display device with a touch detection function 1 detects presence or absence of touch detection using self-capacitance method of the touch detection electrode TDL. When the presence of a touch is detected, the display device with a touch detection function 1 detects touch coordinates and a gesture using the mutual capacitance method between the drive electrode COML and the touch detection electrode TDL, and shifts to the normal operation mode when a predetermined gesture is detected.

The display device with a touch detection function 1 also includes the gate driver 12 that operates in the normal operation mode and the gate driver 100D that operates in the sleep mode. The display device with a touch detection function 1 is constantly supplied with a predetermined power supply voltage (hereinafter, Vcc) from a battery (not illustrated), a main substrate (not illustrated) of the electronic apparatus, or the like. In the normal operation mode, the display device with a touch detection function 1 causes the gate driver 12 to operate at a power supply voltage (hereinafter, Vdd) at which the power supply voltage Vcc is boosted by a booster circuit explained later in order to cause a liquid crystal display element in the liquid crystal display unit 20 to operate at a high speed and perform fast image display. In other words, the gate driver 12 is a circuit that operates at the power supply voltage Vdd. In the sleep mode, on the other hand, the display device with a touch detection function 1 suspends the booster circuit in order to reduce power consumption and operates the gate driver 100D at the power supply voltage Vcc. In other words, the gate driver 100D is a circuit that operates at the power supply voltage Vcc.

Overview of Units

The display unit with a touch detection function 10 is a display device having a built-in touch detection function. The display unit with a touch detection function 10 includes the liquid crystal display unit 20 and the touch detecting unit 30. The liquid crystal display unit 20 is a device that sequentially scans and displays horizontal lines one by one according to a scan signal Vscan supplied from the gate driver 12, as explained later. At this time, the liquid crystal display unit 20 is configured to sequentially scan horizontal lines one by one and display the horizontal line in each partial display region RD obtained by vertically dividing a display screen into 10 equal parts. The touch detecting unit 30 operates based on a basic principle of capacitive touch detection explained later and outputs a touch detection signal Vdet. The touch detecting unit 30 is configured to perform sequential scan according to a drive signal VcomAC supplied from the drive electrode driver 14 and perform touch detection as explained later.

The control unit 11 is a circuit that supplies a control signal to the gate driver 12, the source driver 13, the drive electrode driver 14, and the touch detection unit 40 based on an externally supplied video signal Vdisp to control so that these units operate in synchronization with one another. The control device according to the present disclosure includes the control unit 11, the gate driver 12, the source driver 13, and the drive electrode driver 14.

The control unit 11 has a memory 11a that temporarily stores therein video information of the video signal Vdisp. A storage capacity of the memory 11a corresponds to a data amount of one-tenth of video information for one frame in this example. In other words, for example, when a vertical display resolution is 1280 pixels, the memory 11a is configured to store video information for 128 lines.

The memory 11a writes the video information for the video signal Vdisp supplied from a host device in synchronization with a vertical synchronization signal Vsync and a horizontal synchronization signal Hsync which are also supplied from the host device. The memory 11a is configured to read the stored video information in synchronization with an internal clock of the display device with a touch detection function 1 at a speed higher than that of the write. Specifically, the memory 11a sequentially writes data of one-tenth of the video information for one frame by each one horizontal line, and then sequentially writes next one-tenth data by each one horizontal line in the above manner while overwriting the previous one-tenth data. The memory 11a sequentially reads the written data by each one horizontal line at a speed higher than that of the write before the data is erased by being overwritten. The display device with a touch detection function 1 performs a display based on the read data for each partial display region RD obtained by vertically dividing the display screen into 10 equal parts, as explained later.

The gate driver 12 has a function of sequentially selecting one horizontal line targeted for display drive of the display unit with a touch detection function 10, based on the control signal supplied from the control unit 11. Specifically, the gate driver 12 applies the scan signal Vscan to gates of TFT elements Tr in pixels Pix via a scan signal line GCL, as explained later, to thereby sequentially select one line (one horizontal line), as a target for display drive, from among the pixels Pix formed in a matrix on the liquid crystal display unit 20 of the display unit with a touch detection function 10.

The source driver 13 is a circuit that supplies a pixel signal Vpix to each pixel Pix (sub-pixels SPix), explained later, of the display unit with a touch detection function 10 based on the control signal supplied from the control unit 11. As explained later, the source driver 13 generates a pixel signal, in which the pixel signals Vpix of a plurality of sub-pixels SPix in the liquid crystal display unit 20 are time-division multiplexed, from the video signal Vdisp for one horizontal line, and supplies the generated pixel signal to the source selector 13S. The source driver 13 also generates a switch control signal Vsel required to separate the pixel signals Vpix multiplexed on an image signal Vsig therefrom, and supplies the generated signal with the pixel signal Vpix to the source selector 13S. The source selector 13S enables reduction in the number of wirings between the source driver 13 and the control unit 11.

The drive electrode driver 14 is a circuit that supplies the touch drive signal detection (touch drive signal; hereinafter, "drive signal") VcomAC and a display drive voltage VcomDC being a voltage for display to a drive electrode COML, explained later, of the display unit with a touch detection function 10 based on the control signal supplied from the control unit 11. Specifically, the drive electrode driver 14 applies the display drive voltage VcomDC to the drive electrode COML in a display period Pd, as explained later. In a touch detection period Pt, the drive electrode driver 14 applies the drive signal VcomAC to the drive electrode COML targeted for touch detection operation, and applies the display drive voltage VcomDC to any other drive electrodes COML, as explained later. At this time, the drive electrode driver 14 drives the drive electrodes COML for each block (partial detection region RT, explained later) that includes a predetermined number of drive electrodes COML. Furthermore, the drive electrode driver 14 is configured so as to enable change the frequency of the drive signal VcomAC, as explained later.

The touch detection unit 40 is a circuit that detects the presence or absence of a touch (the contact state) performed on the touch detecting unit 30 based on the control signal supplied from the control unit 11 and the touch detection signal Vdet supplied from the touch detecting unit 30 of the display unit with a touch detection function 10, and that calculates coordinates and the like of the touch in a touch detection area when the presence of a touch is detected. The touch detection unit 40 includes a touch-detection-signal amplification unit (hereinafter, an amplifier) 42, an analog-to-digital (A/D) convertor 43, a signal processor 44, a coordinate extractor 45, a detection-timing controller 46.

The amplifier 42 amplifies the touch detection signal Vdet supplied from the touch detecting unit 30. The amplifier 42 may include a low-pass analog filter that removes a high frequency component (noise component) contained in the touch detection signal Vdet, extracts touch components, and outputs the touch components.

The touch-detection controller 100 operates in the sleep mode, and first detects the presence or absence of a touch (the contact state) performed on the touch detecting unit 30 of the display unit with a touch detection function 10 using the self-capacitance method. When the presence of a touch is detected, the touch-detection controller 100 causes the control unit 11 to drive the gate driver 100D, and detects touch coordinates and a gesture using the mutual capacitance method. The gate driver 100D has a function of sequentially selecting one horizontal line targeted for drive of the display unit with a touch detection function 10 based on the control signal supplied from the control unit 11. The touch-detection controller 100 detects touch coordinates and a gesture or so in the touch detection area of the touch detecting unit 30 based on the touch detection signal Vdet supplied from the touch detecting unit 30 in the display unit with a touch detection function 10. When a predetermined gesture is detected, then the touch-detection controller 100 causes the display device with a touch detection function 1 to shift to the normal operation mode.

Basic Principle of Mutual Capacitance Type Touch Detection

Figure 2:
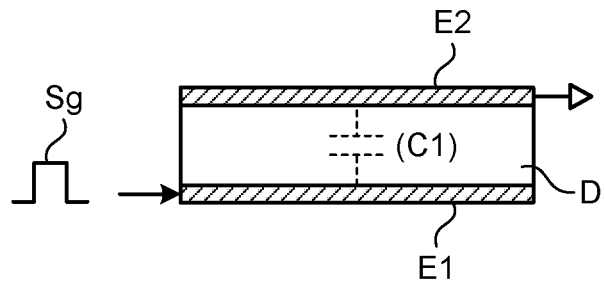
FIG. 2 is an explanatory diagram for explaining a basic principle of a mutual capacitance type touch detection method and illustrating a state where a finger is not in contact with or in proximity to the device.
Figure 3:
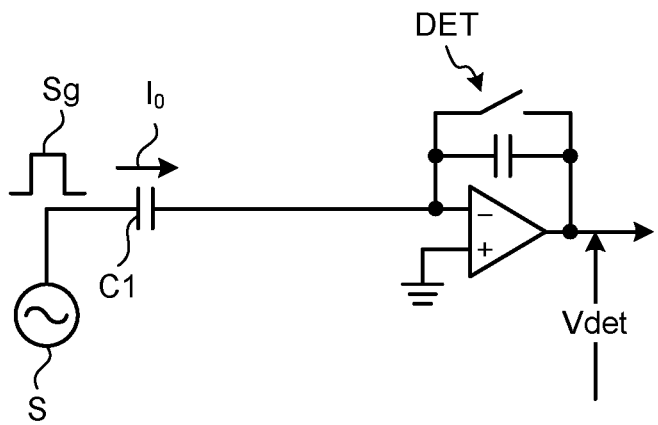
FIG. 3 is an explanatory diagram illustrating an example of an equivalent circuit in a state where a finger is not in contact with or in proximity to the device as illustrated in FIG. 2.
Figure 4:
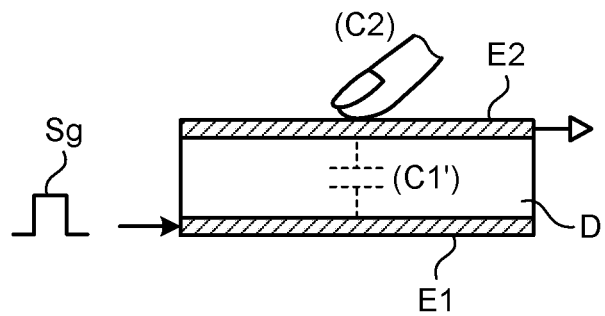
FIG. 4 is an explanatory diagram for explaining the basic principle of the mutual capacitance type touch detection method and illustrating a state where a finger is in contact with or in proximity to the device.
Figure 5:
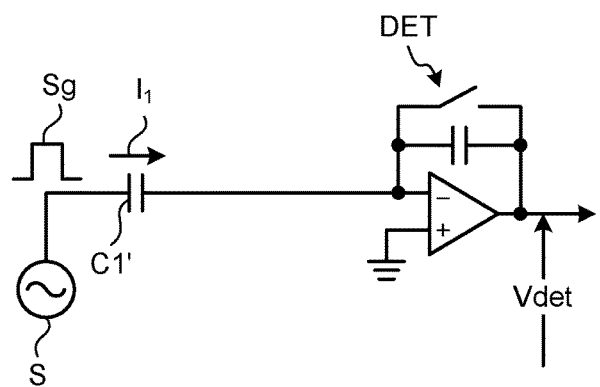
FIG. 5 is an explanatory diagram illustrating an example of the equivalent circuit in a state where a finger is in contact with or in proximity to the device as illustrated in FIG. 4.
Figure 6:
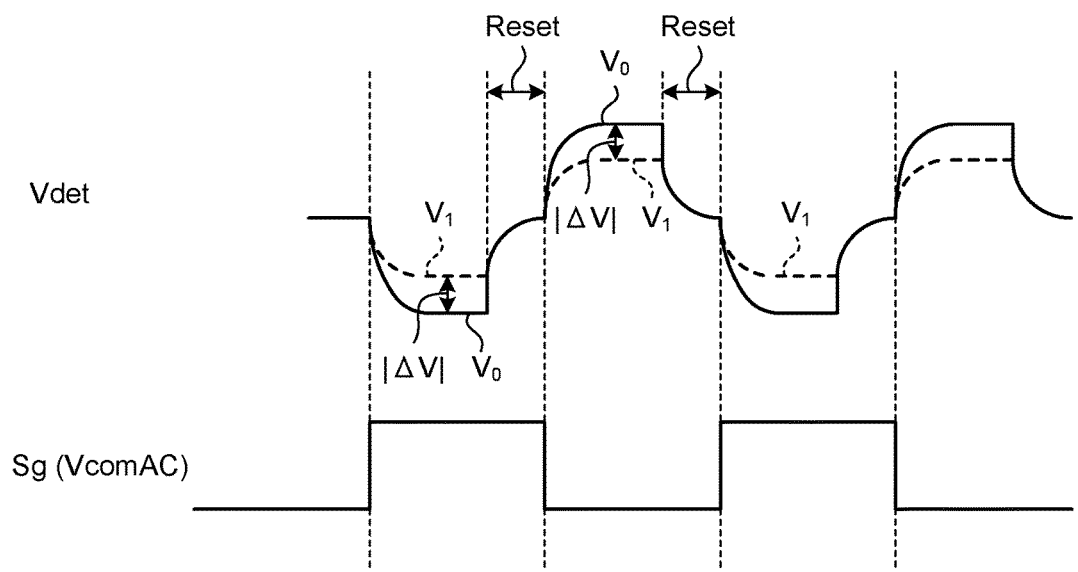
FIG. 6 is a diagram of examples of waveforms of a drive signal and a touch detection signal.

The touch detecting unit 30 operates based on the basic principle of mutual capacitance type touch detection, and outputs a touch detection signal Vdet. The basic principle of the mutual capacitance type touch detection in the display device with a touch detection function 1 according to the present embodiment will be explained below with reference to FIG. 1 to FIG. 6. FIG. 2 is an explanatory diagram for explaining the basic principle of the mutual capacitance type touch detection and illustrating a state where a finger is not in contact with or in proximity to the device. FIG. 3 is an explanatory diagram illustrating an example of an equivalent circuit in a state where a finger is not in contact with or in proximity to the device as illustrated in FIG. 2. FIG. 4 is an explanatory diagram for explaining the basic principle of the mutual capacitance type touch detection method and illustrating a state where a finger is in contact with or in proximity to the device. FIG. 5 is an explanatory diagram illustrating an example of the equivalent circuit in a state where a finger is in contact with or in proximity to the device as illustrated in FIG. 4. FIG. 6 is a diagram of examples of waveforms of a drive signal and a touch detection signal.

For example, as illustrated in FIG. 2, a capacitive element C1 includes a pair of electrodes, a drive electrode E1 and a touch detection electrode E2, which are arranged opposite to each other across a dielectric body D. As illustrated in FIG. 3, the capacitive element C1 is coupled at one end to an alternating-current (AC) signal source (drive signal source) S and is coupled at the other end to a voltage detector (touch detecting unit) DET. The voltage detector DET is an integration circuit included in, for example, the amplifier 42 illustrated in FIG. 1.

When an AC square wave Sg of a predetermined frequency (e.g., about several kHz to several hundreds of kHz) is applied from the AC signal source S to the drive electrode E1 (one end of the capacitive element C1), an output waveform (touch detection signal Vdet) appears via the voltage detector DET coupled to the touch detection electrode E2 (the other end of the capacitive element C1). The AC square wave Sg corresponds to the drive signal VcomAC explained later.

In a state (non-contact state) where a finger is not in contact (or in proximity), as illustrated in FIG. 2 and FIG. 3, a current $I_0$ according to a capacitance of the capacitive element C1 flows in the capacitive element C1 in association with charge and discharge thereof. The voltage detector DET illustrated in FIG. 5 converts the fluctuation of the current $I_0$ according to the AC square wave Sg into the fluctuation of a voltage (waveform $V_0$ indicated by solid line).

Meanwhile, in a state (contact state) where a finger is in contact (or in proximity), as illustrated in FIG. 4, a capacitance C2 formed by the finger is in contact with or in proximity to the touch detection electrode E2, and a capacitance for a fringe between the drive electrode E1 and the touch detection electrode E2 is thereby blocked to act as a capacitive element C1' with a capacitance smaller than that of the capacitive element C1. It is understood from the equivalent circuit illustrated in FIG. 5 that a current $I_1$ flows in the capacitive element C1'. As illustrated in FIG. 6, the voltage detector DET converts the fluctuation of the current $I_1$ according to the AC square wave Sg into the fluctuation of a voltage (waveform $V_1$ indicated by dotted line). In this case, the amplitude of the waveform $V_1$ becomes lower as compared with that of the waveform $V_0$. Thereby, an absolute value |ΔV| of a voltage difference between the waveform $V_0$ and the waveform $V_1$ changes according to the influence of an object approaching from the outside such as a finger. To accurately detect the absolute value |ΔV| of the voltage difference between the waveform $V_0$ and the waveform $V_1$, it is more preferable that the voltage detector DET operates by providing periods Reset in which charge and discharge of the capacitor are reset in synchronization with the frequency of the AC square wave Sg through switching in the circuit.

The touch detecting unit 30 illustrated in FIG. 1 is configured to sequentially scan detection blocks one by one and perform touch detection according to the drive signal Vcom (drive signal VcomAC, explained later) supplied from the drive electrode driver 14.

The touch detecting unit 30 is configured to output the touch detection signals Vdet for each detection block from a plurality of touch detection electrodes TDL, explained later, via the voltage detector DET illustrated in FIG. 3 or FIG. 5 to be supplied to the A/D convertor 43 of the touch detection unit 40.

The A/D convertor 43 is a circuit that samples each analog signal output from the amplifier 42 at a timing synchronized with the drive signal VcomAC and converts the sampled signal into a digital signal.

The signal processor 44 includes a digital filter that reduces any frequency component (noise component), included in the output signal of the A/D convertor 43, other than the frequency at which the drive signal VcomAC is sampled. The signal processor 44 is a logic circuit that detects the presence or absence of a touch performed on the touch detecting unit 30 based on the output signal of the A/D convertor 43. The signal processor 44 performs a process of extracting only a signal for a difference caused by the finger. The signal for the difference caused by the finger is the absolute value |ΔV| of the difference between the waveform $V_0$ and the waveform $V_1$. The signal processor 44 may perform operation of averaging absolute values |ΔV| per one detection block to calculate an average value of the absolute values |ΔV|. This enables the signal processor 44 to reduce the influence caused by the noise. The signal processor 44 compares the detected signal for the difference caused by the finger with a predetermined threshold voltage, and determines, if the detected signal is less than the threshold voltage, that the external proximity object is in the non-contact state. Meanwhile, the signal processor 44 compares the detected digital voltage with the predetermined threshold voltage, and determines, if it is the threshold voltage or more, that the external proximity object is in the contact state. In this way, the touch detection unit 40 becomes capable of performing touch detection.

The coordinate extractor 45 is a logic circuit that calculates, when the signal processor 44 detects a touch, touch panel coordinates of the touch. The detection-timing controller 46 controls so that the A/D convertor 43, the signal processor 44, and the coordinate extractor 45 operate in synchronization with one another. The coordinate extractor 45 outputs the touch panel coordinates as a signal output Vout.

Module

Figure 7:
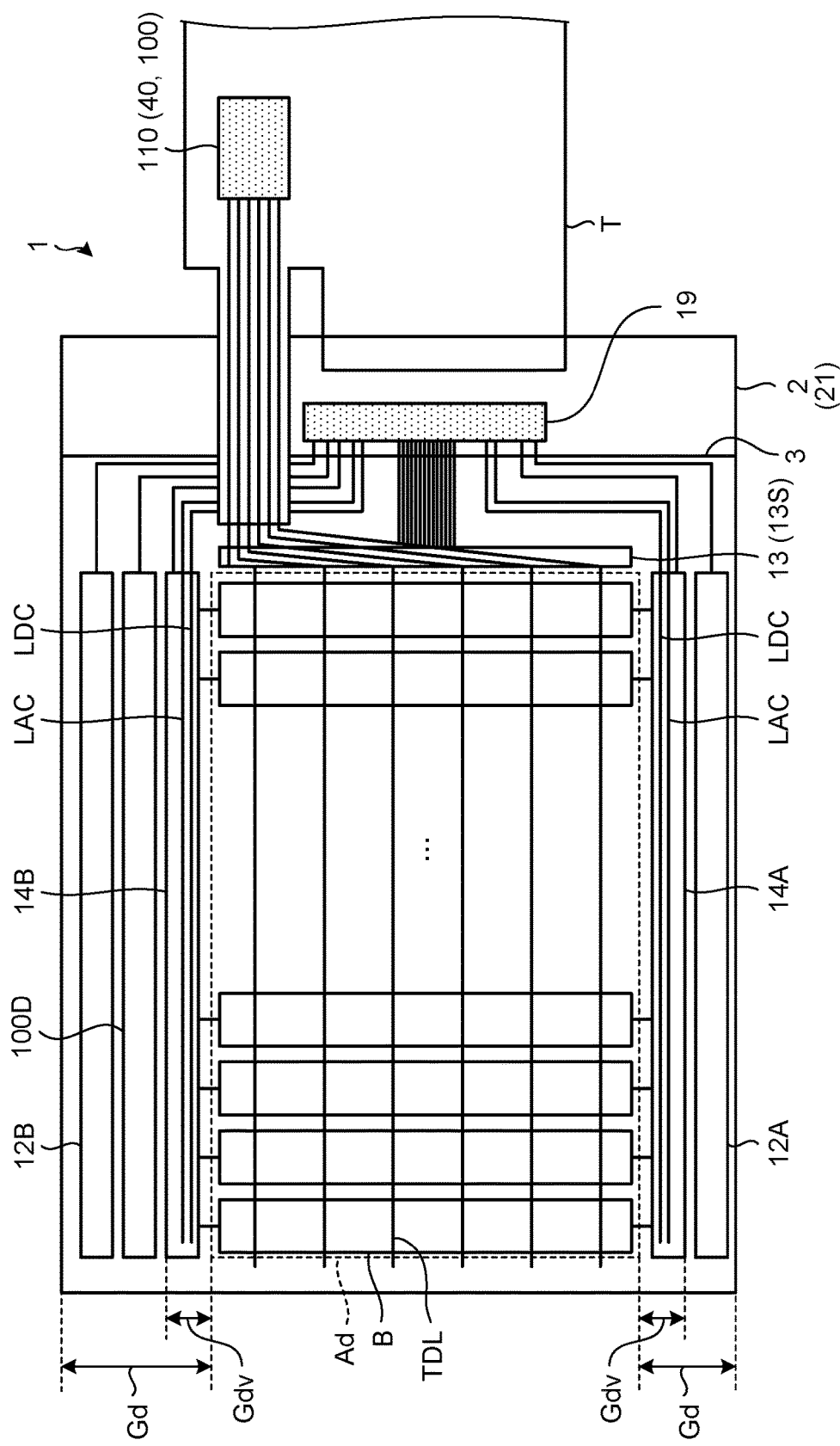
FIG. 7 is a diagram of an example of a module that mounts thereon the display device with a touch detection function according to the first embodiment.

FIG. 7 is a diagram of an example of a module that mounts thereon the display device with a touch detection function according to the first embodiment. As illustrated in FIG. 7, the display device with a touch detection function 1 includes a pixel substrate 2 (thin film transistor (TFT) substrate 21) and a flexible printed wiring board T, which are explained later. The pixel substrate 2 (TFT substrate 21) is provided with Chip On Glass (COG) 19, and has a display area Ad of the liquid crystal display unit and a frame Gd formed thereon. The COG 19 is a chip of an IC driver mounted on the TFT substrate 21 and is a control device with built-in circuits, such as the control unit 11 and the source driver 13 illustrated in FIG. 1, required for display operation. In the present embodiment, the source driver 13 and the source selector 13S are formed on the TFT substrate 21. The source driver 13 and the source selector 13S may be built into the COG 19. Drive electrode scanning units 14A and 14B which are part of the drive electrode driver 14 are formed on the TFT substrate 21. The gate driver 12 is formed on the TFT substrate 21 as gate drivers 12A and 12B. The gate driver 100D is also formed on the TFT substrate 21. The display device with a touch detection function 1 may incorporate circuits such as the drive electrode scanning units 14A and 14B, the gate driver 12, and the gate driver 100D in the COG 19.

As illustrated in FIG. 7, a drive electrode block B of the drive electrodes COML and the touch detection electrodes TDL are formed so as to three-dimensionally intersect each other in a direction perpendicular to the surface of the TFT substrate 21.

The drive electrode COML is divided into a plurality of stripe-shaped electrode patterns extending along one direction. When performing touch detection operation, the drive electrode driver 14 sequentially supplies the drive signal VcomAC to each of the electrode patterns. The stripe-shaped electrode patterns of the drive electrode COML simultaneously supplied with the drive signal VcomAC correspond to the drive electrode block B illustrated in FIG. 7. The drive electrode blocks B (drive electrodes COML) are formed in a long-side direction of the display unit with a touch detection function 10, and the touch detection electrodes TDL, explained later, are formed in a short-side direction of the display unit with a touch detection function 10. Outputs of the touch detection electrodes TDL are provided on the short-side side of the display unit with a touch detection function 10 and are coupled to a touch IC 110 mounted on the flexible printed wiring board T via the flexible printed wiring board T. The touch IC 110 includes the touch detection unit 40 and the touch-detection controller 100. In this way, the touch IC 110 is mounted on the flexible printed wiring board T and is coupled to each of the touch detection electrodes TDL arranged in parallel. The flexible printed wiring board T may be any terminal and is not therefore limited to the flexible printed wiring board, and, in this case, the touch IC 110 is provided outside the module.

A drive signal generating unit, explained later, is built in the COG 19. The source selector 13S is formed using a TFT element near the display area Ad on the TFT substrate 21. A large number of pixels Pix, explained later, are arranged in a matrix (in the form of rows and columns) in the display area Ad. The frames Gd and Gd are areas where no pixels Pix are arranged when the surface of the TFT substrate 21 is viewed from the direction perpendicular thereto. The gate driver 12, the gate driver 100D, and the drive electrode scanning units 14A and 14B of the drive driver 14 are arranged in the frames Gd and Gd.

The gate driver 12 includes the gate drivers 12A and 12B and is formed on the TFT substrate 21 using the TFT element. The gate drivers 12A and 12B are configured so as to be capable of driving the display area Ad from both sides of the display area Ad where the sub-pixels SPix (pixels), explained later, are arrange in a matrix. In the following explanation, the gate driver 12A is described as a first gate driver 12A and the gate driver 12B is described as a second gate driver 12B. Scan lines GCL, explained later, are arranged between the first gate driver 12A and the second gate driver 12B. Therefore, the scan lines GCL explained later are provided so as to extend along a direction parallel to the extending direction of the drive electrodes COML in the direction perpendicular to the surface of the TFT substrate 21.

The gate driver 100D is formed on the TFT substrate 21 using a TFT element. The gate driver 100D is configured so as to be capable of driving the display area Ad, from one side, where the sub-pixels SPix (pixels) explained later are arrange in the matrix.

The drive electrode scanning units 14A and 14B are formed on the TFT substrate 21 using a TFT element. The drive electrode scanning units 14A and 14B are supplied with the display drive voltage VcomDC from the drive signal generating unit via display wirings LDC and are also supplied with the drive signal VcomAC via touch wirings LAC. The drive-electrode scanning units 14A and 14B occupy a fixed width Gdv in the respective frames Gd. The drive-electrode scanning units 14A and 14B are then configured so as to be capable of driving each of the drive electrode blocks B arranged in parallel from both sides thereof. The display wiring LDC for supplying the display drive voltage VcomDC and the touch wiring LAC for supplying the touch drive signal VcomAC are arranged in parallel to each other in the frames Gd and Gd. The display wiring LDC is arranged in the side nearer to the display area Ad than the touch wiring LAC is. With this structure, the display drive voltage VcomDC supplied through the display wiring LDC stabilizes a potential state at edges of the display area Ad. Therefore, the display is stabilized especially in the liquid crystal display unit using liquid crystal in a horizontal electric field mode.

The display device with a touch detection function 1 illustrated in FIG. 7 outputs the touch detection signal Vdet from the short-side side of the display unit with a touch detection function 10. Thereby, the routing of wiring in the display device with a touch detection function 1 required for connection to the touch IC 110 via the flexible printed wiring board T being a terminal unit is made easy.

Figure 8:
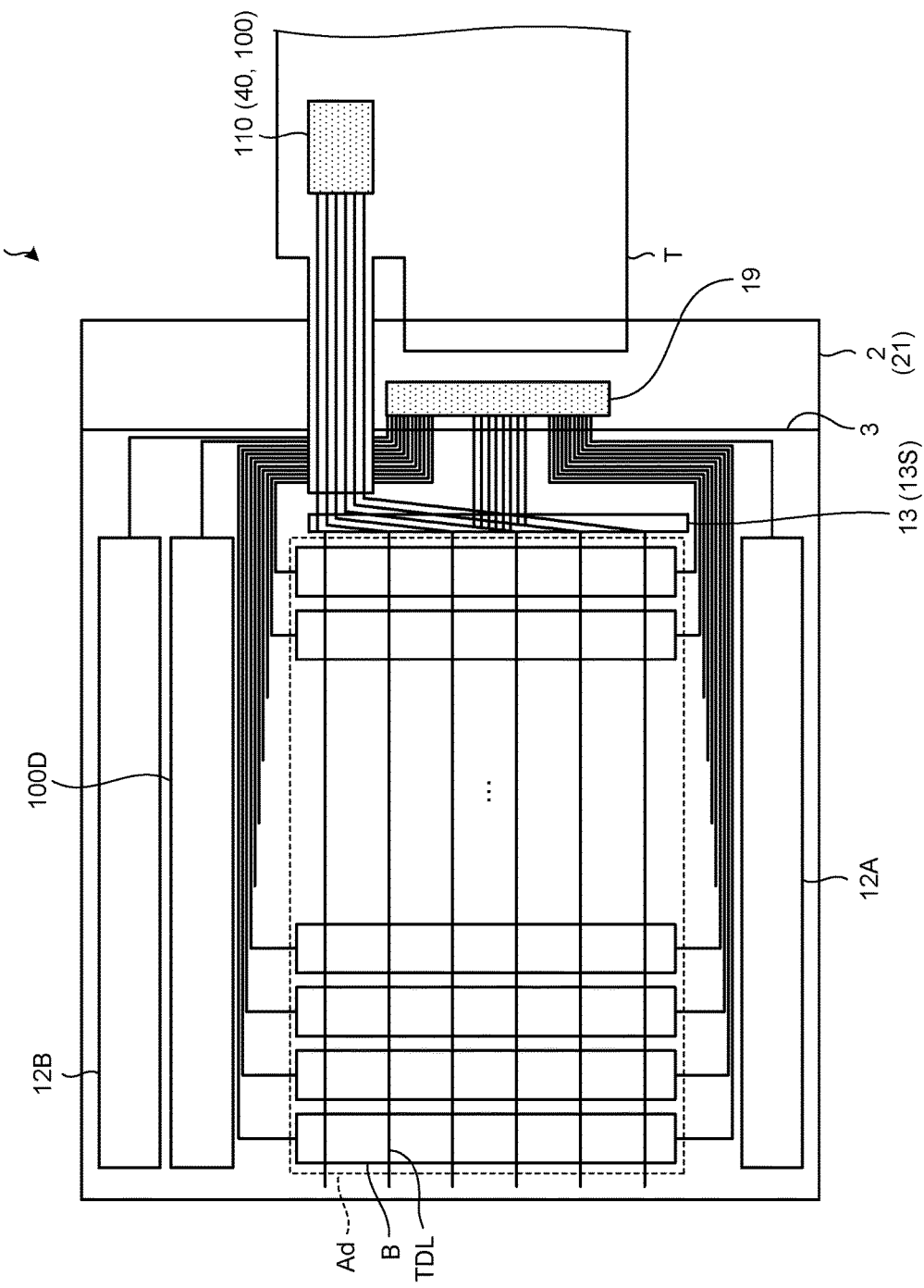
FIG. 8 is a diagram of another example of the module that mounts thereon the display device with a touch detection function according to the first embodiment.

The drive-electrode scanning units 14A and 14B may be built into the COG 19 instead of being formed in the frames Gd. FIG. 8 is a diagram of another example of the module that mounts thereon the display device with a touch detection function according to the first embodiment. In this example, the drive-electrode scanning units are built in the COG 19, and wirings for supplying the display drive voltage VcomDC and the drive signal VcomAC from the COG 19 to the drive electrode blocks B (drive electrodes COML) are formed.

Booster Circuit

Figure 9:
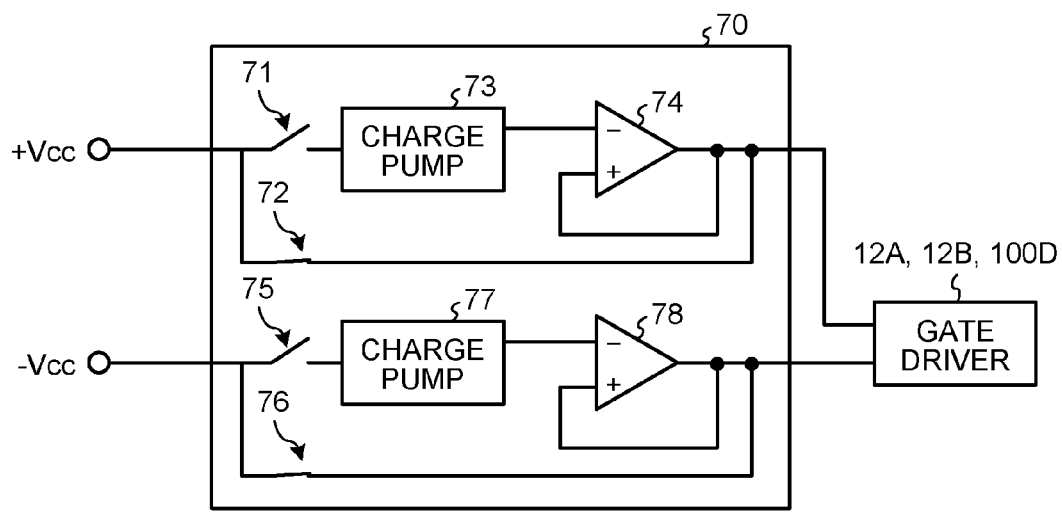
FIG. 9 is a diagram of an example of a booster circuit.
Figure 10:
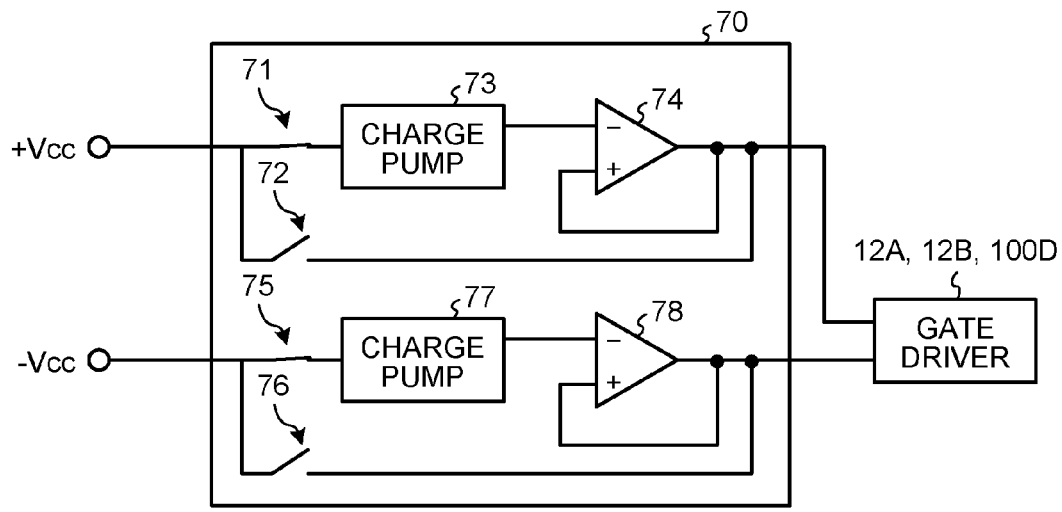
FIG. 10 is a diagram of an example of the booster circuit.

The booster circuit that boosts a power supply voltage Vcc and generates a power supply voltage Vdd will be explained next. FIG. 9 and FIG. 10 are diagrams of examples of the booster circuit. FIG. 9 is a diagram of the booster circuit in the sleep mode, and FIG. 10 is a diagram of the booster circuit in the normal operation mode. A booster circuit 70 is built in the COG 19 as an example, but may be provided outside the COG 19.

The booster circuit 70 includes switches 71, 72, 75, and 76, charge pumps 73 and 77, and regulators 74 and 78. In the sleep mode, as illustrated in FIG. 9, the switch 71 is turned off and the switch 72 is turned on. This allows a power supply voltage +Vcc (e.g., about +3V to +5V) supplied from a battery or a main substrate or so of the electronic apparatus to be supplied to the gate driver 100D. Moreover, in the sleep mode, the switch 75 is turned off and the switch 76 is turned on. This allows a power supply voltage −Vcc (e.g., about −3V to −5V) supplied from the battery or the main substrate or so of the electronic apparatus to be supplied to the gate driver 100D.

Meanwhile, in the normal operation mode, as illustrated in FIG. 10, the switch 71 is turned on and the switch 72 is turned off. Thereby, the power supply voltage +Vcc is supplied to the charge pump 73, and the charge pump 73 generates a power supply voltage +Vdd (e.g., about +5V to +10V). The power supply voltage +Vdd generated by the charge pump 73 is stabilized by the regulator 74 to be supplied to the gate drivers 12A and 12B. Moreover, in the normal operation mode, as illustrated in FIG. 10, the switch 75 is turned on and the switch 76 is turned off. Thereby, the power supply voltage −Vcc is supplied to the charge pump 77, and the charge pump 77 generates a power supply voltage −Vdd (e.g., about −5V to −10V). The power supply voltage −Vdd generated by the charge pump 77 is stabilized by the regulator 78 to be supplied to the gate drivers 12A and 12B.

Figure 11:
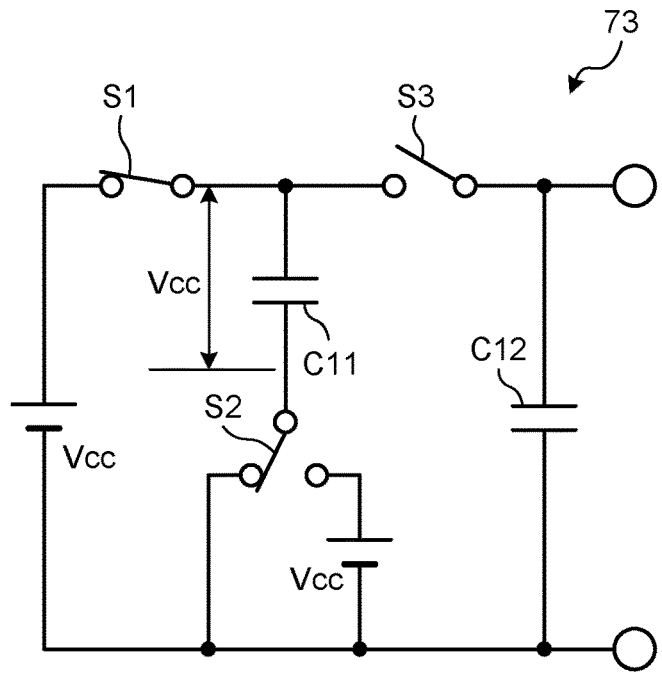
FIG. 11 is a diagram of an example of a charge pump.
Figure 12:
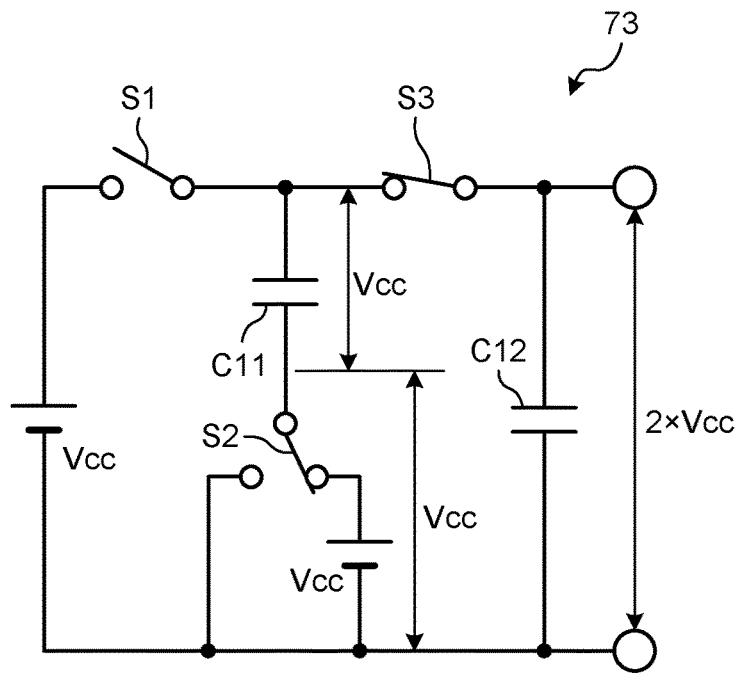
FIG. 12 is a diagram of an example of the charge pump.

FIG. 11 and FIG. 12 are diagrams of examples of the charge pump. The charge pump 73 includes switches S1 to S3 and capacitors C11 to C12. In the charge pump 73, at first, the switch S1 is turned on and one end of the capacitor C11 is coupled to the power supply voltage Vcc. The other end of the capacitor C11 is coupled to a ground potential by the switch S2. The capacitor C11 is thereby charged with electric charges, and an inter-terminal voltage becomes Vcc. The switch S3 is off.

Subsequently, the switch S1 is turned off and the other end of the capacitor C11 is coupled to a power supply potential Vcc by the switch S2. The switch S3 is then turned on, and the capacitor C11/the power supply potential Vcc and the capacitor C12 are coupled in parallel to each other. At this time, an inter-terminal voltage of the capacitor C12 is 2×Vcc obtained by adding the supply potential Vcc and the inter-terminal voltage of the capacitor C11, i.e., Vcc. The charge pump 73 periodically turns on and off the switches S1 to S3, and thereby enables to boost the power supply voltage Vcc.

The charge pump 73 has been explained so far, and the charge pump 77 has the same configuration as that of the charge pump 73.

Display Unit with Touch Detection Function

Figure 13:
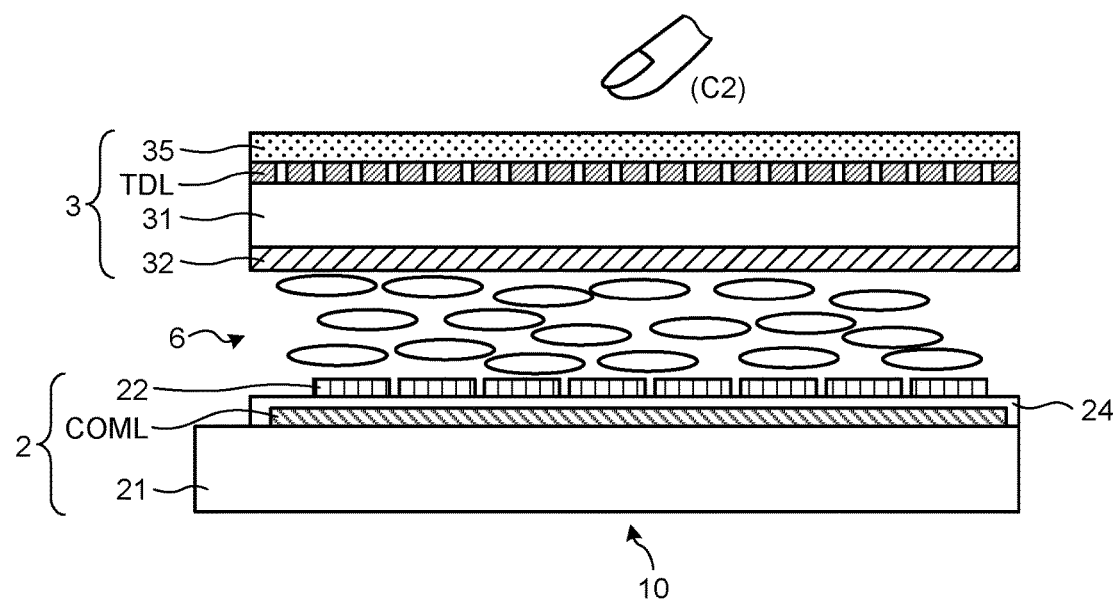
FIG. 13 is a cross-sectional view of a schematic cross-sectional structure of a display unit with a touch detection function according to the first embodiment.
Figure 14:
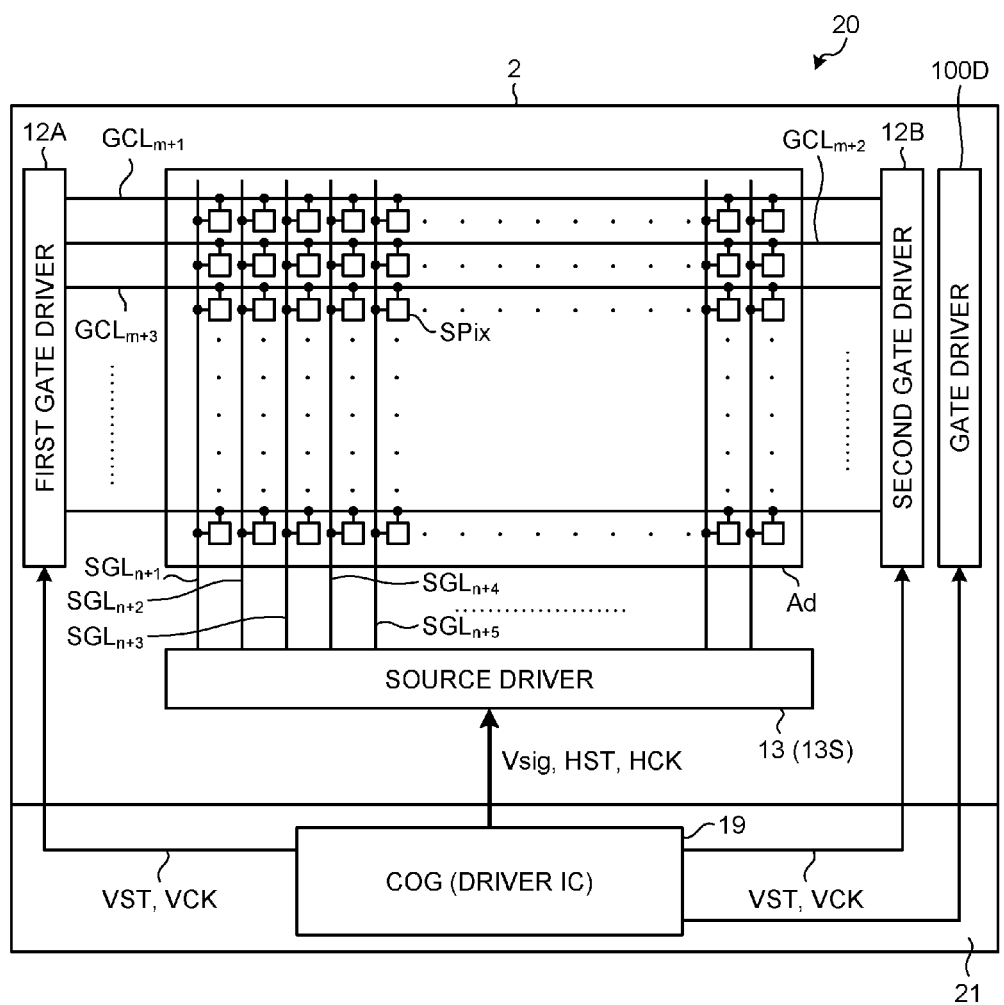
FIG. 14 is a diagram of an example of a control device for the display device with a touch detection function according to the first embodiment.
Figure 15:
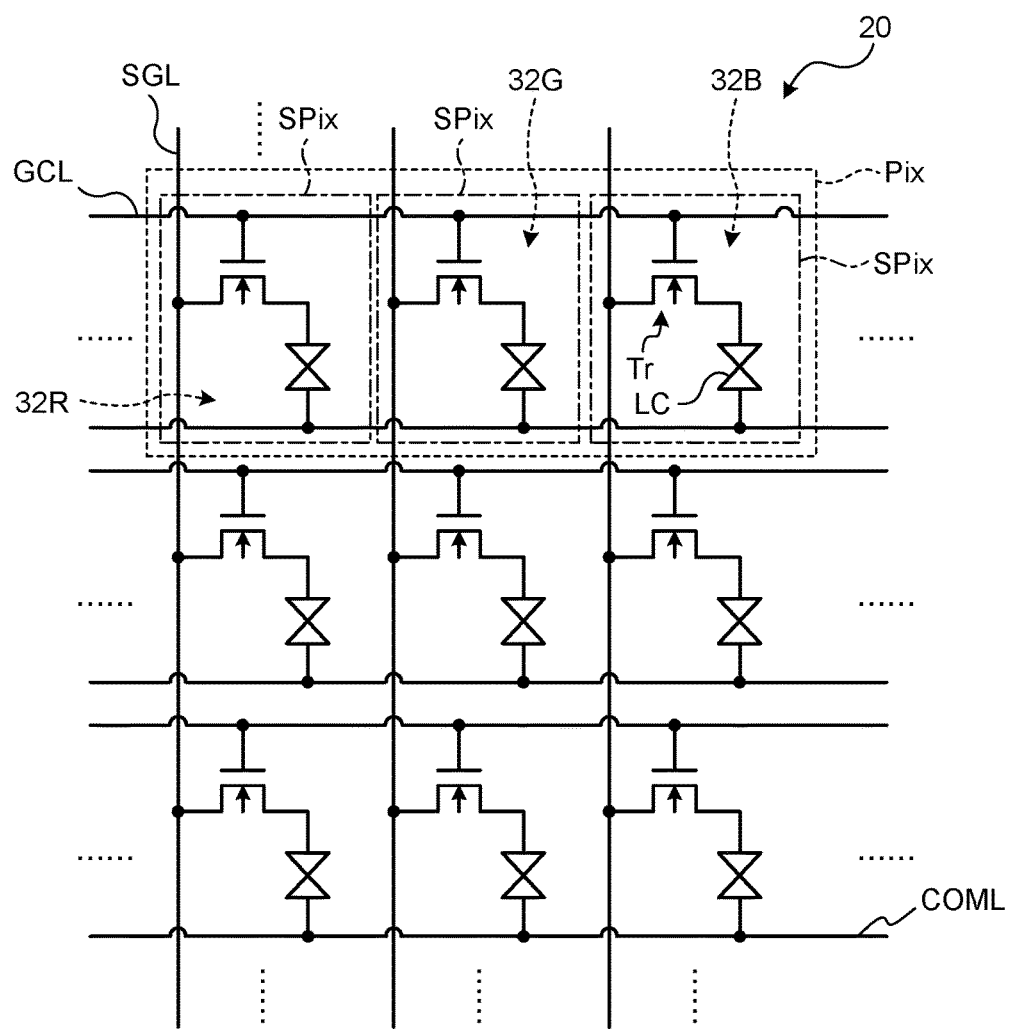
FIG. 15 is a circuit diagram of a pixel array of the display unit with a touch detection function according to the first embodiment.

A configuration example of the display unit with a touch detection function 10 will be explained in detail next. FIG. 13 is a cross-sectional view of a schematic cross-sectional structure of the display unit with a touch detection function according to the first embodiment. FIG. 14 is a diagram of an example of a control device for the display device with a touch detection function according to the first embodiment. FIG. 15 is a circuit diagram of a pixel array of the display unit with a touch detection function according to the first embodiment.

As illustrated in FIG. 13, the display unit with a touch detection function 10 includes the pixel substrate 2, a counter substrate 3 arranged opposite to the pixel substrate 2 in a direction perpendicular to the surface of the pixel substrate 2, and a liquid crystal layer 6 inserted between the pixel substrate 2 and the counter substrate 3.

The liquid crystal layer 6 modulates light passing therethrough according to the state of the electric field, and uses a liquid crystal unit using a liquid crystal in the horizontal electric field mode such as fringe field switching (FFS) or in-plane switching (IPS). An orientation film may be provided between the liquid crystal layer 6 and the pixel substrate 2 and between the liquid crystal layer 6 and the counter substrate 3 illustrated in FIG. 13.

The counter substrate 3 includes a glass substrate 31 and a color filter 32 formed on one face of the glass substrate 31. The touch detection electrodes TDL being detection electrodes of the touch detecting unit 30 are formed on the other face of the glass substrate 31, and a polarizer 35 is disposed on the touch detection electrodes TDL.

The pixel substrate 2 includes the TFT substrate 21 as a circuit board, a plurality of pixel electrodes 22 arranged in a matrix over the TFT substrate 21, a plurality of drive electrodes COML formed between the TFT substrate 21 and the pixel electrodes 22, and an insulating layer 24 for insulating the pixel electrodes 22 from the drive electrodes COML.

System Configuration Example of Display Device

The pixel substrate 2 includes the display area Ad, the COG 19 having functions of an interface (I/F) and a timing generator, the first gate driver 12A, the second gate driver 12B, the gate driver 100D, and the source driver 13, which are provided over the TFT substrate 21. The flexible printed wiring board T illustrated in FIG. 7 transmits an external signal for the COG 19 illustrated in FIG. 14, which is disposed as the COG 19 in FIG. 7, or drive power for driving the COG 19 thereto. The pixel substrate 2 includes the display area Ad which is provided on the surface of the TFT substrate 21 of a translucent insulating substrate (e.g. a glass substrate) and on which a number of pixels including liquid crystal cells are arranged in a matrix (in the form of rows and columns), the source driver (horizontal drive circuit) 13, and the gate drivers (vertical drive circuits) 12A, 12B, and 100D. The gate drivers (vertical drive circuits) 12A and 12B are arranged across the display area Ad, as the first gate driver 12A and the second gate driver 12B.

The display area Ad has a matrix (rows and columns form) structure in which the sub-pixels SPix including the liquid crystal layer are arranged in m rows×n columns. In this specification, the row indicates a pixel row having n pieces of sub-pixels SPix arrayed in one direction. The column indicates a pixel column having m pieces of sub-pixels SPix arrayed in a direction perpendicular to the direction in which the rows are arrayed. The values of m and n are determined according to a vertical display resolution and a horizontal display resolution respectively. In the display area Ad, each of scan lines $GCL_{m+1}$, $GCL_{m+2}$, $GCL_{m+3}$ . . . is wired in each row with respect to an m-row/n-column array of the pixels VPix, and each of signal lines $SGL_{n+1}$, $SGL_{n+2}$, $SGL_{n+3}$, $SGL_{n+4}$, $SGL_{n+5}$ . . . is wired in each column. In the embodiment, "scan line GCL" may be hereinafter described as a representative of the scan lines $GCL_{m+1}$, $GCL_{m+2}$, $GCL_{m+3}$ . . . , and "signal line SGL" may be hereinafter described as a representative of the signal lines $SGL_{n+1}$, $SGL_{n+2}$, $SGL_{n+3}$, $SGL_{n+4}$, $SGL_{n+5}$ . . . .

A master clock, a horizontal synchronization signal, and a vertical synchronization signal, which are external signals input from an external device, are input to the pixel substrate 2 and supplied to the COG 19. The COG 19 performs level conversion (boosting) of the master clock, the horizontal synchronization signal, and the vertical synchronization signal, each of which has a voltage magnitude of an external power supply, to a voltage magnitude of an internal power supply required for driving the liquid crystal, passes the level-converted master clock, horizontal synchronization signal, and vertical synchronization signal through the timing generator, and generates a vertical start pulse VST, a vertical clock pulse VCK, a horizontal start pulse HST, and a horizontal clock pulse HCK. The COG 19 supplies the vertical start pulse VST and the vertical clock pulse VCK to the first gate driver 12A, the second gate driver 12B, and the gate driver 100D, and also supplies the horizontal start pulse HST and the horizontal clock pulse HCK to the source driver 13. The COG 19 generates display drive voltage (counter electrode potential) VCOM, which is called common potential commonly supplied to the pixels, for the pixel electrode for each sub-pixel SPix, and supplies the generated common potential to the drive electrodes COML.

The first gate driver 12A, the second gate driver 12B, and the gate driver 100D include a shift register, explained later, and may further include a latch circuit and the like. The first gate driver 12A, the second gate driver 12B, and the gate driver 100D are supplied with the vertical start pulse VST, and the latch circuits thereby sequentially sample and latch the display data output from the COG 19 in synchronization with the vertical clock pulse VCK in one horizontal period. The first gate driver 12A, the second gate driver 12B, and the gate driver 100D sequentially output the digital data for one line latched in the latch circuits as a vertical scan pulse, and supply the digital data to the scan lines GCL, to thereby sequentially select sub-pixels SPix row by row. The first gate driver 12A and the second gate driver 12B are arranged so as to sandwich the scan lines GCL therebetween in the extending direction of the scan lines GCL. The gate driver 100D is arranged adjacent to the second gate driver 12B. The first gate driver 12A, the second gate driver 12B, and the gate driver 100D perform output in the order from an upper side of the display area Ad, i.e., from an upper direction of vertical scanning to a lower side of the display area Ad, i.e., to a lower direction of the vertical scanning.

The source driver 13 is supplied with, for example, 6-bit R (red), G (green), and B (blue) image signals Vsig. The source driver 13 writes display data to sub-pixels SPix of a row selected through vertical scanning performed by the first gate driver 12A and the second gate driver 12B for each pixel, or for each pixels, or for all pixels at one time via the signal lines SGL.

Formed on the TFT substrate 21 are thin film transistor (TFT) elements Tr of the sub-pixels SPix illustrated in FIG. 14 and FIG. 15 and wirings such as the pixel signal lines SGL for supplying a pixel signal Vpix to the pixel electrodes 22 illustrated in FIG. 13 and the scan lines GCL for driving the TFT elements Tr respectively. In this way, the pixel signal lines SGL are extended in a plane parallel to the surface of the TFT substrate 21, to supply the pixel signal Vpix for displaying an image to the pixels. The liquid crystal display unit 20 illustrated in FIG. 15 has the sub-pixels SPix arrayed in a matrix. The sub-pixel SPix includes a TFT element Tr and a liquid crystal element LC. The TFT element Tr includes a thin film transistor, which is an n-channel metal oxide semiconductor (MOS) TFT in this example. A source of the TFT element Tr is coupled to the pixel signal line SGL, a gate thereof is coupled to the scan line GCL, and a drain thereof is coupled to one end of the liquid crystal element LC. The liquid crystal element LC is coupled at one end to the drain of the TFT element Tr, and is coupled at the other end to the drive electrode COML.

The first gate driver 12A, the second gate driver 12B, and the gate driver 100D illustrated in FIG. 14 apply a vertical scan pulse to the gates of the TFT elements Tr of the sub-pixels SPix through the scan lines GCL illustrated in FIG. 15 to thereby sequentially select one row (one horizontal line), as a target to be driven, from among the sub-pixels SPix formed in the matrix in the display area Ad. The source driver 13 supplies the pixel signal Vpix to each of the sub-pixels SPix including one horizontal line sequentially selected by the first gate driver 12A, the second gate driver 12B, and the gate driver 100D through the respective pixel signal lines SGL. In the sub-pixels SPix, display of one horizontal line is performed according to the supplied pixel signal. The drive electrode driver 14 applies the drive signal for display (display drive voltage VcomDC) so as to drive the drive electrodes COML.

As explained above, the display device with a touch detection function 1 drives the first gate driver 12A, the second gate driver 12B, and the gate driver 100D so as to sequentially scan the scan lines $GCL_{m+1}$, $GCL_{m+2}$, and $GCL_{m+3}$ to thereby sequentially select one horizontal line. The display device with a touch detection function 1 causes the source driver 13 to supply a pixel signal to the pixel Pix belonging to the one horizontal line, and thereby performs display of the horizontal line one line by one line. When performing the display operation, the drive electrode driver 14 applies the drive signal Vcom to the drive electrodes COML corresponding to the selected one horizontal line.

The color filter 32 illustrated in FIG. 13 is structured to periodically array color areas of the color filter colored in three colors, for example, red (R), green (G), and blue (B), and to associate color areas 32R, 32G, and 32B (see FIG. 15) of the three colors of R, G, and B, which are made a set as a pixel Pix, with the sub-pixels SPix illustrated in FIG. 15. The color filter 32 faces the liquid crystal layer 6 in the direction perpendicular to the TFT substrate 21. The color filter 32 may be a combination of other colors if the color areas are colored in different colors.

The sub-pixel SPix illustrated in FIG. 15 is coupled to the other sub-pixels SPix belonging to the same row of the liquid crystal display unit 20 through the scan line GCL. The scan lines GCL are coupled to the gate drivers 12 and 100D and are supplied with a scan signal Vscan from the gate drivers 12 and 100D. The sub-pixel SPix is coupled to the other sub-pixels SPix belonging to the same column of the liquid crystal display unit 20 through the pixel signal line SGL. The pixel signal lines SGL are coupled to the source driver 13 and are supplied with the pixel signal Vpix from the source driver 13.

Figure 16:
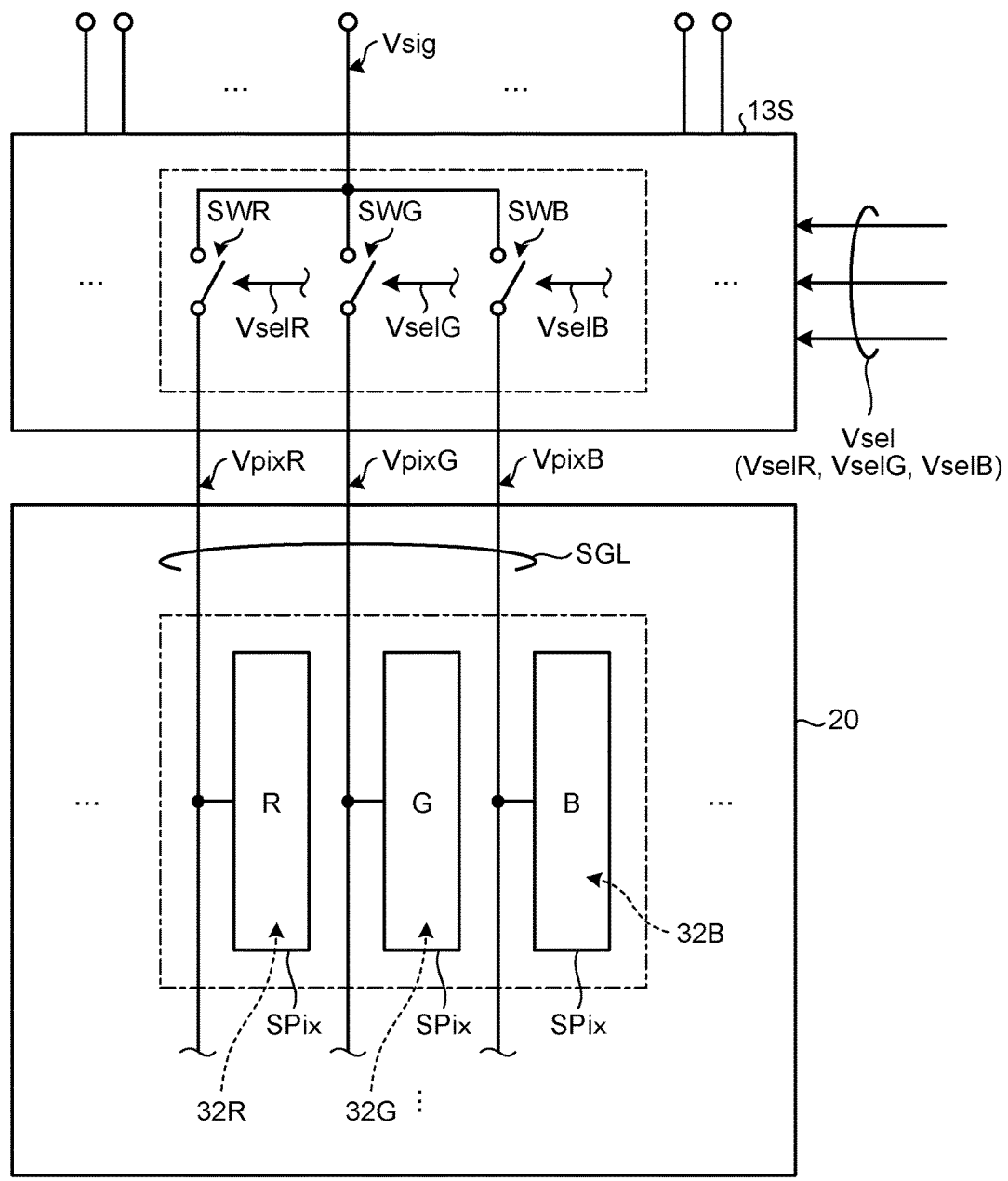
FIG. 16 is a schematic diagram for explaining a relation between a source driver and pixel signal lines in the module that mounts thereon the display device with a touch detection function according to the first embodiment.

FIG. 16 is a schematic diagram for explaining a relation between the source driver and the pixel signal lines in the module that mounts thereon the display device with a touch detection function according to the first embodiment. As illustrated in FIG. 16, the display device with a touch detection function 1 is configured so that the pixel signal lines SGL are coupled to the source driver 13 built in the COG 19 via the source selector 13S. The source selector 13S performs a switching operation according to each of switch control signals Vsel.

As illustrated in FIG. 16, the source driver 13 generates and outputs a pixel signal Vpix based on the image signal Vsig and a source driver control signal supplied from the control unit 11. The source driver 13 generates a pixel signal, in which the pixel signal Vpix of sub-pixels SPix (three in this example) in the liquid crystal display unit 20 of the display unit with a touch detection function 10 is time-division multiplexed, from the image signal Vsig for one horizontal line, and supplies the generated pixel signal to the source selector 13S. The source driver 13 also generates switch control signals Vsel (VselR, VselG, and VselB) required for separating the pixel signal Vpix multiplexed on the image signal Vsig therefrom and supplies the image signal Vsig and the switch control signals Vsel to the source selector 13S. The multiplexing allows the number of wirings between the source driver 13 and the source selector 13S to be decreased.

The source selector 13S separates the pixel signals Vpix time-division multiplexed on the image signal Vsig based on the image signal Vsig and the switch control signal Vsel supplied from the source driver 13, and supplies the separated pixel signals Vpix to the liquid crystal display unit 20 of the display unit with a touch detection function 10.

The source selector 13S includes, for example, three switches SWR, SWG, and SWB, and one ends of the three switches SWR, SWG, and SWB are coupled to each other and are supplied with the image signal Vsig from the source driver 13. The other ends of the switches SWR, SWG, and SWB are coupled to the sub-pixels SPix via the pixel signal lines SGL respectively in the liquid crystal display unit 20 of the display unit with a touch detection function 10. The three switches SWR, SWG, and SWB are controlled so as to be switched by the switch control signals Vsel (VselR, VselG, and VselB), respectively, supplied from the source driver 13. This configuration enables the source selector 13S to time-divisionally and sequentially switch the switches SWR, SWG, and SWB according to the switch control signal Vsel to be changed to the ON state. Thus, the source selector 13S separates the pixel signals Vpix (VpixR, VpixG, and VpixB) from the multiplexed image signal Vsig. The source selector 13S then supplies the pixel signals Vpix to the three sub-pixels SPix respectively. The color areas 32R, 32G, and 32B colored in the three colors: red (R), green (G), and blue (B) are associated with the sub-pixels SPix respectively. Therefore, the pixel signal VpixR is supplied to the sub-pixel SPix corresponding to the color area 32R. The pixel signal VpixG is supplied to the sub-pixel SPix corresponding to the color area 32G. The pixel signal VpixB is supplied to the sub-pixel SPix corresponding to the color area 32B.

A sub-pixel SPix is coupled to the other sub-pixels SPix belonging to the same row of the liquid crystal display unit 20 by the drive electrode COML. The drive electrode COML is coupled to the drive electrode driver 14 and is supplied with the display drive voltage VcomDC from the drive electrode driver 14. In other words, in this example, the sub-pixels SPix belonging to the same row share the drive electrode COML.

The gate drivers 12 and 100D illustrated in FIG. 1 apply the scan signal Vscan to the gates of the TFT elements Tr in the sub-pixels SPix through the scan line GCL illustrated in FIG. 15 to thereby sequentially select one row (one horizontal line), as a target to be driven, from among the sub-pixels SPix formed in the matrix in the liquid crystal display unit 20. The source driver 13 illustrated in FIG. 1 supplies the pixel signals Vpix to the sub-pixels SPix forming one horizontal line sequentially selected by the gate driver 12 through the respective pixel signal lines SGL illustrated in FIG. 15. In the sub-pixels SPix, display of one horizontal line is performed according to the supplied pixel signals Vpix. The drive electrode driver 14 illustrated in FIG. 1 applies the drive signal Vcom to the drive electrodes COML so as to drive the drive electrodes COML for each drive electrode block B including a predetermined number of drive electrodes COML as illustrated in FIG. 7 and FIG. 15.

As explained above, the liquid crystal display unit 20 drives the gate drivers 12 and 100D so as to time-divisionally and sequentially scan the scan lines GCL to thereby sequentially select one horizontal line. In the liquid crystal display unit 20, the source driver 13 supplies the pixel signals Vpix to the sub-pixels SPix belonging to the one horizontal line, to thereby perform display of the horizontal line one line by one line. When performing the display operation, the drive electrode driver 14 applies the display drive voltage VcomDC to the drive electrode block including the drive electrode COML corresponding to the one horizontal line.

Figure 17:
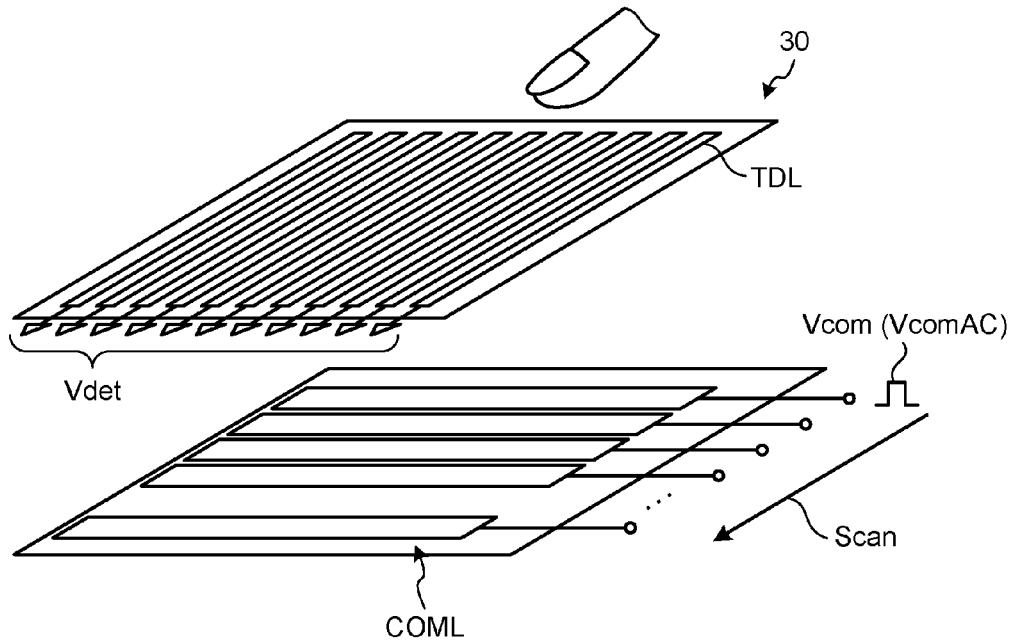
FIG. 17 is a perspective view of a configuration example of drive electrodes and touch detection electrodes of the display unit with a touch detection function according to the first embodiment.

The drive electrode COML according to the present embodiment functions as a drive electrode of the liquid crystal display unit 20 and also functions as a drive electrode of the touch detecting unit 30. FIG. 17 is a perspective view of a configuration example of drive electrodes and touch detection electrodes of the display unit with a touch detection function according to the first embodiment. The drive electrodes COML illustrated in FIG. 17 face the pixel electrodes 22 in the direction perpendicular to the surface of the TFT substrate 21 as illustrated in FIG. 13. The touch detecting unit 30 includes the drive electrodes COML provided on the pixel substrate 2 and the touch detection electrodes TDL provided on the counter substrate 3. The touch detection electrodes TDL are formed from stripe-shaped electrode patterns extending along a direction intersecting an extending direction of the electrode patterns of the drive electrode COML. The touch detection electrodes TDL face the drive electrodes COML in the direction perpendicular to the surface of the TFT substrate 21. Each electrode pattern of the touch detection electrodes TDL is coupled to an input of the amplifier 42 of the touch detection unit 40 and to an input of the touch-detection controller 100. The electrode pattern in which the drive electrode COML and the touch detection electrode TDL intersect each other produces a capacitance at the intersection. The touch detection electrode TDL or the drive electrode COML (drive electrode block) is not limited to the shape in which it is divided into a plurality of stripes. For example, the touch detection electrode TDL or the drive electrode COML (drive electrode block) may be comb-shaped. Alternatively, the touch detection electrode TDL or the drive electrode COML (drive electrode block) has only to be divided into portions, and therefore the shape of each slit that divides the drive electrode COML may be a straight line or a curve line.

With this structure, in the touch detecting unit 30, the drive electrode driver 14 drives so as to time-divisionally and line-sequentially scan the drive electrode block B illustrated in FIG. 7 when performing touch detection operation. The drive electrode block B (one detection block) of the drive electrodes COML is thereby sequentially selected in a scan direction Scan. The touch detecting unit 30 then outputs the touch detection signal Vdet from each of the touch detection electrodes TDL. In this way, the touch detecting unit 30 is configured so as to perform the touch detection on the one detection block.

Figure 18:
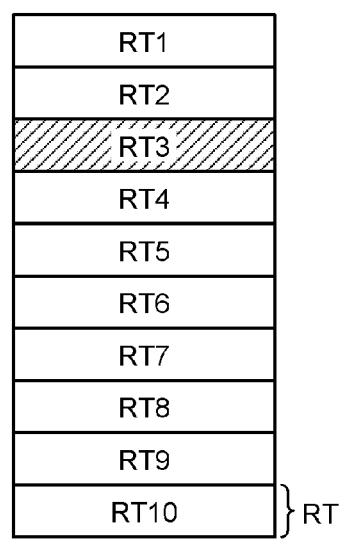
FIG. 18 is a schematic diagram of an operation example of touch detection in the display device with a touch detection function according to the first embodiment.
Figure 19:
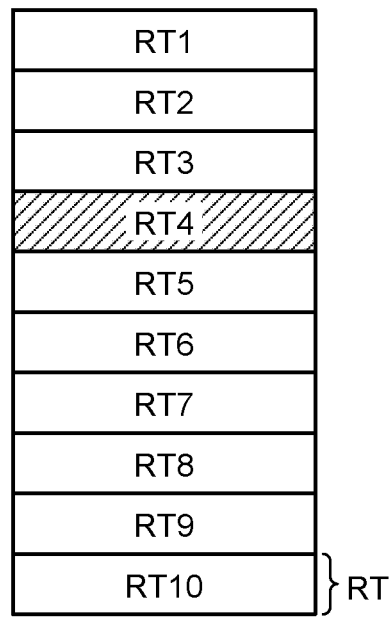
FIG. 19 is a schematic diagram of an operation example of touch detection in the display device with a touch detection function according to the first embodiment.
Figure 20:
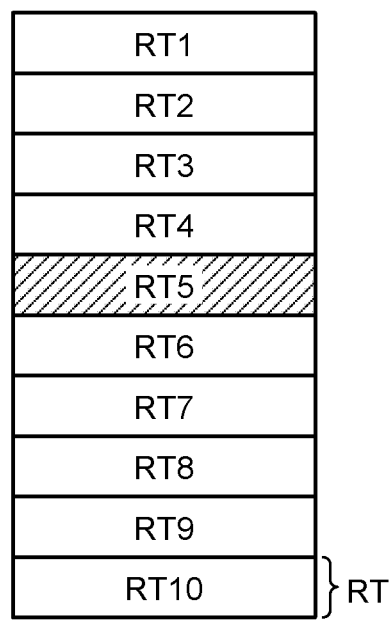
FIG. 20 is a schematic diagram of an operation example of touch detection in the display device with a touch detection function according to the first embodiment.

FIG. 18, FIG. 19, and FIG. 20 are schematic diagrams of an operation example of touch detection in the display device with a touch detection function according to the first embodiment. A supply operation of the drive signal VcomAC to each of partial detection regions RT1 to RT10 in the case in which a touch detection surface is formed with 10 partial detection regions RT1 to RT10 is illustrated in FIG. 18 to FIG. 20. Each of partial detection regions RT is set to a width (e.g., about 5 mm) corresponding to the size of a finger of the user operating it. The drive electrode driver 14 applies the drive signal VcomAC to the drive electrodes COML in each partial detection region RT. A shaded portion indicates the partial detection region RT supplied with the drive signal VcomAC, and the display drive voltage VcomDC is supplied to the other partial detection regions RT. The drive electrode driver 14 illustrated in FIG. 1 selects the partial detection region RT3 from among the partial detection regions RT as targets for touch detection operation illustrated in FIG. 18, and applies the touch drive signal VcomAC thereto. Subsequently, the drive electrode driver 14 selects the partial detection region RT4 from among the partial detection regions RT illustrated in FIG. 19, and applies the touch drive signal VcomAC thereto. The drive electrode driver 14 then selects the partial detection region RT5 from among the partial detection regions RT illustrated in FIG. 20, and applies the touch drive signal VcomAC thereto. In this way, the drive electrode driver 14 sequentially selects each of the partial detection regions RT and applies the touch drive signal VcomAC to the drive electrodes COML belonging to the selected partial detection region RT, to thereby scan all the partial detection regions RT. In this example, the number of partial detection regions RT is set to 10 for the sake of simplicity of explanation; however, the embodiment is not limited thereto. In addition, one partial detection region RT may include one drive electrode block B, or one partial detection region RT may include a plurality of drive electrode blocks B.

In the touch detecting unit 30, the drive electrode block B belonging to the partial detection region RT illustrated in FIG. 18 to FIG. 20 corresponds to the drive electrode E1 in the basic principle of the capacitive touch detection. One of the touch detection electrodes TDL in the touch detecting unit 30 corresponds to the touch detection electrode E2. The touch detecting unit 30 is configured to detect a touch according to the basic principle. As illustrated in FIG. 17, mutually three-dimensional intersecting electrode patterns forms capacitive-type touch sensors in a matrix. Therefore, by scanning over the entire touch detection surface of the touch detecting unit 30, a position where an external proximity object comes in contact with or is in proximity to the touch detection surface can be detected.

Drive Signal Generating Unit and Drive Electrode Driver

Figure 21:
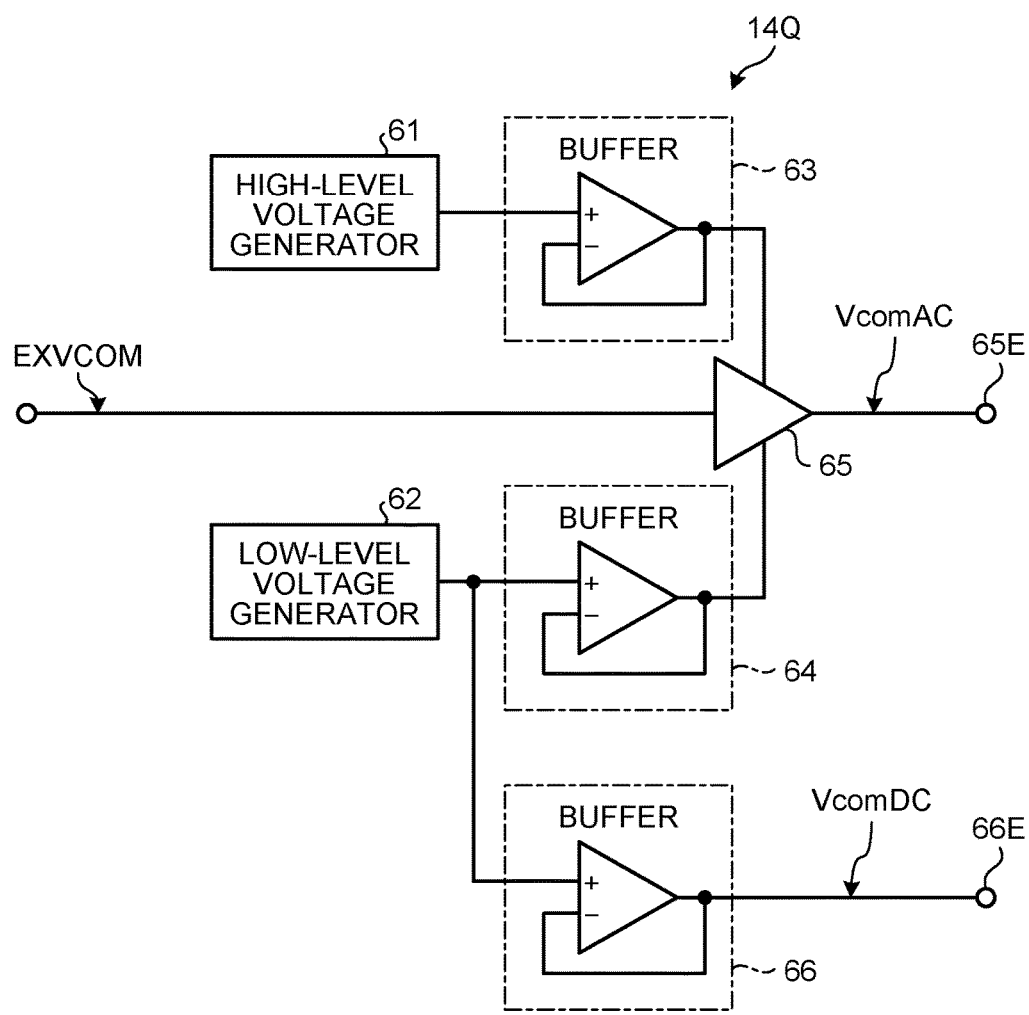
FIG. 21 is a block diagram of a drive signal generating unit of a drive electrode driver according to the first embodiment.

FIG. 21 is a block diagram of the drive signal generating unit of the drive electrode driver according to the first embodiment. A drive signal generating unit 14Q includes a high-level voltage generator 61, a low-level voltage generator 62, buffers 63, 64, and 66, and a switching circuit 65.

The high-level voltage generator 61 generates a high-level voltage of the touch drive signal VcomAC. The low-level voltage generator 62 generates a direct-current voltage of the display drive voltage VcomDC. The voltage generated by the low-level voltage generator 62 is used also as a low-level voltage of the touch drive signal VcomAC. The buffer 63 outputs the voltage supplied from the high-level voltage generator 61 while performing an impedance conversion, and supplies the voltage to the switching circuit 65. The buffer 64 outputs the voltage supplied from the low-level voltage generator 62 while performing an impedance conversion, and supplies the voltage to the switching circuit 65. The switching circuit 65 alternately repeats a case when a drive control signal EXVCOM is at a high level and a case when the drive control signal EXVCOM is at a low level based on the drive control signal EXVCOM to generate a touch drive signal VcomAC. The switching circuit 65 outputs the voltage supplied from the buffer 63 when the drive control signal EXVCOM is at the high level, and outputs the voltage supplied from the buffer 64 when the drive control signal EXVCOM is at the low level. When the drive control signal EXVCOM is at the low level, the switching circuit 65 outputs the voltage supplied from the buffer 64 as a direct-current voltage of the display drive voltage VcomDC based on the drive control signal EXVCOM. The buffers 63 and 64 are formed of, for example, a voltage follower. The voltage output from switching circuit 65 is output to an output terminal 65E. The buffer 66 outputs the voltage supplied from the low-level voltage generator 62 while performing an impedance conversion, and supplies the direct-current voltage of the display drive voltage VcomDC to an output terminal 66E.

Figure 22:
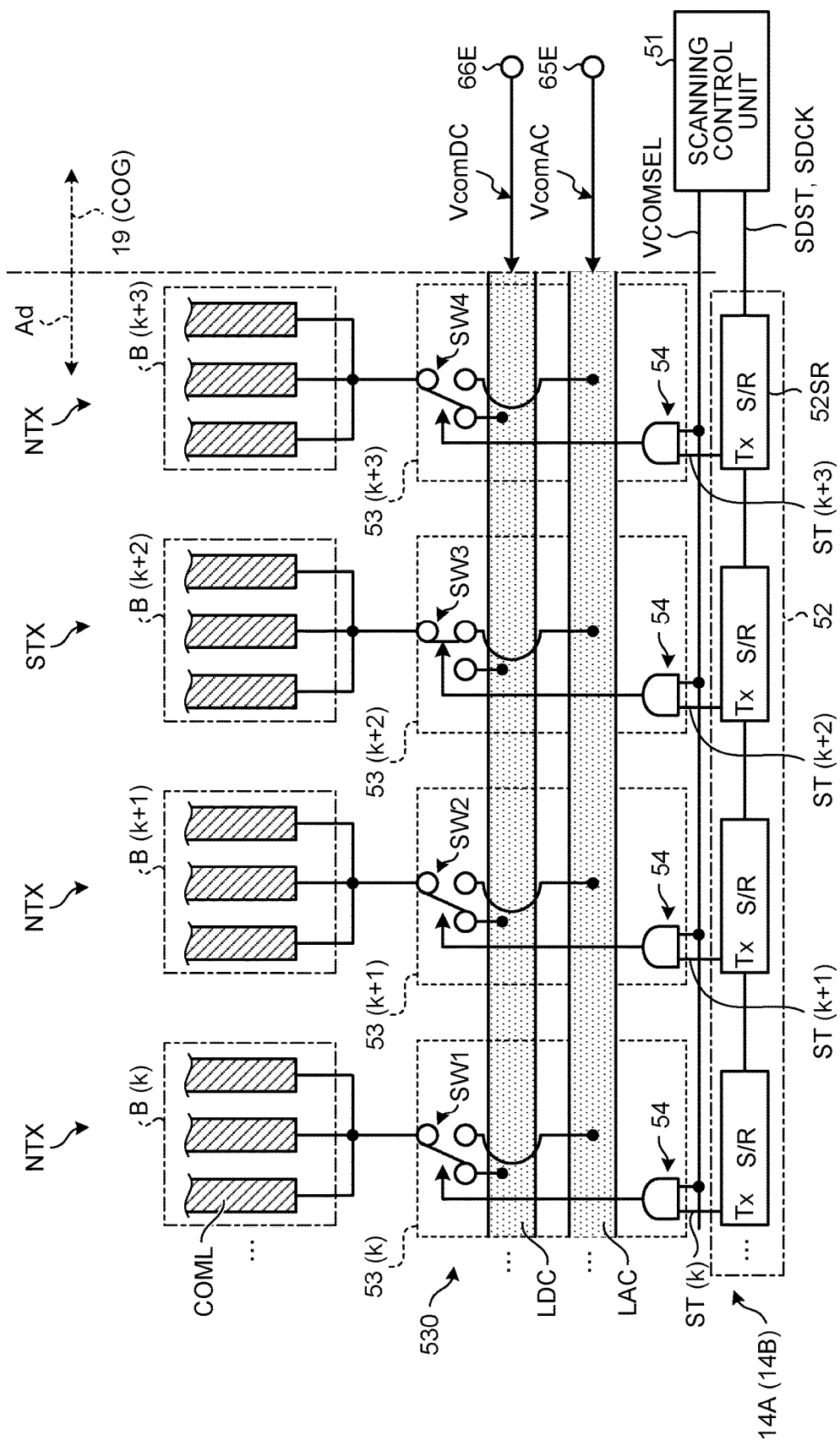
FIG. 22 is a block diagram of the drive electrode driver according to the first embodiment.

FIG. 22 is a block diagram of the drive electrode driver according to the first embodiment. The drive-electrode scanning units 14A and 14B include a scanning control unit 51, a touch detection scanning unit 52, and a drive unit 530. The drive unit 530 includes drive units 53(k) to 53(k+3) having the same number as that of the drive electrode blocks B. The scanning control unit 51 is mounted on the COG 19. The touch detection scanning unit 52 and the drive unit 530 are arranged in the frame Gd provided around the display area Ad. Hereinafter, when any one of the drive units 53(k) to 53(k+3) is indicated, just a drive unit 53 is used.

The scanning control unit 51 supplies a control signal SDCK and a scan start signal SDST to the touch detection scanning unit 52 based on the control signal supplied from the control unit 11. The display wiring LDC is supplied with the display drive voltage VcomDC output from the drive signal generating unit 14Q via the output terminal 66E. The touch wiring LAC is supplied with the touch drive signal VcomAC output from the drive signal generating unit 14Q via the output terminal 65E. The scanning control unit 51 supplies a drive electrode selection signal VCOMSEL supplied with the touch drive signal VcomAC from the drive signal generating unit 14Q to the drive unit 530.

The touch detection scanning unit 52 includes shift registers 52SR for drive electrodes, and generates scan signals ST(k), ST(k+1), ST(k+2), ST(k+3) . . . in order to select a drive electrode COML to be applied with the touch drive signal VcomAC. Specifically, in the touch detection scanning unit 52, triggered by the scan start signal SDST supplied from the scanning control unit 51 and synchronized with the control signal SDCK, the shift register 52SR is sequentially transferred at each transfer stage of the shift registers 52SR, and the shift registers are sequentially selected. The selected shift register 52SR transmits corresponding one of the scan signals ST(k), ST(k+1), ST(k+2), ST(k+3) . . . to corresponding one of AND circuits 54 of the drive unit 530. When the selected shift register 52SR supplies, for example, a high-level signal as a k+2th scan signal ST(k+2) to a k+2th drive unit 53(k+2), the touch detection scanning unit 52 is configured so that the drive unit 53(k+2) applies the drive signal VcomAC to the drive electrodes COML belonging to a k+2th drive electrode block B(k+2). Hereinafter, when any one of the scan signals ST(k), ST(k+1), ST(k+2), ST(k+3) . . . is indicated, a scan signal ST may be used.

The drive unit 530 is a circuit that applies the display drive voltage VcomDC or the touch drive signal VcomAC supplied from the drive signal generating unit 14Q to the drive electrode COML based on the scan signal ST supplied from the touch detection scanning unit 52 and the drive electrode selection signal VCOMSEL supplied from the scanning control unit 51. The drive unit 53 is provided corresponding to each output signal of the touch detection scanning unit 52, and applies the drive signal Vcom to a corresponding drive electrode block B.

The drive unit 53 includes the AND circuit 54 and one selection switch SW1 (SW2, SW3, SW4) for each drive electrode block B. The AND circuit 54 generates and outputs a logical product (AND) of the scan signal ST supplied from the touch detection scanning unit 52 and the drive electrode selection signal VCOMSEL supplied from the scanning control unit 51. The AND circuit 54 has a buffer function of amplifying operation of the selection switch SW1 (SW2, SW3, SW4) to an amplitude level at which the operation can be controlled. The operation of the selection switch SW1 is controlled based on the signal supplied from the AND circuit 54. One end of the selection switch SW1 is coupled to the drive electrodes COML included in the drive electrode block B and the other end of the selection switch SW1 is coupled to either one of the display wiring LDC and the touch wiring LAC.

With this structure, when the scan signal ST is at a high level and the drive electrode selection signal VCOMSEL is at a high level, the drive unit 53 outputs the touch drive signal VcomAC as the drive signal Vcom. When the scan signal ST is at a low level or the drive electrode selection signal VCOMSEL is at a low level, the drive unit 53 separates the drive electrode block B from the touch wiring LAC and couples the drive electrode block B to the display wiring LDC. The drive electrode block B selected as an output destination of the touch drive signal VcomAC is a selected drive electrode block STX. The drive electrode block B not selected as an output destination of the touch drive signal VcomAC is a non-selected drive electrode block NTX. For example, the drive unit 53(k+2) illustrated in FIG. 22 applies the drive signal VcomAC to the drive electrodes COML belonging to the k+2th drive electrode block B(k+2), and therefore the selected drive electrode block STX is the drive electrode block B(k+2). Drive electrode blocks B(k), B(k+1), and B(k+3) which are not selected as output destinations of the drive signal VcomAC are non-selected drive electrode blocks NTX.

When the liquid crystal display unit 20 is performing display operation, the scan signal ST is at the low level, and the drive unit 53 couples one selection switch SW1 (SW2, SW3, SW4) to the display wiring LDC for each drive electrode block B, and outputs the display drive voltage VcomDC as the drive signal Vcom.

Figure 23:
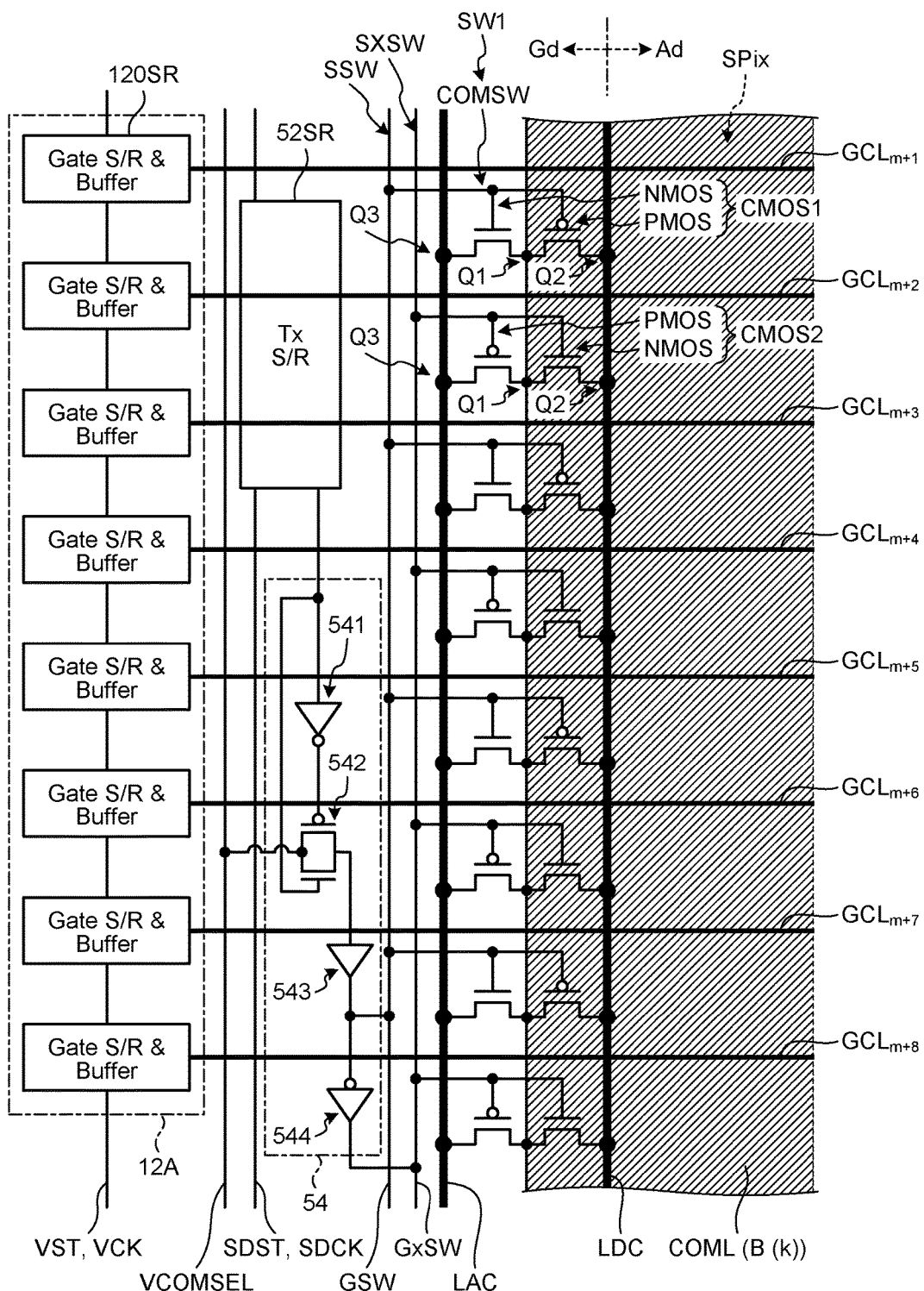
FIG. 23 is a block diagram of a drive unit of the drive electrode driver according to the first embodiment.
Figure 24:
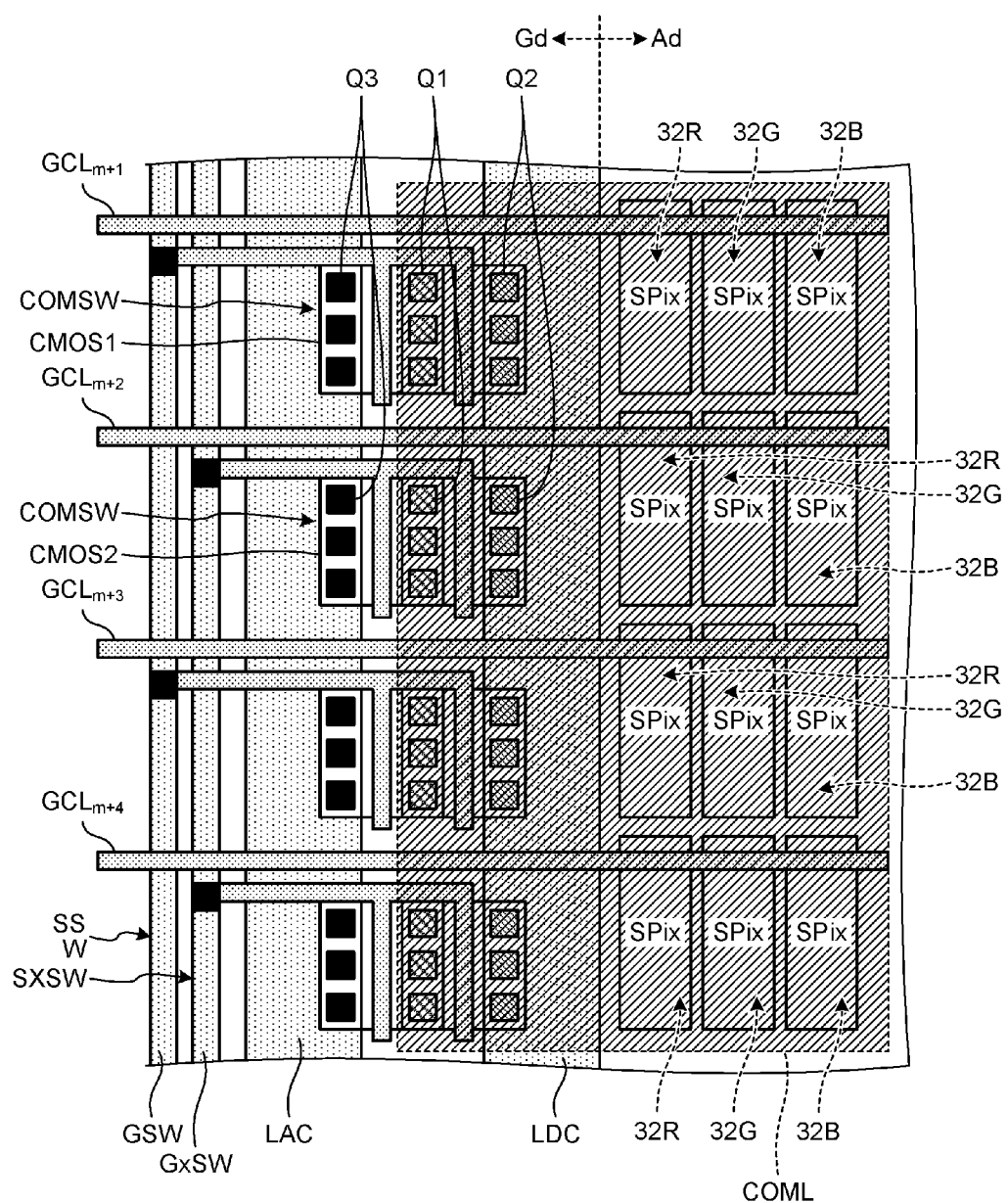
FIG. 24 is a block diagram of an arrangement example of selection switches of the drive electrode driver according to the first embodiment.

FIG. 23 is a block diagram of a drive unit of the drive electrode driver according to the first embodiment. FIG. 24 is a block diagram of an arrangement example of selection switches of the drive electrode driver according to the first embodiment. FIG. 23 and FIG. 24 describe a configuration of the first gate driver 12A; however, the second gate driver 12B and the gate driver 100D have the similar configuration. In the following, although the selection switch SW1 will be explained as a typical one, the selection switches SW2, SW3, and SW4 have the similar configuration. The first gate driver 12A includes gate shift registers 120SR. The gate shift registers 120SR start operation in response to the vertical start pulse VST to be sequentially selected in the vertical scanning direction in synchronization with the vertical clock VCK, and the selected gate shift register 120SR outputs a vertical selection pulse to a corresponding one of the scan lines GCL via the buffer circuit.

The selection switch SW1 includes a plurality of switches COMSW which are provided for each drive electrode COML. All the switches COMSW operate for each drive electrode COML according to switch control signals Ssw and Sxsw. All the switches COMSW operate for each drive electrode COML, and thereby time-divisionally select either one of coupling between the touch wiring LAC and the drive electrode COML and coupling between the display wiring LDC and the drive electrode COML.

When the switch COMSW has, for example, a CMOS switch CMOS1 and a CMOS switch CMOS2 which are formed as a unit of circuit, a plurality of units of circuits are provided for each drive electrode COML. Each of the CMOS switch CMOS1 and the CMOS switch CMOS2 includes a transistor NMOS having an N-channel gate and a transistor PMOS having a P-channel gate.

In the CMOS switch CMOS1, a switch signal line GSW is coupled to gates of the transistor NMOS and the transistor PMOS. In the CMOS switch CMOS2, a switch signal line GxSW is coupled to gates of the transistor NMOS and the transistor PMOS. A switch control signal Ssw supplied to the switch signal line GSW and a switch control signal Sxsw supplied to the switch signal line GxSW are signals between which the high level and the low level of potential are inverted each other. Therefore, the CMOS switch CMOS1 and the CMOS switch CMOS2 are synchronize with either one of coupling between the touch wiring LAC and the drive electrode COML and coupling between the display wiring LDC and the drive electrode COML, and can thereby perform the same selection. In this way, the selection switch SW1 includes the switches COMSW for each drive electrode COML, and the switches COMSW are coupled in parallel to each other between the touch wiring LAC and the drive electrode COML. All the switches COMSW operate for each drive electrode COML according to the switch control signal Ssw or Sxsw being the selection signal, couple the touch wiring LAC to the drive electrode COML, and apply the touch drive signal VcomAC.

The AND circuit 54 includes an inverter 541, a switching circuit 542, a buffer 543, and an inverter 544. The inverter 541 outputs an inverted logic of an output signal from a transfer stage selected of the shift registers 52SR for drive electrode, when the scan signal ST is at the high level, to the switching circuit 542. The switching circuit 542 switches the an input and an output of the inverter 541 according to the drive electrode selection signal VCOMSEL to output the switch control signal Ssw to the buffer 543. The buffer 543 amplifies the switch control signal Ssw, and supplies the amplified signal to the switch signal line GSW. The inverter 544 generates an inverted logic of the switch control signal Ssw output by the buffer 543, outputs the inverted logic as the switch control signal Sxsw, and supplies the switch control signal Sxsw to the switch signal line GxSW.

The CMOS switches CMOS1 and CMOS2 are coupled to the touch wiring LAC by respective coupling conductors Q3. The CMOS switches CMOS1 and CMOS2 are coupled to the display wiring LDC by respective coupling conductors Q2. The CMOS switches CMOS1 and CMOS2 are coupled to the drive electrodes COML by respective coupling conductors Q1. The switch control signal Ssw or Sxsw is input to the gates of the transistors NMOS and the transistors PMOS, which enables the CMOS switches CMOS1 and CMOS2 to select either one of coupling between the coupling conductor Q1 and the coupling conductor Q2 and coupling between the coupling conductor Q3 and the coupling conductor Q1.

As illustrated in FIG. 24, the scan line GCL is wired in the same layer as that of the switch signal lines GSW and GxSW. The scan line GCL is a gate line of the transistor in the same manner as that of the switch signal lines GSW and GxSW, and is formed in the same process, so that the manufacturing process can be reduced. The scan line GCL three-dimensionally intersects the touch wiring LAC and the display wiring LDC via the insulating layer. The selection switch SW1 is disposed in an area between scan lines GCL (e.g., between the scan line $GCL_{m+1}$ and the scan line $GCL_{m+2}$) that three-dimensionally intersect the touch wiring LAC (display wiring LDC). A distance between the scan lines GCL that three-dimensionally intersect the touch wiring LAC (display wiring LDC) is the same as a distance between adjacent scan lines GCL in the display area Ad.

Basic Principle of Self-Capacitance Type Touch Detection

Figure 25:
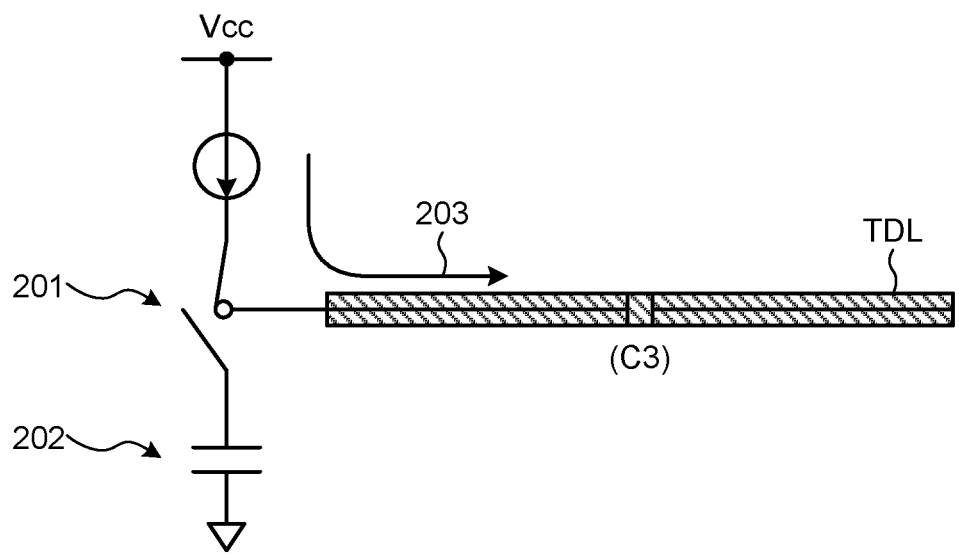
FIG. 25 is an explanatory diagram for explaining a basic principle of self-capacitance type touch detection and illustrating a state where a finger is not in contact with or in proximity to the device.
Figure 26:
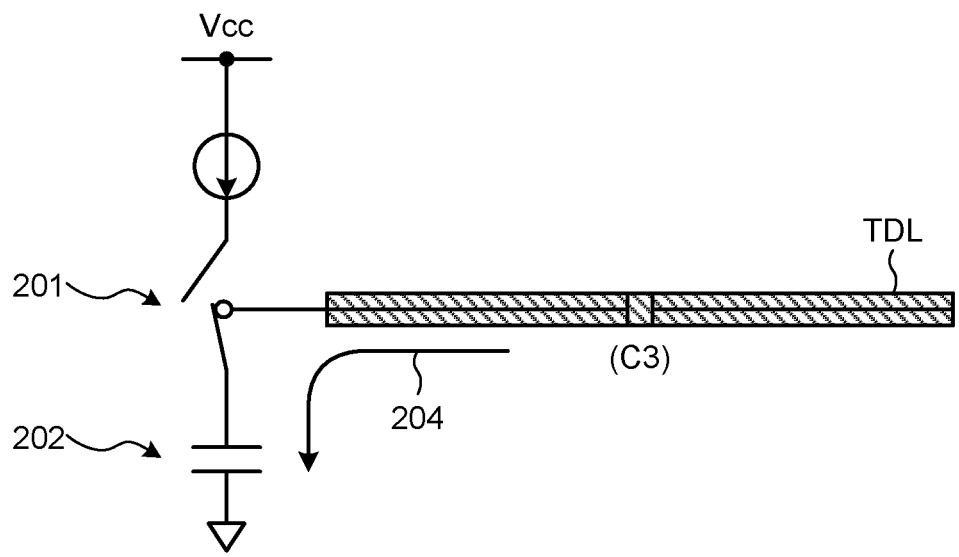
FIG. 26 is an explanatory diagram for explaining a basic principle of the self-capacitance type touch detection and illustrating a state where a finger is not in contact with or in proximity to the device.
Figure 27:
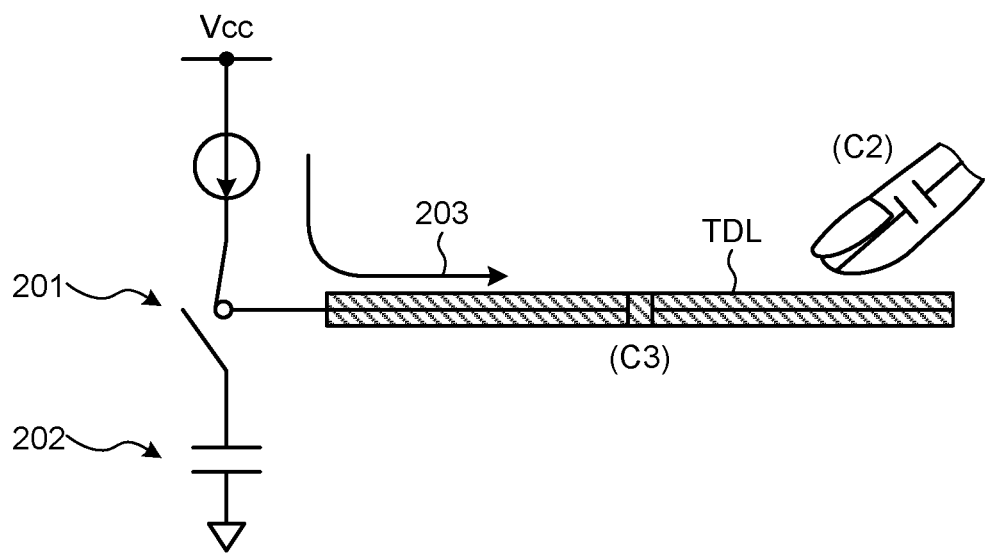
FIG. 27 is an explanatory diagram for explaining a basic principle of the self-capacitance type touch detection and illustrating a state where a finger is in contact with or in proximity to the device.
Figure 28:
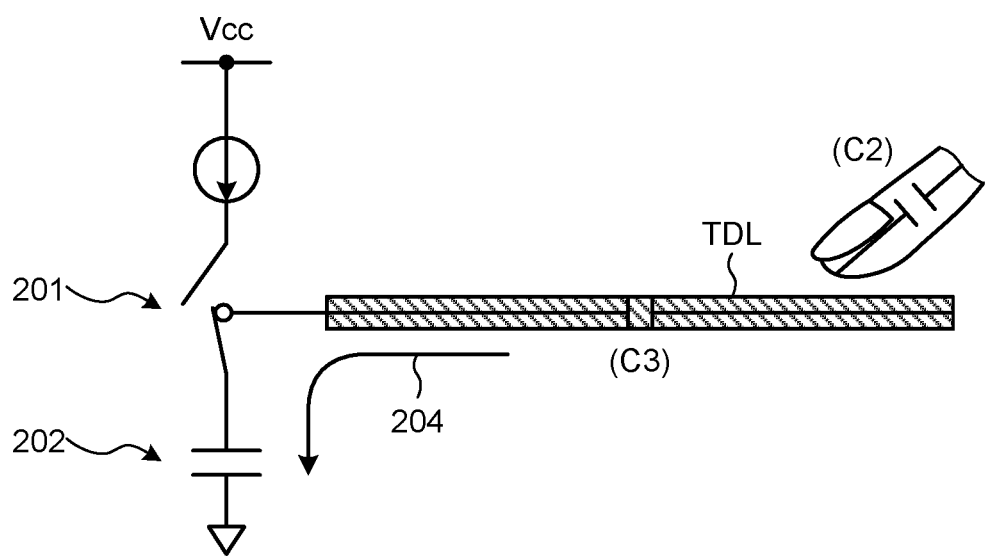
FIG. 28 is an explanatory diagram for explaining a basic principle of the self-capacitance type touch detection and illustrating a state where a finger is in contact with or in proximity to the device.
Figure 29:
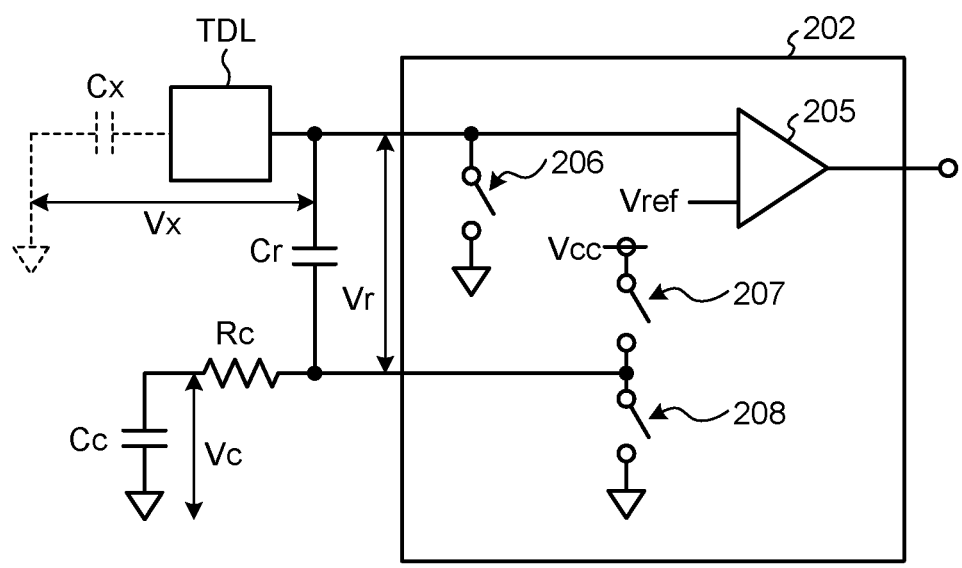
FIG. 29 is an explanatory diagram illustrating a detection circuit.
Figure 30:
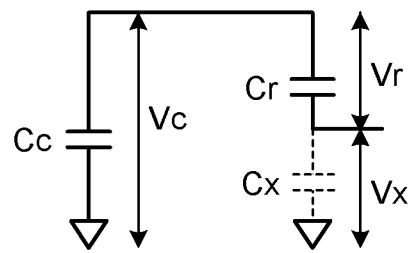
FIG. 30 is an explanatory diagram illustrating an equivalent circuit of the detection circuit in FIG. 29.
Figure 31:
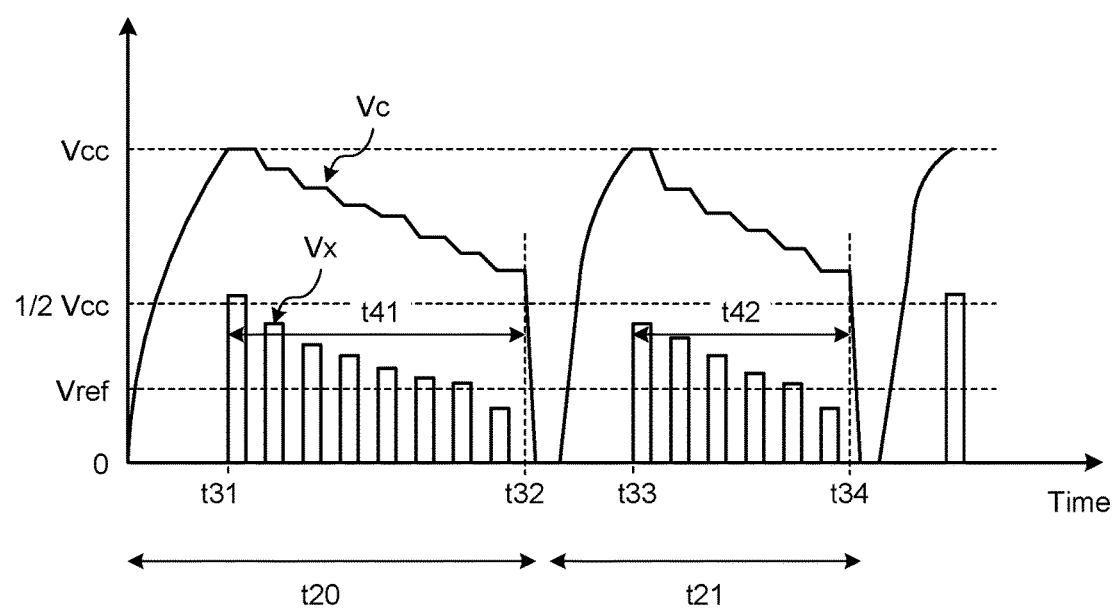
FIG. 31 is a diagram of an example of waveforms of the detection circuit in FIG. 29.

The touch-detection controller 100 operates in the sleep mode based on the basic principle of the self-capacitance type touch detection to detect the presence or absence of a touch. The basic principle of the self-capacitance type touch detection in the display device with a touch detection function 1 will be explained below with reference to FIG. 25 to FIG. 31. FIG. 25 and FIG. 26 are explanatory diagrams for explaining the basic principle of the self-capacitance type touch detection and illustrating a state where a finger is not in contact with or in proximity to the device. FIG. 27 and FIG. 28 are explanatory diagrams for explaining the basic principle of the self-capacitance type touch detection and illustrating a state where a finger is not in contact with or in proximity to the device. FIG. 29 is an explanatory diagram illustrating a detection circuit. FIG. 30 is an explanatory diagram illustrating an equivalent circuit of the detection circuit in FIG. 29. FIG. 31 is a diagram of an example of waveforms of the detection circuit in FIG. 29.

First of all, as illustrated in FIG. 25, the touch detection electrode TDL is coupled to the power supply voltage Vcc by a switch 201. The touch detection electrode TDL has a capacitance C3, and electric charge flows from the power supply voltage Vcc to the touch detection electrode TDL in a direction of arrow 203, and the touch detection electrode TDL is charged with electric charge according to the capacitance C3.

Subsequently, as illustrated in FIG. 26, the touch detection electrode TDL is coupled to a detection circuit 202 by the switch 201, and the electric charge charged to the touch detection electrode TDL flows to the detection circuit 202 in a direction of arrow 204. The detection circuit 202 measures the electric charge flowed from the touch detection electrode TDL to thereby enable detection of the capacitance C3 in the touch detection electrode TDL.

A case in which the finger is in contact with or in proximity to the touch detection electrode TDL will be explained next. As illustrated in FIG. 27, when the finger comes in contact with or in proximity to the touch detection electrode TDL, the capacitance C2 of the finger is added to the capacitance C3 of the touch detection electrode TDL. Therefore, when the touch detection electrode TDL is coupled to the power supply voltage Vcc by the switch 201, the electric charge flows from the power supply voltage Vcc to the touch detection electrode TDL in the direction of the arrow 203, and the touch detection electrode TDL and the finger are charged with electric charge according to the capacitances C3 and C2.

Subsequently, as illustrated in FIG. 28, the touch detection electrode TDL is coupled to the detection circuit 202 by the switch 201, and the electric charge charged to the touch detection electrode TDL and the finger flows to the detection circuit 202 in the direction of the arrow 204. The detection circuit 202 measures the electric charge flowed from the touch detection electrode TDL and the finger to thereby enable detection of the capacitances of the touch detection electrode TDL and the finger.

FIG. 29 is an explanatory diagram illustrating the detection circuit. A measurement procedure of a capacitance Cx of the touch detection electrode TDL will be explained below with reference to FIG. 29.

Step 1: First of all, a switch 207 is tuned on and switches 206 and 208 are tuned off, a series circuit of a resistor Rc and a capacitor Cc is coupled to a point between the power supply voltage Vcc and a ground potential, and electric charge is charged to the capacitor Cc.

Step 2: Then, all the switches 206 to 208 are switched off. The electric charge of the capacitor Cc is maintained.

Step 3: The switches 206 and 208 are on for a given period of time, and a coupling point between a capacitor Cx and a capacitor Cr and a coupling point between the capacitor Cr and the resistor Rc are grounded. The electric charge of the capacitor Cc is partially discharged via the resistor Rc while all the electric charge of the capacitors Cx and Cr are discharged.

Step 4: All the switches 206 to 208 are switched off. The electric charge of the capacitor Cc is moved to the capacitors Cx and Cr.

Step 5: A comparator 205 compares an inter-terminal voltage Vx of the capacitor Cx with a reference voltage Vref. As illustrated in FIG. 30, an inter-terminal voltage Vc of the capacitor Cc at this time is a sum of an inter-terminal voltage Vr of the capacitor Cr and the inter-terminal voltage Vx of the capacitor Cx.

Respective relationships between the voltages Vc, Vr, and Vx and capacitances Cc, Cr, and Cx can be expressed in the following equations.

$$Vc=Vr+Vx \quad (1)$$

$$Vr:Vx=1/Cr:1/Cx \quad (2)$$

$$Vx=Cr/(Cr+Cx)\times Vc \quad (3)$$

The steps 3 to 5 are repeatedly executed until Vx<Vref. As illustrated in the equation (3), when the finger comes in contact with or in proximity to the touch detection electrode TDL and the capacitance Cx is thereby increased, the number of discharge cycles (number of repeats) until the condition Vx<Vref is satisfied is reduced. Touch/non-touch of the finger can be determined by the number of discharge cycles.

In FIG. 31, a time period t20 is a time period during which the finger is not in contact with or in proximity to the touch detection electrode TDL, and a time period t21 is a time period during which the finger is in contact with or in proximity to the touch detection electrode TDL. Moreover, in FIG. 31, a bar graph indicates the voltage Vx and a line graph indicates the voltage Vc.

The voltage Vc gradually lowers in association with repetition of the steps 3 to 5. The voltage Vx is expressed by the equation (3).

When the finger comes in contact with or in proximity to the touch detection electrode TDL and the capacitance Cx is thereby increased, the number of discharge cycles (number of repeats) to reach Vx<Vref is reduced.

When the finger is not in contact with or in proximity to the touch detection electrode TDL, the number of discharge cycles (number of repeats) in a time period t41 from a measurement start time t31 to a time t32 at which Vx<Vref is obtained is eight times. Meanwhile, when the finger is in contact with or in proximity to the touch detection electrode TDL, the number of discharge cycles (number of repeats) in a time period t42 from a measurement start time t33 to a time t34 at which Vx<Vref is obtained is six times.

In this way, the detection circuit 202 counts the number of discharge cycles (number of repeats) up to Vx<Vref, and can thereby determine whether the finger is in contact with or in proximity to the touch detection electrode TDL.

Here, the TFT substrate 21 corresponds to a specific example of "substrate" according to the present disclosure. The pixel electrode 22 corresponds to a specific example of "pixel electrode" according to the present disclosure. The pixel signal line SGL corresponds to a specific example of "pixel signal line" according to the present disclosure. The drive electrode COML corresponds to a specific example of "drive electrode" according to the present disclosure. The liquid crystal element LC corresponds to a specific example of "display function layer" according to the present disclosure. The gate drivers 12 and 100D, the source driver 13, and the drive electrode driver 14 correspond to a specific example of "control device" according to the present disclosure. The touch detection electrode TDL corresponds to "touch detection electrode" according to the present disclosure. The touch-detection controller 100 corresponds to a specific example of "touch-detection controller" according to the present disclosure.

Operation and Action

Operation and action of the display device with a touch detection function 1 according to the first embodiment will be explained below. In the following explanation, the drive signal Vcom being a drive signal for display is described as the display drive voltage VcomDC, and the drive signal Vcom being a touch drive signal detection is described as the touch drive signal VcomAC.

Overview of Entire Operation

First of all, an overview of an entire operation of the display device with a touch detection function 1 will be explained below with reference to FIG. 1. The control unit 11 supplies a control signal to the gate driver 12, the source driver 13, the drive electrode driver 14, and the touch detection unit 40 based on the video signal Vdisp supplied from an application processor (host CPU) and controls so that these units operate in synchronization with one another. The memory 11a of the control unit 11 writes the video signal Vdisp supplied from the application processor in synchronization with a vertical synchronization signal Vsync and a horizontal synchronization signal Hsync which are also supplied from the application processor. The memory 11a reads the written data in synchronization with an internal clock of the display device with a touch detection function 1 at a speed higher than that of the write.

The gate driver 12 supplies the scan signal Vscan to the liquid crystal display unit 20 and sequentially selects one horizontal line targeted for display drive. The source driver 13 generates a pixel signal Vsig in which pixel signals Vpix are multiplexed and a corresponding switch control signal Vsel, and supplies the generated signals to the source selector 13S. The source selector 13S separates and generates the pixel signals Vpix based on the pixel signal Vsig and the switch control signal Vsel, and supplies each of the pixel signals Vpix to each of the pixels Pix that form one horizontal line. The drive electrode driver 14 applies the display drive voltage VcomDC to all the drive electrodes COML in the display period Pd. The drive electrode driver 14 also applies the touch drive signal detection VcomAC to the drive electrodes COML belonging to the partial detection region RT targeted for touch detection operation and applies the display drive voltage VcomDC to the other drive electrodes COML in the touch detection period Pt. The display unit with a touch detection function 10 performs display operation in the display period Pd, also performs touch detection operation in the touch detection period Pt, and outputs the touch detection signal Vdet from the touch detection electrode TDL.

The touch detection unit 40 detects a touch on the touch detection surface based on the touch detection signal Vdet. Specifically, the amplifier 42 removes a high frequency component (noise component) contained in the touch detection signal Vdet, extracts a touch component, and outputs the touch component. The A/D convertor 43 converts the analog signal output from the amplifier 42 into a digital signal. The signal processor 44 detects the presence or absence of a touch performed on the touch detection surface based on the output signal of the A/D convertor 43. When the presence of a touch is detected by the signal processor 44, the coordinate extractor 45 calculates touch panel coordinates of the touch. The detection-timing controller 46 controls so that the amplifier 42, the A/D convertor 43, the signal processor 44, and the coordinate extractor 45 operate in synchronization with one another.

Detailed Operation

The operation of the display device with a touch detection function 1 will be explained in detail below with reference to some of the drawings.

Figure 32:
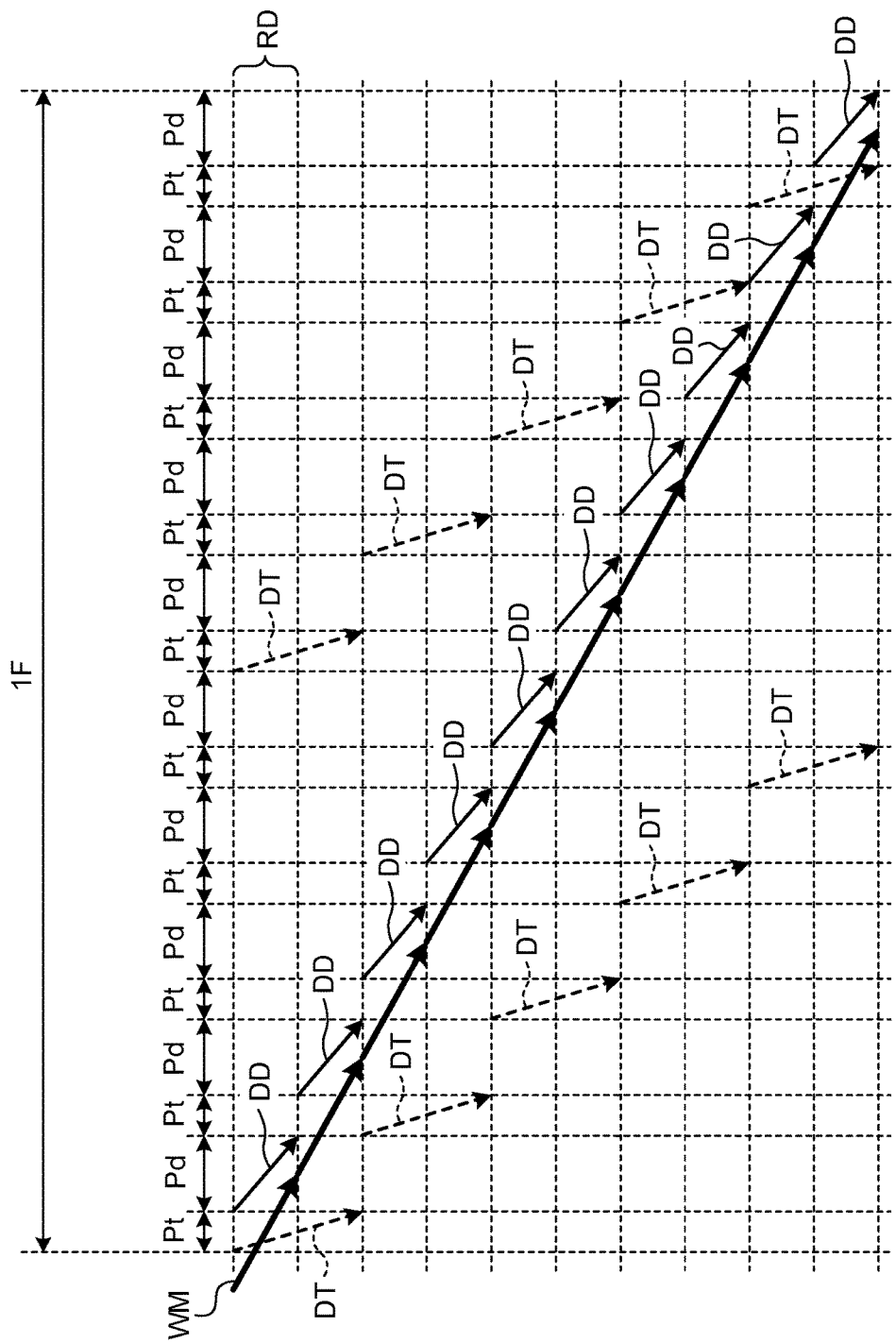
FIG. 32 is a diagram schematically illustrating operation of the display device with a touch detection function in one frame period (1F)

FIG. 32 is a diagram schematically illustrating operation of the display device with a touch detection function in one frame period (1F). In FIG. 32, the horizontal axis represents a time and the vertical axis represents a position on the display screen in the vertical direction. A vertical blanking period is omitted in FIG. 32.

Figure 33:
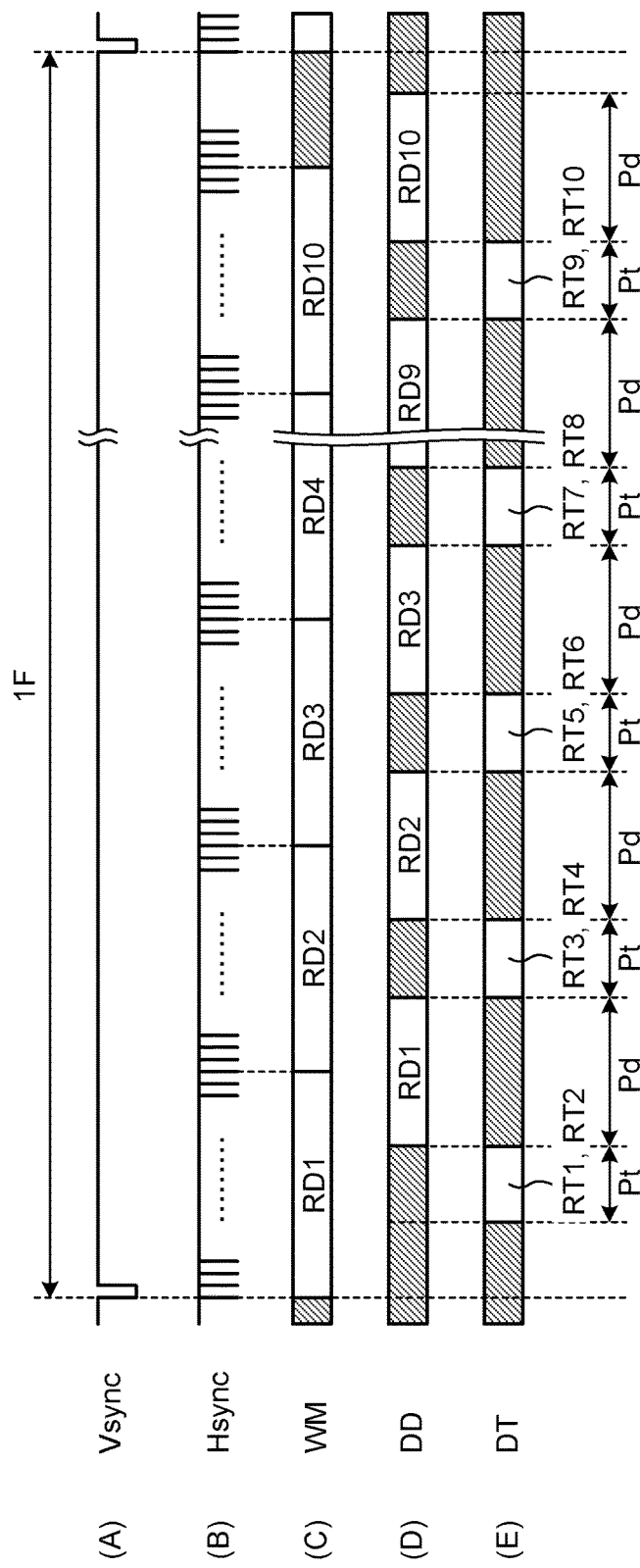
FIG. 33 is a timing chart of operation of the display device with a touch detection function.

FIG. 33 is a timing chart of operation of the display device with a touch detection function, where (A) represents a waveform of the vertical synchronization signal Vsync, (B) represents a waveform of the horizontal synchronization signal Hsync, (C) represents a partial display region RD in which video information written by memory write WM is displayed, (D) represents a partial display region RD targeted for display drive DD, and (E) represents a partial detection region RT targeted for touch detection drive DT.

In this example, 10 touch detection periods Pt and 10 display periods Pd are alternately provided in one frame period (1F). In the display panel with a touch detection function 10, the touch detection drive DT is performed in the touch detection periods Pt and the display drive DD is performed in the display periods Pd.

The memory 11a sequentially writes data of one-tenth of the video information for one frame by each one horizontal line (memory write WM) based on the video signal Vdisp, the vertical synchronization signal Vsync, and the horizontal synchronization signal Hsync which are supplied from the application processor. The memory 11a then sequentially writes subsequent data for one-tenth thereof by each one horizontal line while overwriting the previous data for one-tenth thereof. The memory 11a sequentially reads the written data by each one horizontal line at a speed higher than that of the write before the written data is erased by being overwritten. The gate driver 12 and the source driver 13 then drive the partial display regions RD of the liquid crystal display unit 20 through line-sequential scanning based on the read data (display drive DD).

In this way, the display device with a touch detection function is configured so that the memory 11a sequentially reads the written data by each one horizontal line at a speed higher than that of the write and the display drive DD is performed based on the read data. In other words, duration of the display period Pd in which the display drive DD is performed is shorter than the time in which the memory 11a writes the data of one-tenth of the video information for one frame. The display device with a touch detection function uses the time (touch detection period Pt) ensured by making the display period Pd shorter in this way to perform the touch detection drive DT in each partial detection region RT.

In this example as illustrated in FIG. 32, for the touch detection drive DT, two partial detection regions RT are sequentially selected as a target to be driven in each touch detection period Pt. That is, in this example, touch detection scanning over the touch detection surface is performed at a scanning speed twice as high as that of display scanning. In other words, the display device with a touch detection function can perform the touch detection scanning twice while performing the display scanning once. In this way, the display device with a touch detection function frequently performs the touch detection scanning and can thereby immediately respond to a touch by an external proximity object, thus improving response characteristics to the touch.

Operation in Normal Operation Mode

Operation in the normal operation mode of the display device with a touch detection function 1, i.e., display operation in the display period Pd and touch detection operation in the touch detection period Pt will be explained next.

Figure 34:
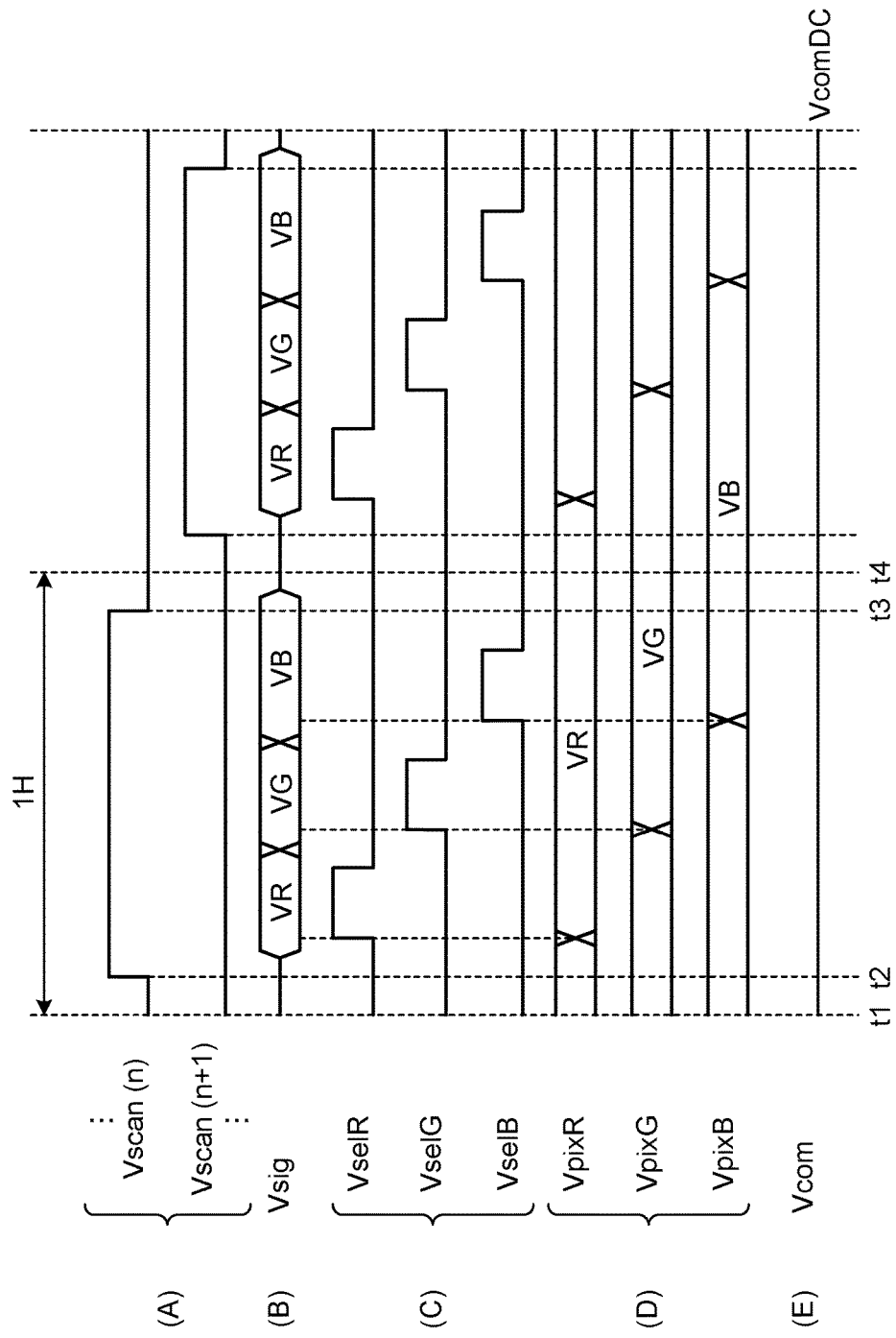
FIG. 34 is a timing chart of display operation of the display device with a touch detection function.

FIG. 34 is a timing chart of display operation of the display device with a touch detection function, where (A) represents a waveform of the scan signal Vscan, (B) represents a waveform of the image signal Vsig, (C) represents a waveform of the switch control signal Vsel, (D) represents a waveform of the pixel signal Vpix, and (E) represents a waveform of the drive signal Vcom.

The display device with a touch detection function 1 is configured so that, in the display period Pd, the drive electrode driver 14 applies the display drive voltage VcomDC to all the drive electrodes COML ((E) in FIG. 34), and the gate driver 12 sequentially applies the scan signal Vscan to the scan line GCL in each one horizontal period (1H) to thereby perform display scanning. Details thereof are explained below.

After the one horizontal period (1H) is started at a timing t1, at a timing t2, the gate driver 12 applies the scan signal Vscan to an n-th scan line GCL (n) related to the display operation, and the scan signal Vscan (n) changes from a low level to a high level ((A) in FIG. 34). Thereby the gate driver 12 selects one horizontal line targeted for display operation.

Then, the source driver 13 supplies a pixel voltage VR for a red sub-pixel SPix, as the image signal Vsig, to the source selector 13S ((B) in FIG. 34) and generates a switch control signal VselR that is changed to the high level in a period in which the pixel voltage VR is supplied ((C) in FIG. 34). The source selector 13S turns on a switch SWR in the period in which the switch control signal VselR becomes the high level, thereby separates the pixel voltage VR supplied from the source driver 13 from the image signal Vsig, and supplies the separated pixel voltage VR, as a pixel signal VpixR, to the red sub-pixel SPix via the pixel signal line SGL ((D) in FIG. 34). After the switch SWR becomes off state, the pixel signal line SGL is changed to a floating state, and therefore the voltage of the pixel signal line SGL is maintained ((D) in FIG. 34).

Likewise, the source driver 13 supplies a pixel voltage VG for a green sub-pixel SPix together with a corresponding switch control signal VselG to the source selector 13S ((B) and (C) in FIG. 34). The source selector 13S separates the pixel voltage VG from the image signal Vsig based on the switch control signal VselG and supplies the separated pixel voltage VG, as a pixel signal VpixG, to the green sub-pixel SPix via the pixel signal line SGL ((D) in FIG. 34).

Thereafter, similarly, the source driver 13 supplies a pixel voltage VB for a blue sub-pixel SPix together with a corresponding switch control signal VselB to the source selector 13S ((B) and (C) in FIG. 34). The source selector 13S separates the pixel voltage VB from the image signal Vsig based on the switch control signal VselB and supplies the separated pixel voltage VB, as a pixel signal VpixB, to the blue sub-pixel SPix via the pixel signal line SGL ((D) in FIG. 34).

Subsequently, at a timing t3, the gate driver 12 changes the scan signal Vscan (n) of the n-th scan signal line GCL from the high level to the low level ((A) in FIG. 34). Thereby the sub-pixels SPix in the one horizontal line related to the display operation are electrically disconnected from the pixel signal line SGL.

Then, at a timing t4, the one horizontal period (1H) is ended and a new one horizontal period (1H) is started, and display drive is performed on a next line (n+1th line).

From then on, the display device with a touch detection function 1 repeats the operation, so that the display operation in the partial display region RD is performed through line-sequential scanning in each display period Pd.

Figure 35:
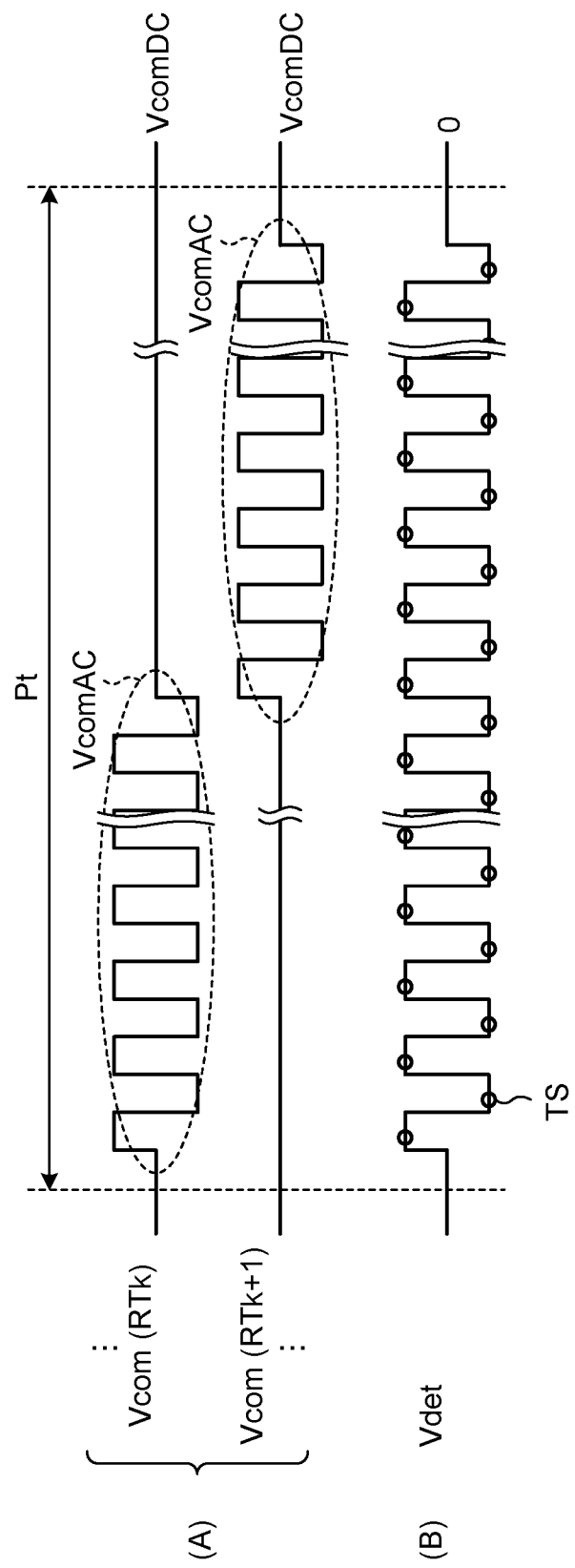
FIG. 35 is a timing chart of touch detection operation of the display device with a touch detection function.

FIG. 35 is a timing chart of touch detection operation of the display device with a touch detection function, where (A) represents a waveform of the drive signal Vcom, and (B) represents a waveform of the touch detection signal Vdet.

The drive electrode driver 14 sequentially supplies a touch drive signal VcomAC to two partial detection regions RTk and RTk+1 in the touch detection period Pt ((A) in FIG. 35). The touch drive signal VcomAC is transmitted to the touch detection electrode TDL via the capacitance, and the touch detection signal Vdet thereby changes ((B) in FIG. 35). The A/D convertor 43 performs A/D conversion on the output signal of the amplifier 42 to which the touch detection signal Vdet is input in a sampling timing is synchronized with the touch drive signal VcomAC ((B) in FIG. 35).

Thus, the display device with a touch detection function 1 performs the touch detection operation in the partial detection regions RTk and RTk+1 in each touch detection period Pt.

Timings of Memory Write WM and Display Drive DD

Timings of the memory write WM and the display drive DD will be explained next.

Figure 36:
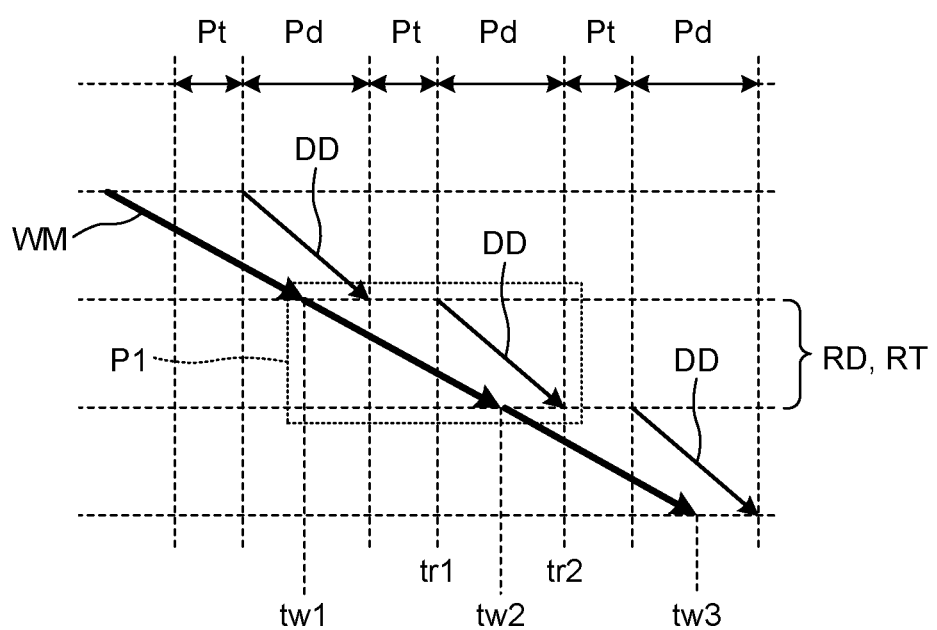
FIG. 36 is a timing chart of memory write and memory read in the display device with a touch detection function.

FIG. 36 is a timing chart of memory write WM and memory read (display drive DD) in the display device with a touch detection function. The memory 11a sequentially writes data of one-tenth of the video information for one frame by each one horizontal line (memory write WM). The memory 11a sequentially reads the written data by each one horizontal line before the data is erased by being overwritten. The display drive DD is performed based on the read data. In other words, the display drive DD corresponds to a read of data from the memory (memory read).

The display device with a touch detection function 1 sets the timings of the memory write WM and memory read (display drive DD) so that data can be safely read before the data written to the memory 11a is erased by being overwritten. Specifically, for example, the data in the top row of a portion P1 is written at a timing tw1, and is then erased by writing the next data at a timing tw2. Therefore, a timing tr1 of the memory read (display drive DD) of the data needs to be set in between the timing tw1 and the timing tw2. Moreover, for example, the data in the bottom row of the portion P1 is written at the timing tw2, and is then erased by writing the next data at a timing tw3. Therefore, a timing tr2 of the memory read (display drive DD) of the data needs to be set in between the timing tw2 and the timing tw3.

For example, the timing tr1 is preferably set near the midpoint between the timing tw1 and the timing tw2 in consideration of an operation timing margin. Likewise, the timing tr2 is preferably set near the midpoint between the timing tw2 and the timing tw3.

FIG. 37 is another timing chart of the memory write WM and the memory read (display drive DD) in the display device with a touch detection function, where (A) represents a case where a timing of the display drive DD is earlier, and (B) represents a case where a timing of the display drive DD is later.

As illustrated in (A) in FIG. 37, in the case where a timing of the display drive DD is earlier, for example, the data in the bottom row of the portion P1 is read at the timing tr2 right after the data is written at the timing tw2, and the timing margin is therefore reduced. On the other hand, as illustrated in (B) in FIG. 37, in the case where a timing of the display drive DD is later, for example, the data in the top row of the portion P2 is read at the timing tr1 right before the next data is written at the timing tw2, and the timing margin is therefore reduced as well.

Consequently, as illustrated in FIG. 36, the timings of the memory write WM and the display drive DD are preferably set so that the time from the timing tr1 to the timing tw2 is made substantially equal to the time from the timing tw2 to the timing tr2. This enables the timing margin to be increased.

Prevention of Malfunction in Touch Detection Operation

In the capacitive touch panel, noise (disturbance noise) caused by an inverter fluorescent lamp, an AM wave, an AC power supply, or so may be propagated to the touch panel, thereby causing a malfunction. The malfunction is caused by the fact that a signal (touch signal) related to the presence or absence of a touch cannot be discriminated from the disturbance noise. The display device with a touch detection function 1 can change the frequency of the touch drive signal VcomAC independently from the display drive, and can therefore suppress the malfunction. Details thereof are explained below.

Figure 38:
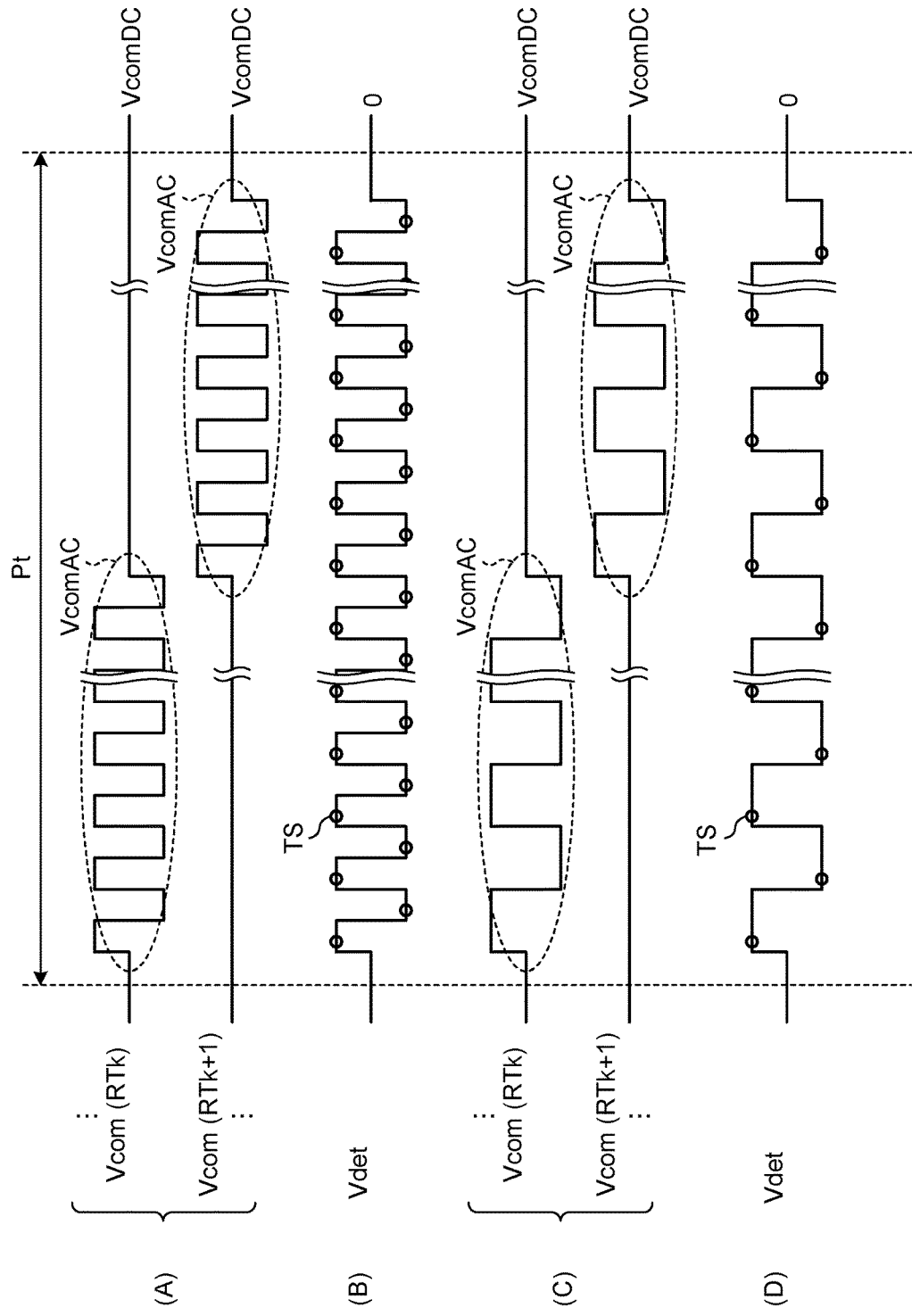
FIG. 38 is a timing chart of touch detection operation of the display device with a touch detection function.

(A) and (B) in FIG. 38 are timing charts of touch detection operation when the frequency of the touch drive signal VcomAC is high, and (C) and (D) in FIG. 38 are timing charts of touch detection operation when the frequency of the touch drive signal VcomAC is low. In FIG. 38, (A) and (C) represent waveforms of the drive signal Vcom, and (B) and (D) represent waveforms of the touch detection signal Vdet.

As illustrated in (A) and (C) in FIG. 38, the display device with a touch detection function 1 can changes the frequency of the touch drive signal VcomAC and also changes the sampling frequency in the A/D convertor 43. This enables reduction in the possibility of the malfunction in the touch detection operation caused by the disturbance noise.

In other words, when the frequency of the disturbance noise is around the integral multiple of a sampling frequency fs and the A/D conversion is performed on the disturbance noise by A/D convertor 43, the disturbance noise appears as so-called folding noise near a frequency 0. Thereby the folding noise is mixed with a touch signal near the frequency 0, and therefore the touch signal and the noise signal cannot be discriminated from each other. The display device with a touch detection function 1 can change the frequency of the touch drive signal VcomAC and the sampling frequency of the A/D convertor 43, and can therefore select a condition unaffected by the disturbance noise to perform touch detection.

In the display device with a touch detection function 1, the memory 11a reads the data of one-tenth of the written video information for one frame at a speed higher than that of the write to reduce the display period Pd, thereby ensuring the touch detection period Pt. The display device with a touch detection function 1 then effectively uses the touch detection period Pt ensured in the above manner to change the frequency of the touch drive signal VcomAC, thereby preventing the malfunction in the touch detection operation.

Operation in Sleep Mode

Figure 39:
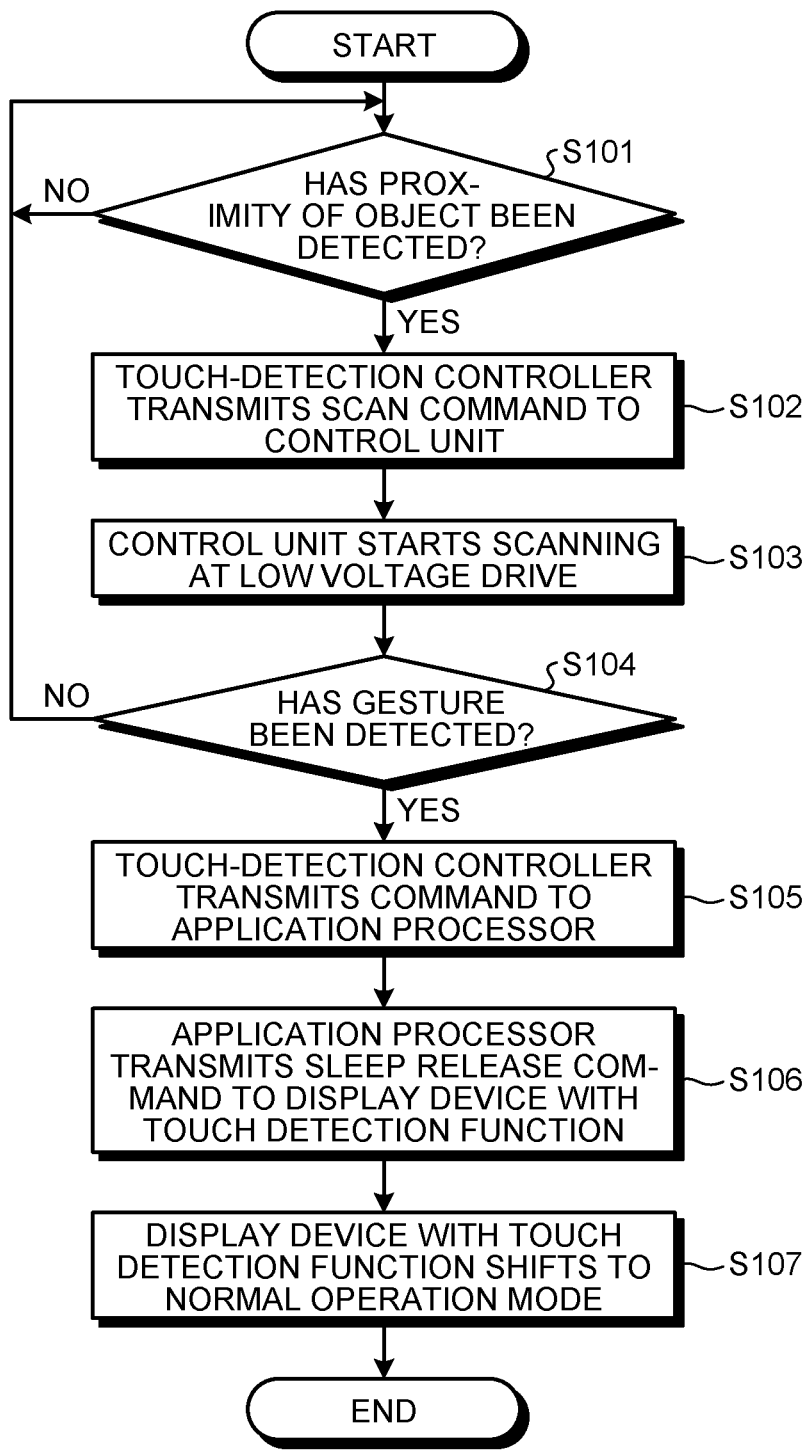
FIG. 39 is a flowchart of operation of the display device with a touch detection function in sleep mode.
Figure 40:
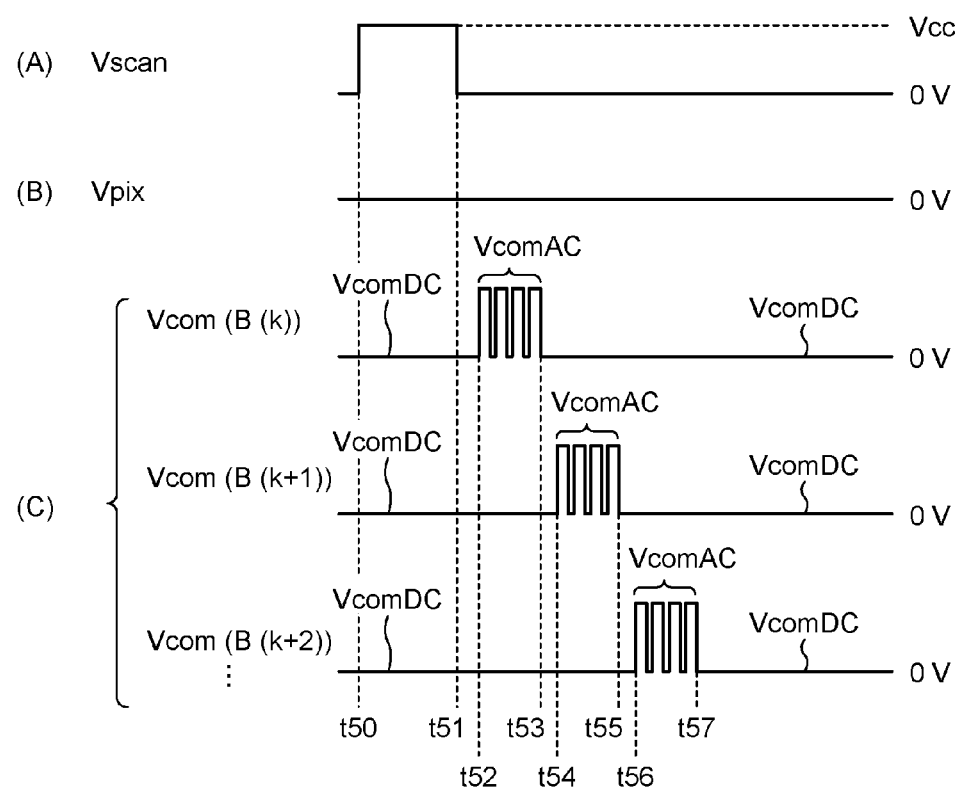
FIG. 40 is an explanatory diagram illustrating a timing waveform example of the display device with a touch detection function.

Operation of the display device with a touch detection function 1 in sleep mode will be explained next. FIG. 39 is a flowchart of operation of the display device with a touch detection function in sleep mode. FIG. 40 is an explanatory diagram illustrating a timing waveform example of the display device with a touch detection function. (A) illustrated in FIG. 40 represents a waveform of the scan signal Vscan. (B) illustrated in FIG. 40 represents a waveform of the pixel signal Vpix. (C) illustrated in FIG. 40 represents waveforms of the drive signals Vcom.

When the process illustrated in FIG. 39 is started, at first, the touch-detection controller 100 waits until proximity or contact of an object such as a finger with the touch detection electrode TDL is detected at Step S101. The touch-detection controller 100 can detect the proximity or contact of the object with the touch detection electrode TDL using the above-described self-capacitance method.

When the proximity or contact of the object with the touch detection electrode TDL is detected, then at Step S102, the touch-detection controller 100 transmits a scan command for scanning the drive electrodes COML of the display unit with a touch detection function 10 to the controller 100. The controller 100 that receives the scan command starts scanning, at Step S103, the drive electrodes COML of the display unit with a touch detection function 10 driven at a low voltage (power supply voltage Vcc). That is, the controller 100 operates the source driver 13, the drive electrode driver 14, and the gate driver 100D at the power supply voltage Vcc to start scanning the drive electrodes COML of the display unit with a touch detection function 10.

The reason that, at Step S103, the controller 100 operates the gate driver 100D instead of the gate driver 12 to scan the drive electrodes COML of the display unit with a touch detection function 10 is as follows. The gate driver 12 is a circuit that operates at the power supply voltage Vdd generated by the booster circuit 70 in order to operate the TFT elements Tr of the liquid crystal display unit 20 at a high speed and perform image display at a high speed. In the sleep mode, the booster circuit 70 preferably suspends its operation in order to reduce power consumption. The booster circuit 70 has a time lag of about hundreds of milliseconds from the start of the operation to the output of the power supply voltage Vdd. Therefore, if the controller 100 causes the booster circuit 70 to operate and also causes the gate driver 12 to operate so as to scan the drive electrodes COML of the display unit with a touch detection function 10, a time lag of about hundreds of milliseconds occurs. Therefore, the controller 100 operates the gate driver 100D that operates at the constantly supplied power supply voltage Vcc and scans the drive electrodes COML of the display unit with a touch detection function 10. This enables the display device with a touch detection function 1 to suppress the time lag in touch detection in the sleep mode.

Referring to FIG. 40, the gate driver 100D changes the scan signal Vscan from the low level to the high level at a timing t50 ((A) in FIG. 40). Before this operation, the source driver 13 sets the pixel signal Vpix to a predetermined value, e.g., 0V ((B) in FIG. 40). Thereby 0V is written to pixels Pix (sub-pixels SPix). More specifically, the pixel electrodes are is set to 0V. Thereafter, the gate driver 100D changes the scan signal Vscan from the high level to the low level at a timing t51 ((A) in FIG. 40). Thereby the values of the pixels Pix (sub-pixels SPix) are determined as 0V. More specifically, the potentials of the pixel electrodes 22 are determined as 0V.

Thereafter, the drive electrode driver 14 applies the touch drive signal VcomAC as a drive signal Vcom (B(k)) to the drive electrodes COML during timings t52 to t53, applies the touch drive signal VcomAC as a drive signal Vcom (B(k+1)) to the drive electrodes COML during timings t54 to t55, and applies the touch drive signal VcomAC as a drive signal Vcom (B(k+2)) to the drive electrodes COML during timings t56 to t57. The drive electrodes COML are thereby scanned, and the touch-detection controller 100 can detect coordinates of a touch or a gesture using the mutual capacitance method between the drive electrodes COML and the touch detection electrode TDL.

The reason that the pixel signal Vpix (herein, 0V) is written to the pixels Pix (sub-pixels SPix) at the timings t50 to t51 before the touch drive signal VcomAC as the drive signal Vcom is applied to the drive electrodes COML at the timings t52 to t57 is as follows. Because the image display is not performed in the sleep mode, the values of the pixels Pix (sub-pixels SPix) are undefined. More specifically, the potentials of the pixel electrodes 22 are undefined. When the touch drive signal VcomAC as the drive signal Vcom is applied to the drive electrodes COML in this state, an unexpected voltage is applied to the liquid crystal elements LC, and burn-in may thereby occur in the display unit with a touch detection function 10. The burn-in is temporary and therefore disappears after the elapse of a certain period of time. However, images may become difficult to see or an operator may feel a sense of incongruity until the burn-in disappears. Therefore, by writing the pixel signal Vpix (herein, 0V) to the pixels Pix (sub-pixels SPix) before the touch drive signal VcomAC as the drive signal Vcom is applied to the drive electrodes COML, the values of the pixels Pix (sub-pixels SPix) are stabilized, the potentials of the pixel electrodes 22 are stabilized, application of the unexpected voltage to the liquid crystal element LC is prevented, and occurrence of the burn-in can be prevented. This enables the display device with a touch detection function 1 to suppress the images from becoming difficult to see and the operator from feeling the sense of incongruity.

The pixel signal Vpix to be written to the pixels Pix (sub-pixels SPix) is not limited to 0V (low level), and therefore it may be a high level (power supply voltage Vcc) or may be an intermediate between the high level and the low level. For example, when the display unit with a touch detection function 10 is a normally white display unit, a high-level pixel signal Vpix is written to the pixels Pix (sub-pixels SPix), and the display screen of the display unit with a touch detection function 10 is thereby changed to black, which allows the operator to be difficult to feel a sense of incongruity. Alternatively, for example, when the display unit with a touch detection function 10 is a normally black display unit, a low-level pixel signal Vpix is written to the pixels Pix (sub-pixels SPix), and the display screen of the display unit with a touch detection function 10 will be black, which allows the operator to be difficult to feel a sense of incongruity.

Referring again to FIG. 39, the touch-detection controller 100 proceeds the process to Step S105 when a predetermined gesture (e.g., a swipe with a predetermined length in a predetermined direction) is detected at Step S104, and proceeds the process to Step S101 when a predetermined gesture is not detected.

When a predetermined gesture is detected at Step S104, then at Step S105, the touch-detection controller 100 transmits a command to the application processor. At Step S106, the application processor having received the command transmits a sleep release command to the display device with a touch detection function 1. More specifically, the application processor transmits the sleep release command to the control unit 11 of the display device with a touch detection function 1. The display device with a touch detection function 1 having received the sleep release command shifts from the sleep mode to the normal operation mode at Step S107. At this time, the control unit 11 of the display device with a touch detection function 1 starts the operation of the booster circuit 70 and the backlight. This enables the display device with a touch detection function 1 to perform image display.

Effects

As explained above, the display device with a touch detection function 1 according to the first embodiment writes the pixel signal Vpix to the pixels Pix (sub-pixels SPix) in the sleep mode before the touch drive signal VcomAC is applied to the drive electrodes COML, and thereby stabilizes the values of the pixels Pix (sub-pixels SPix) and stabilizes the potentials of the pixel electrodes 22. Thus, display device with a touch detection function 1 can prevent the unexpected voltage from being applied to the liquid crystal elements LC and the burn-in from occurring. This enables the display device with a touch detection function 1 to suppress the images from becoming difficult to see and the operator from feeling the sense of incongruity.

The display device with a touch detection function 1 operates the gate driver 100D that operates at the power supply voltage Vcc in the sleep mode to scan the drive electrodes COML of the display unit with a touch detection function 10. This enables the display device with a touch detection function 1 to suspend the booster circuit 70 and thereby reduce the power consumption and suppress the time lag in touch detection.

In the display panel with a touch detection function according to the first embodiment, the display wiring LDC for supplying the display drive voltage VcomDC to the drive electrodes COML and the touch wiring LAC for supplying the touch drive signal VcomAC to the drive electrodes COML are pulled around to frame areas. For example, in the liquid crystal display unit using the liquid crystal in the horizontal electric field mode such as FFS, the display function layer tends to operate more stably by arranging the display wirings LDC nearer to the pixels corresponding to the respective color areas 32R, 32G, and 32B. Therefore, the selection switch SW1 (SW2, SW3, SW4) is arranged between the touch wiring LAC and the display wiring LDC. The selection switch SW includes the coupling conductors Q1, Q2, and Q3 in a through hall having different layers. The selection switch SW1 (SW2, SW3, SW4) includes the switches COMSW provided for each drive electrode COML, and all the switches COMSW operate for each drive electrode COML according to the switch control signals Ssw and Sxsw to couple the touch wiring LAC and the drive electrode COML, and applies the touch drive signal VcomAC to the drive electrode COML. Thus, by increasing the number of coupling conductors Q1, Q2, and Q3 for supplying electric power, coupling resistance of the selection switch SW1 can be reduced.

The touch wiring LAC has a predetermined coupling resistance component of the selection switch SW1 and a parasitic capacitance of the drive electrodes COML belonging to the drive electrode block B supplied with the drive signal VcomAC via the touch wiring LAC. Therefore, in the drive electrode block B arranged in a position apart from the COG 19 (drive-signal generating unit), the transition time of a pulse of the drive signal VcomAC may become long. On the other hand, in the selection switch SW1 (SW2, SW3, SW4) according to the first embodiment, a plurality of CMOS switches CMOS1 of the switch COMSW and a plurality of CMOS switches CMOS2 of the switch COMSW are respectively provided for each drive electrode COML, and each units of the CMOS switches CMOS1 and each units of the CMOS switches CMOS2 are respectively coupled in parallel to each other between the touch wiring LAC and the drive electrode COML. Therefore, all the switches operate for each drive electrode COML according to the switch control signal as a selection signal to couple the touch wiring LAC and the drive electrode COML, so that the touch drive signal VcomAC can be applied thereto. The display device with a touch detection function 1 according to the first embodiment can then reduce the coupling resistance of the switch SW1. As a result, the display device with a touch detection function 1 according to the first embodiment can suppress the possibility that the transition time of a pulse of the drive signal VcomAC may become long in the drive electrode block B arranged near an end portion of the touch wiring LAC.

Comparative Example

Advantageous effects of the present embodiment will be explained next as compared with a display device with a touch detection function 1R according to a comparative example. The display device with a touch detection function 1R performs both of the display operation and the touch detection operation in one horizontal period (1H). The rest of the configuration is the same as these of the present embodiment (FIG. 1, etc.).

Figure 41:
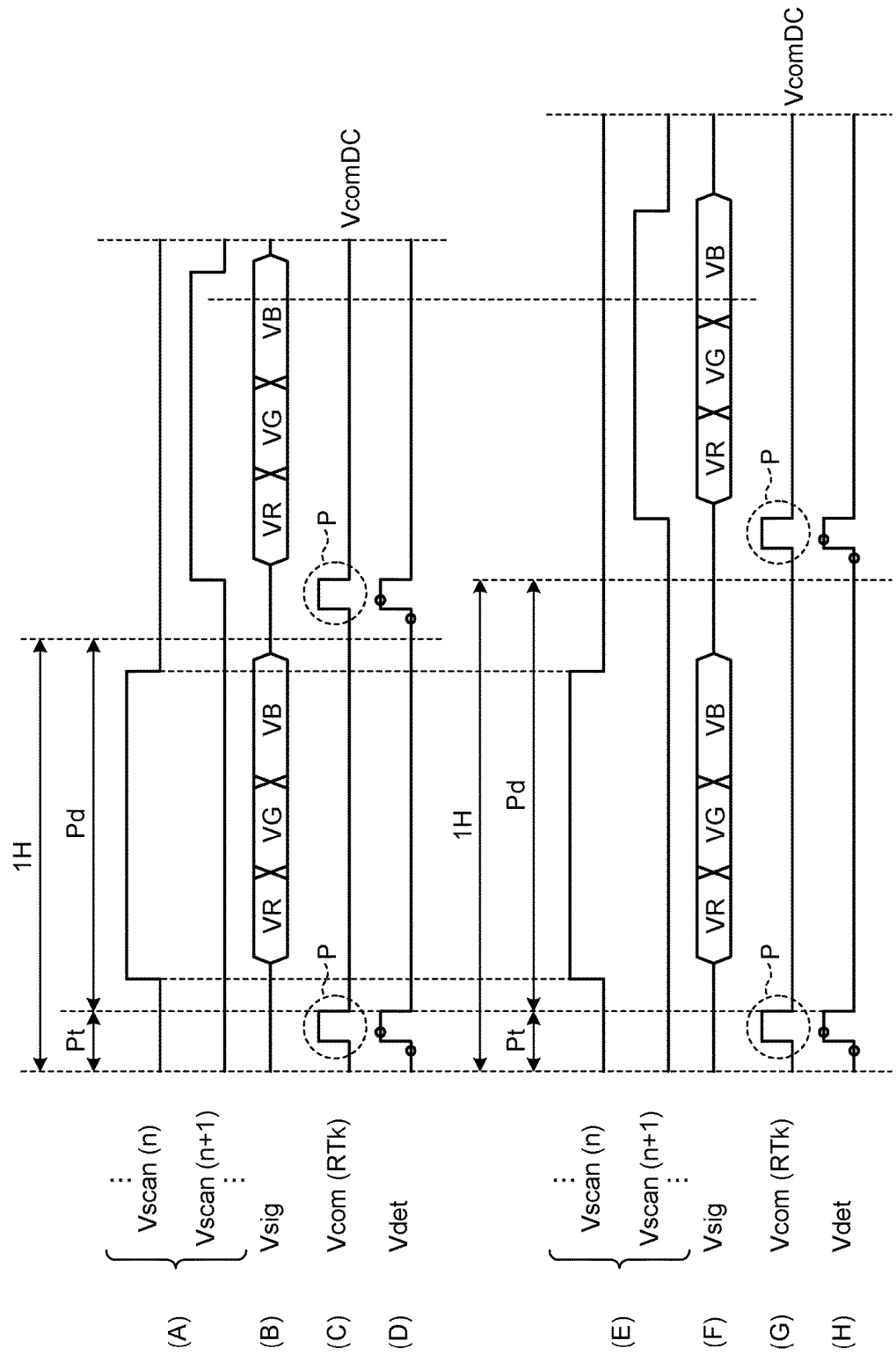
FIG. 41 is a timing chart of display operation and touch detection operation in a display device with a touch detection function according to a comparative example.

FIG. 41 is a timing chart of display operation and touch detection operation in the display device with a touch detection function according to the comparative example, where (A) to (D) represent a case in which the time of the horizontal period (1H) is made short, and (E) to (H) represent a case in which the time of the horizontal period (1H) is made long. In FIG. 41, (A) and (E) represent waveforms of the scan signal Vscan, (B) and (F) represent waveforms of the image signal Vsig, (C) and (G) represent waveforms of the drive signal Vcom, and (D) and (H) represent waveforms of the touch detection signal Vdet.

In the display device with a touch detection function 1R according to the present comparative example, the touch detection period Pt and the display period Pd are provided in one horizontal period (1H). In other words, the display device with a touch detection function 1R first performs the touch detection operation in the touch detection period Pt, and then performs the display operation in the display period Pd.

During the touch detection operation according to the present comparative example, first of all, the drive electrode driver 14 applies a pulse P to the drive electrodes COML belonging to the partial detection region RTk in the touch detection period Pt ((C) and (G) in FIG. 41). The pulse P transmits to the touch detection electrode TDL via the capacitance, and the touch detection signal Vdet thereby changes ((D) and (H) in FIG. 41). The A/D convertor 43 performs the A/D conversion on the output signal of the amplifier 42 to which the touch detection signal Vdet is input in the sampling timing is synchronized with the pulse P ((D) and (H) in FIG. 41). The display device with a touch detection function 1R thereby performs the touch detection operation in the partial detection region RTk. The display operation is the same as that of the display device with a touch detection function 1 according to the present embodiment.

As illustrated in FIG. 41, the display device with a touch detection function 1R according to the present comparative example changes the time of the one horizontal period (1H) and changes the sampling timing in the A/D convertor 43 in synchronization with the changed time, and can thereby reduce the risk of malfunction in the touch detection operation caused by disturbance noise. In this case, however, the timing of supplying the video signal to the display device with a touch detection function 1R is different from the actual display timing, and therefore a frame memory is required. In addition, because the time of the one horizontal period (1H) is changed, the display quality may decrease. Furthermore, because the time of the one horizontal period (1H) cannot be changed so much caused by restriction from the display operation, malfunction in the touch detection operation may not be sufficiently reduced.

Meanwhile, the display device with a touch detection function 1 according to the present embodiment is configured to perform display drive for each partial display region RD, and therefore the storage capacity of the memory 11a can be reduced to about a data amount in the partial display region RD.

The display device with a touch detection function 1 is configured to change the frequency of the touch drive signal VcomAC in the touch detection period Pt while keeping the time of the touch detection period Pt and the time of the display period Pd constant. Thereby the time of the one horizontal period (1H) in the display period Pd can be kept constant, thus possible decrease of the display quality can be reduced. The display device with a touch detection function 1 can easily and greatly change the frequency of the touch drive signal VcomAC without having constraint from the display operation, and can therefore reduce malfunction in the touch detection operation as compared with the case of the display device with a touch detection function 1R according to the present comparative example.

In other words, in the display device with a touch detection function 1R according to the present comparative example, the touch detection period Pt is provided in the one horizontal period (1H), and therefore the operation capable of being performed in the limited short period of time is limited. Put another way, the display device with a touch detection function 1R has low flexibility for the touch detection operation.

Meanwhile, in the display device with a touch detection function 1 according to the present embodiment, the memory 11a reads the written data of one-tenth of the video information for one frame at a speed higher than that of the write, so that the display period Pd is made shorter and the touch detection period Pt is thereby ensured. That is, the display device with a touch detection function 1 can ensure a large block of time for the touch detection operation, and therefore the flexibility for the touch detection operation can be increased.

As explained above, the present embodiment is configured to perform display drive for each partial display region, which enables to suppress the storage capacity of the memory to be low.

The present embodiment is also configured to read data from the memory at a speed higher than a data write speed, which enables to ensure a large block of time for the touch detection operation, which enables to increase the flexibility of the touch detection operation.

The present embodiment is further configured to change the frequency of the detection signal for touch in the touch detection period of this large block of time, which enables to reduce the risk of a malfunction of the touch detection operation without affecting the display operation.

Modification 1-1

Figure 42:
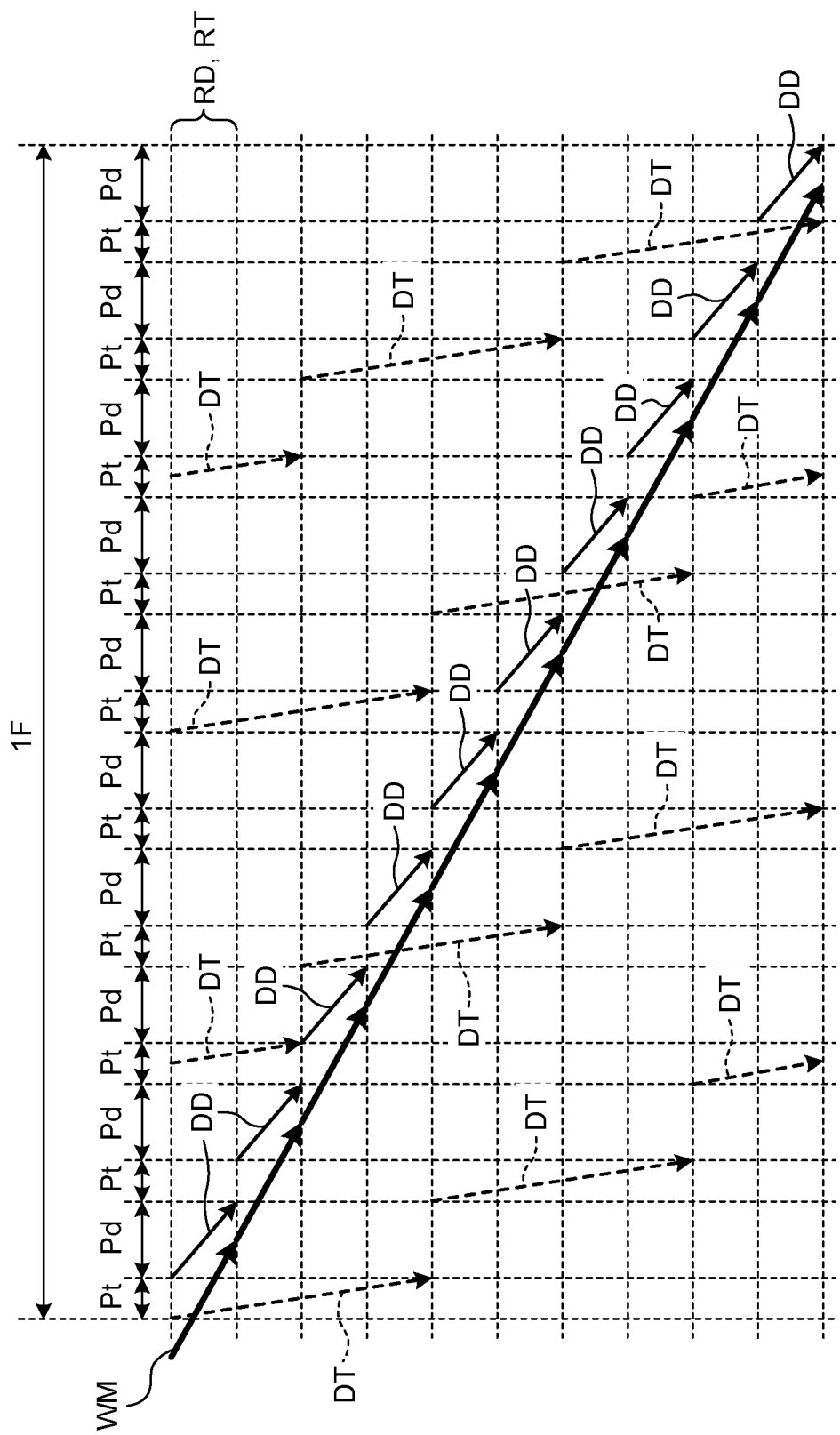
FIG. 42 is a diagram schematically illustrating operation of the display device with a touch detection function when a touch detection scanning is performed at a speed four times as high as that of display scanning.

In the present embodiment, the touch detection scanning is performed at a speed twice as high as that of the display scanning; however, the embodiment is not limited thereto. Therefore, instead of this, for example, it may be performed at a speed less than twice the speed of the display scanning or may be performed at a speed higher than twice the speed thereof. FIG. 42 is a diagram schematically illustrating operation of the display device with a touch detection function when a touch detection scanning is performed at a speed four times as high as that of the display scanning. In this example, the drive electrode driver 14 sequentially supplies the touch drive signal VcomAC to the four partial detection regions RT in the touch detection period Pt. Thereby, the touch detection scanning can be performed four times during one performance of the display scanning.

Modification 1-2

Figure 43:
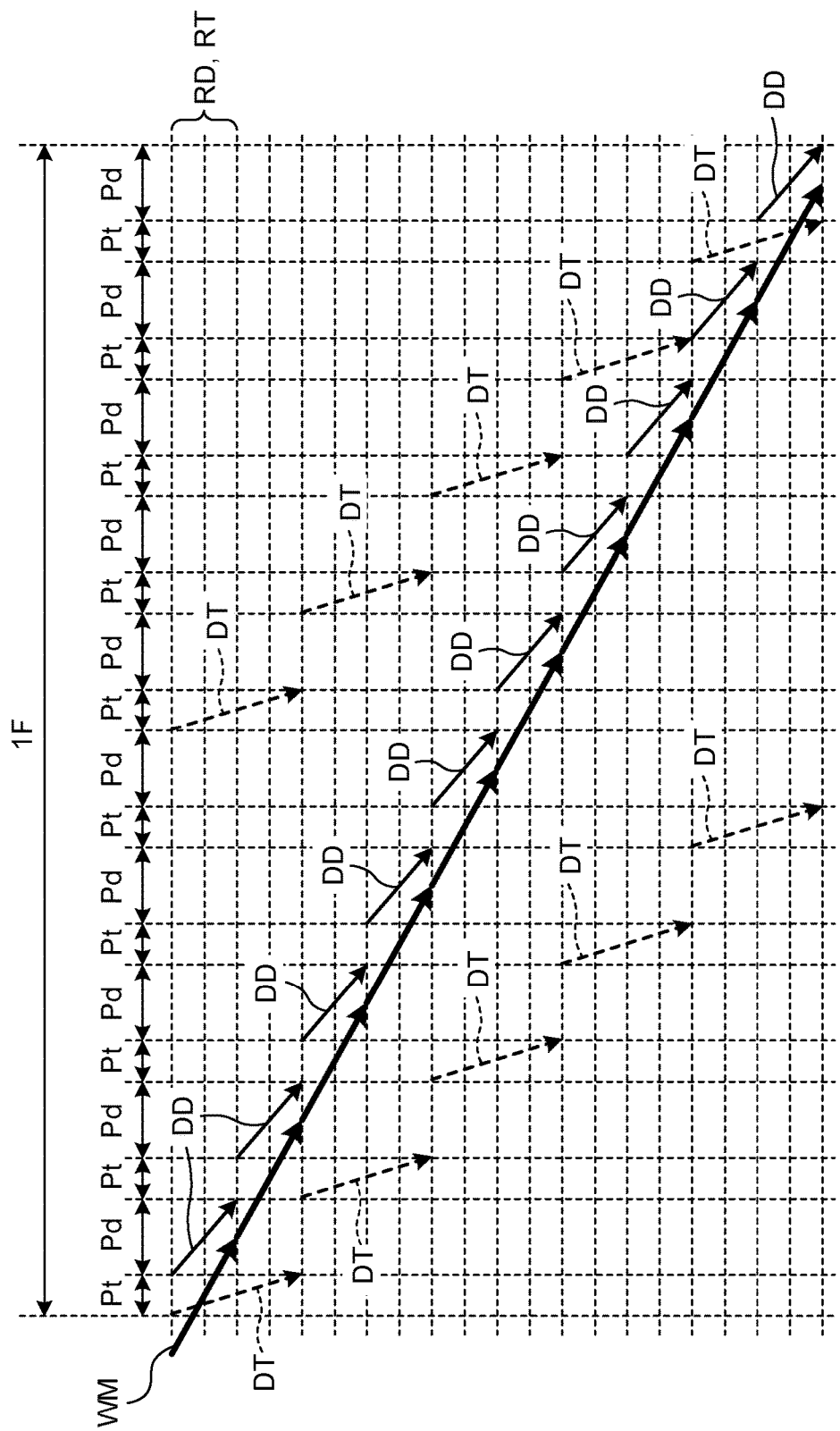
FIG. 43 is a diagram schematically illustrating operation of the display device with a touch detection function when a size of a partial detection region RT is set to half of a size of a partial display region RD.

In the present embodiment, the partial display region RT and the partial detection region RD are obtained by dividing the display surface and the touch detection surface into 10 portions respectively; however, the embodiment is not limited thereto. Therefore, for example, a size of the partial display region RD and a size of the partial detection region RT may be different from each other. FIG. 43 is a diagram schematically illustrating operation of the display device with a touch detection function when the size of the partial detection region RT is set to half of the size of the partial display region RD. In this example, the partial display region RD is obtained by dividing the display surface into 10 portions, and the partial detection region RT is obtained by dividing the touch detection surface into 20 portions.

Modification 1-3

Figure 44:
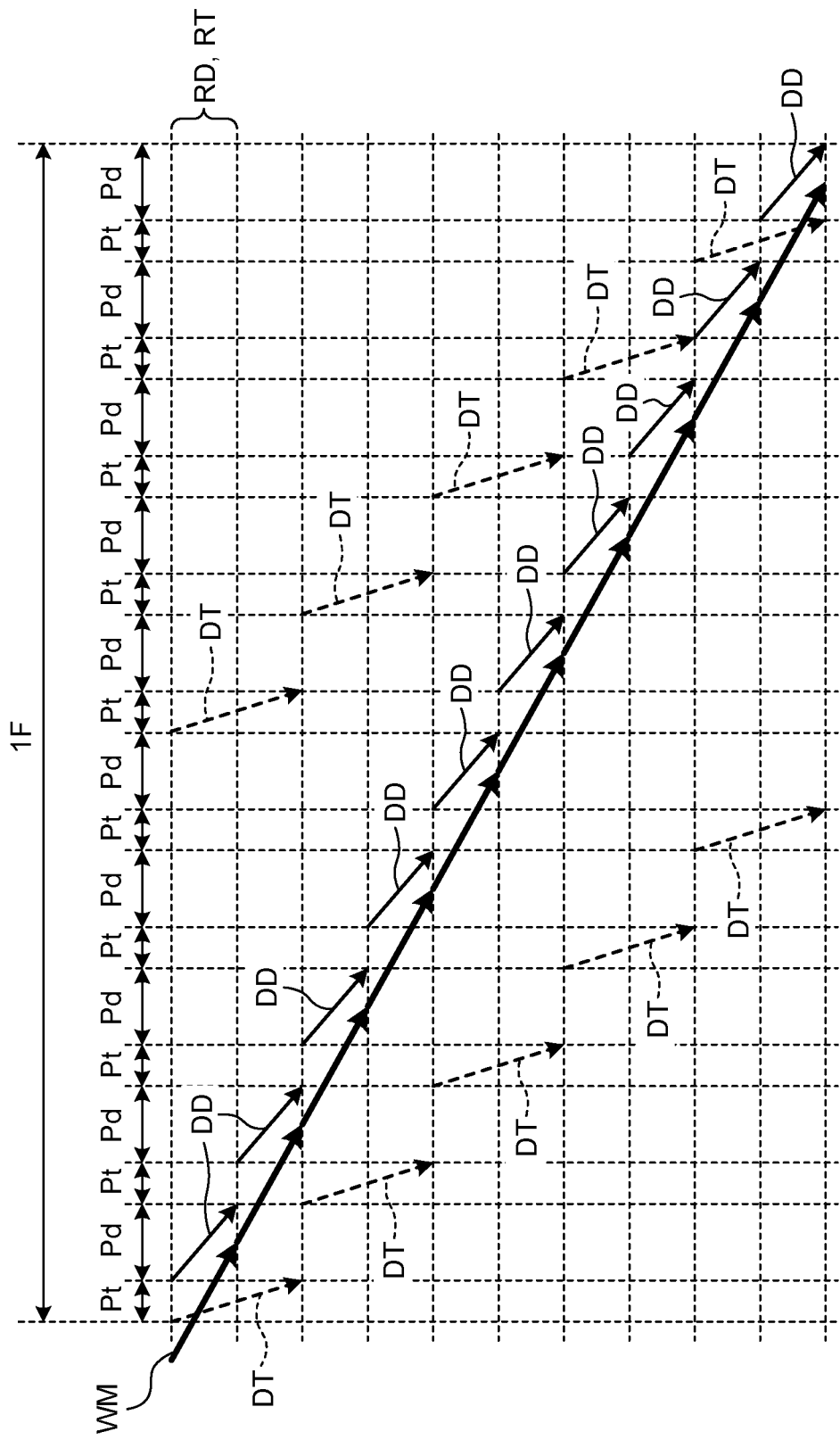
FIG. 44 is a diagram schematically illustrating operation of the display device with a touch detection function when data in two partial display regions RD are temporarily stored.

In the present embodiment, the memory 11a temporarily stores therein data in one partial display region RD; however, the embodiment is not limited thereto. Therefore, instead of this, for example, the memory 11a may temporarily store therein an amount of data in a plurality of partial display regions RD. FIG. 44 is a diagram schematically illustrating operation of the display device with a touch detection function when data in two partial display regions RD are temporarily stored. Also in this case, the storage capacity of the memory can be suppressed to be low as compared with that of the frame memory.

Modification 1-4

In the present embodiment, when performing touch detection operation, a drive electrode COML is driven and scanned in each partial detection region RT that includes a predetermined number of drive electrodes COML; however, the embodiment is not limited thereto. Therefore, instead of this, for example, the predetermined number of drive electrodes COML may be simultaneously driven, and the driven drive electrodes COML may be shifted one by one to be thereby scanned. Details thereof are explained below.

Figure 45:
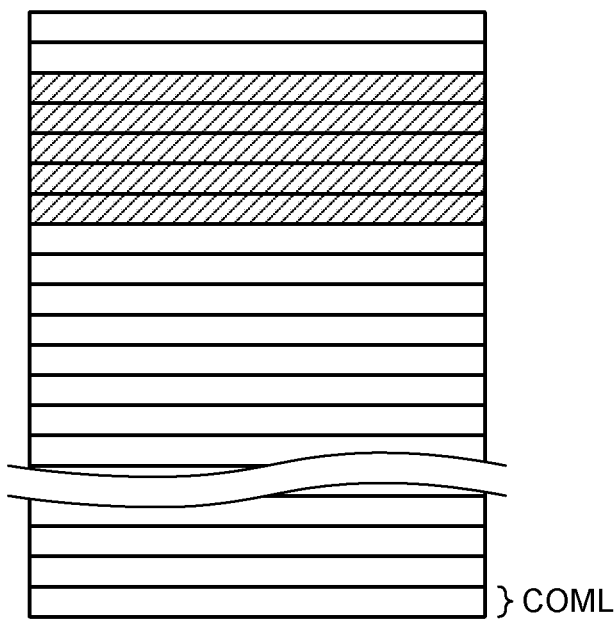
FIG. 45 is a diagram schematically illustrating an example of touch detection operation in the display device with a touch detection function.
Figure 46:
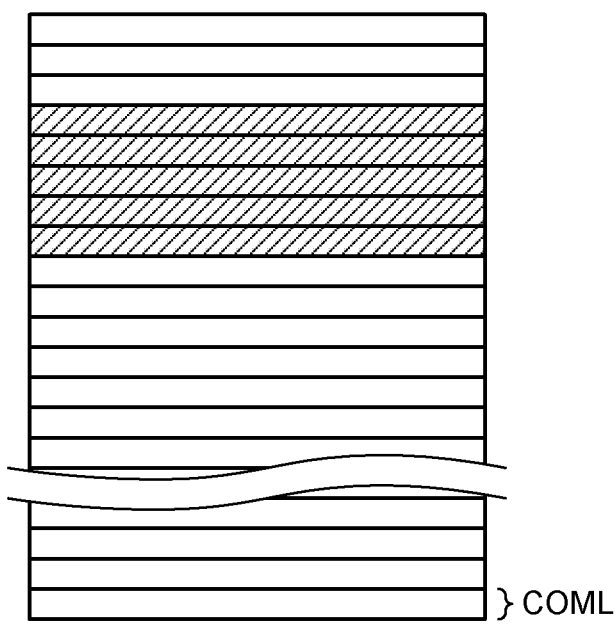
FIG. 46 is a diagram schematically illustrating an example of the touch detection operation in the display device with a touch detection function.
Figure 47:
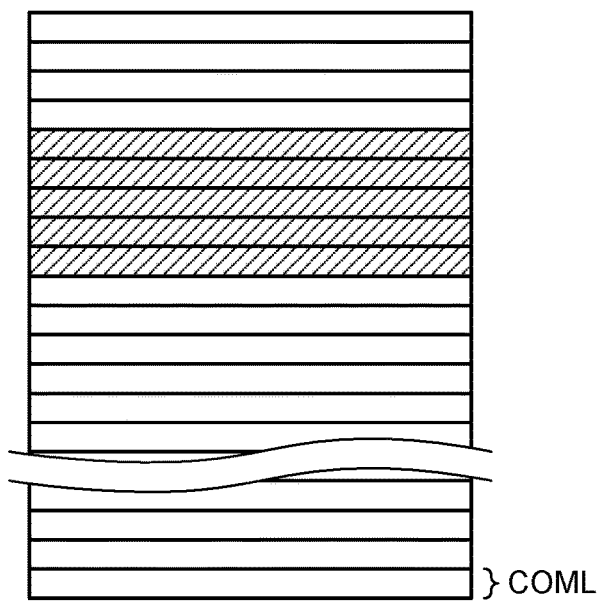
FIG. 47 is a diagram schematically illustrating an example of the touch detection operation in the display device with a touch detection function.

FIG. 45 to FIG. 47 are diagrams schematically illustrating examples of the touch detection operation in the display device with a touch detection function. A drive electrode driver 14D according to the present modification simultaneously applies the touch drive signal VcomAC to a predetermined number of drive electrodes COML. Specifically, the drive electrode driver 14D simultaneously applies the touch drive signal VcomAC to the predetermined number (five in this example) of drive electrodes COML (shaded portions). The drive electrode driver 14D then shifts the drive electrodes COML, to which the touch drive signal VcomAC is applied, one by one, and thereby performs touch detection scanning. In this example, the drive electrode driver 14D simultaneously applies the touch drive signal VcomAC to the five drive electrodes COML; however, the embodiment is not limited thereto. Therefore, instead of this, the drive electrode driver 14D may simultaneously apply the touch drive signal VcomAC to four or less or six or more of drive electrodes COML. In this example, the drive electrode driver 14D shifts the drive electrodes COML, to which the touch drive signal VcomAC is applied, one by one; however, the embodiment is not limited thereto. Therefore, instead of this, the drive electrode driver 14D may shift the drive electrodes by two or more numbers each time.

Modification 1-5

In the present embodiment, the storage capacity of the memory 11a corresponds to one-tenth of the video information for one frame; however, the embodiment is not limited thereto. Therefore, instead of this, for example, the memory capacity may correspond to one-twentieth of the video information for one frame or may correspond to one-fifth of the video information for one frame.

Modification 1-6

In the present embodiment, when performing display operation, the drive electrode driver 14 applies the display drive voltage VcomDC to the drive electrodes COML; however, the embodiment is not limited thereto. Therefore, instead of this, for example, the drive electrode driver 14 may apply an alternating-current drive signal to the drive electrodes COML, i.e., may perform so-called a COM inversion drive.

Modification 1-7

In the present embodiment, it is configured to provide the source selector 13S and separate the pixel signal Vpix from the image signal Vsig supplied from the source driver 13 to supply the pixel signal Vpix to the liquid crystal display unit 20; however, the embodiment is not limited thereto. Therefore, instead of this, the source driver 13 may directly supply the pixel signal Vpix to the liquid crystal display unit 20 without providing the source selector 13S.

Modification 1-8

In the present embodiment, it is configured to alternately perform the image display in the partial display region RD and the touch detection in the partial detection region RT; however, the embodiment is not limited thereto. Therefore, instead of this, it may be configured to collectively perform image display for one screen (one frame) and perform touch detection of the whole touch detection area before or after the image display.

1-2. Second Embodiment

Figure 48:
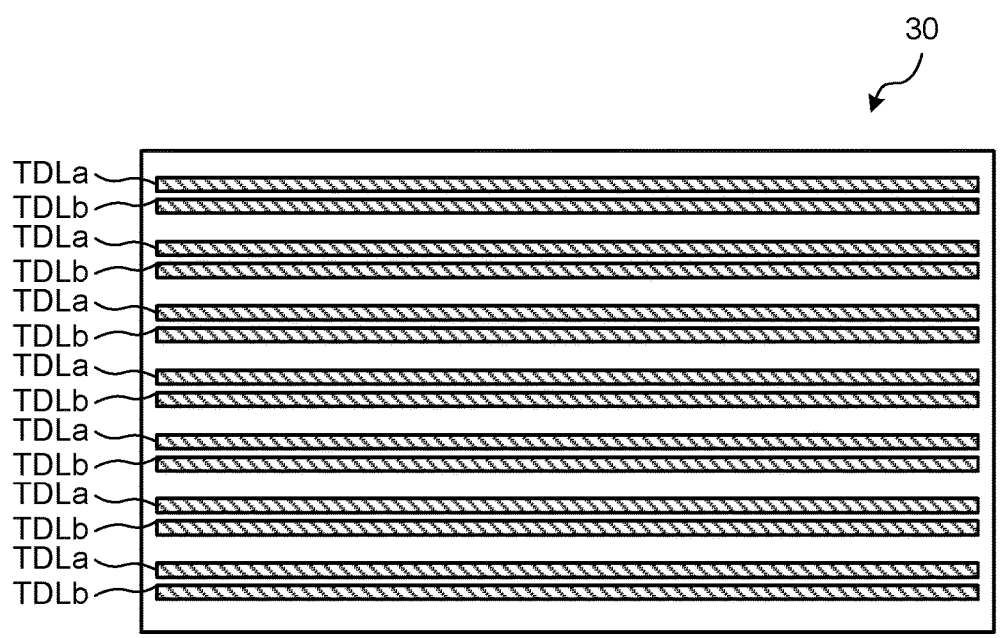
FIG. 48 is a diagram of an example of a touch detecting unit of a display device with a touch detection function according to a second embodiment.
Figure 49:
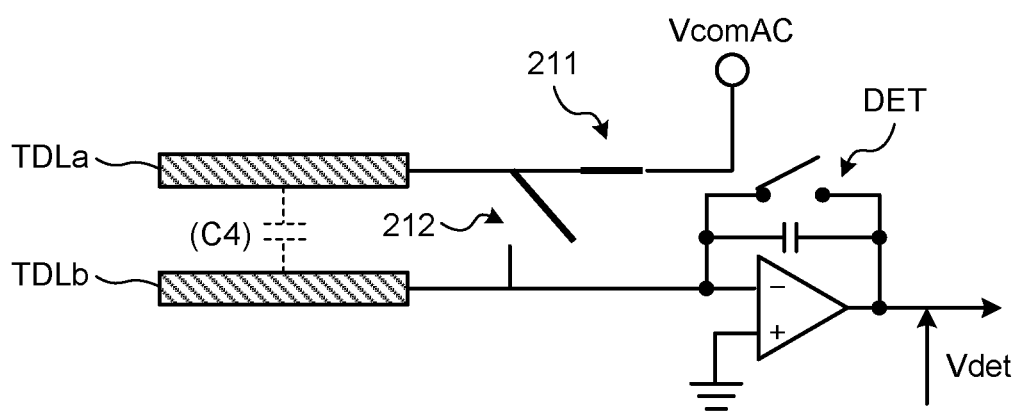
FIG. 49 is a diagram of a detecting unit of the display device with a touch detection function according to the second embodiment.
Figure 50:
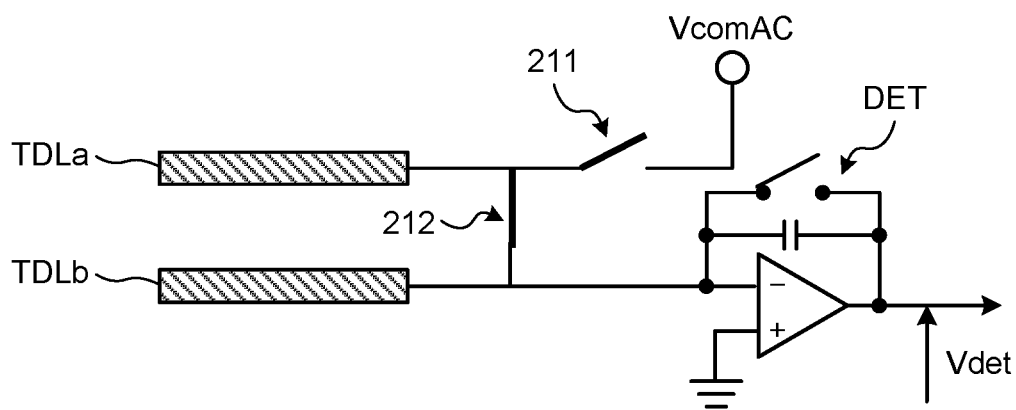
FIG. 50 is a diagram of the detecting unit of the display device with a touch detection function according to the second embodiment.

A display device with a touch detection function according to a second embodiment will be explained next. FIG. 48 is a diagram of an example of a touch detecting unit of the display device with a touch detection function according to the second embodiment. FIG. 49 and FIG. 50 are diagrams of a detecting unit of the display device with a touch detection function according to the second embodiment.

The touch detecting unit according to the first embodiment detects the presence or absence of a touch using the self-capacitance method in the sleep mode. Meanwhile, the touch detecting unit according to the second embodiment detects the presence or absence of a touch using the mutual capacitance method in the sleep mode.

As illustrated in FIG. 48, the touch detecting unit 30 includes a plurality of pairs each of which is formed with a touch detection electrode TDLa and a touch detection electrode TDLb.

FIG. 49 is a diagram of a pair of the touch detection electrode TDLa and the touch detection electrode TDLb and a voltage detector (touch detecting unit) DET in the sleep mode. The voltage detector DET may be built in the touch-detection controller 100.

In the sleep mode, a switch 211 is tuned on, and the drive signal VcomAC is applied to the touch detection electrode TDLa. The touch detection electrode TDLa and the touch detection electrode TDLb form a capacitive element C4, and the capacitance changes between the case in which the finger is not in contact with or in proximity to the touch detection electrode and the case in which the finger is in contact with or in proximity thereto. The voltage detector DET is coupled to the touch detection electrode TDLb, and the voltage of the touch detection electrode TDLb allows detection of the change in the capacitance formed by the touch detection electrode TDLa and the touch detection electrode TDLb, i.e., detection as to whether the finger is in contact with or in proximity to the touch detection electrode.

FIG. 50 is a diagram of the pair of the touch detection electrode TDLa and the touch detection electrode TDLb and the voltage detector DET in the normal operation mode. In the normal operation mode, the switch 211 is turned off, and the application of the drive signal VcomAC to the touch detection electrode TDLa is shut off. A switch 212 is turned on, and the touch detection electrode TDLa is coupled to the voltage detector DET. Thereby, mutual capacitances are formed between the touch detection electrode TDLa/the touch detection electrode TDLb and the drive electrodes COML, respectively. The drive signal VcomAC is applied to the drive electrodes COML, and the voltage detector DET can detect the touch based on the voltage of the touch detection electrode TDLa and that of the touch detection electrode TDLb.

Effects

The touch detecting unit 30 according to the second embodiment can detect the presence or absence of the touch using the mutual capacitance in the sleep mode. This enables the touch detecting unit 30 according to the second embodiment to detect the presence or absence of the touch with higher precision than the self-capacitance.

1-3. Third Embodiment

Figure 51:
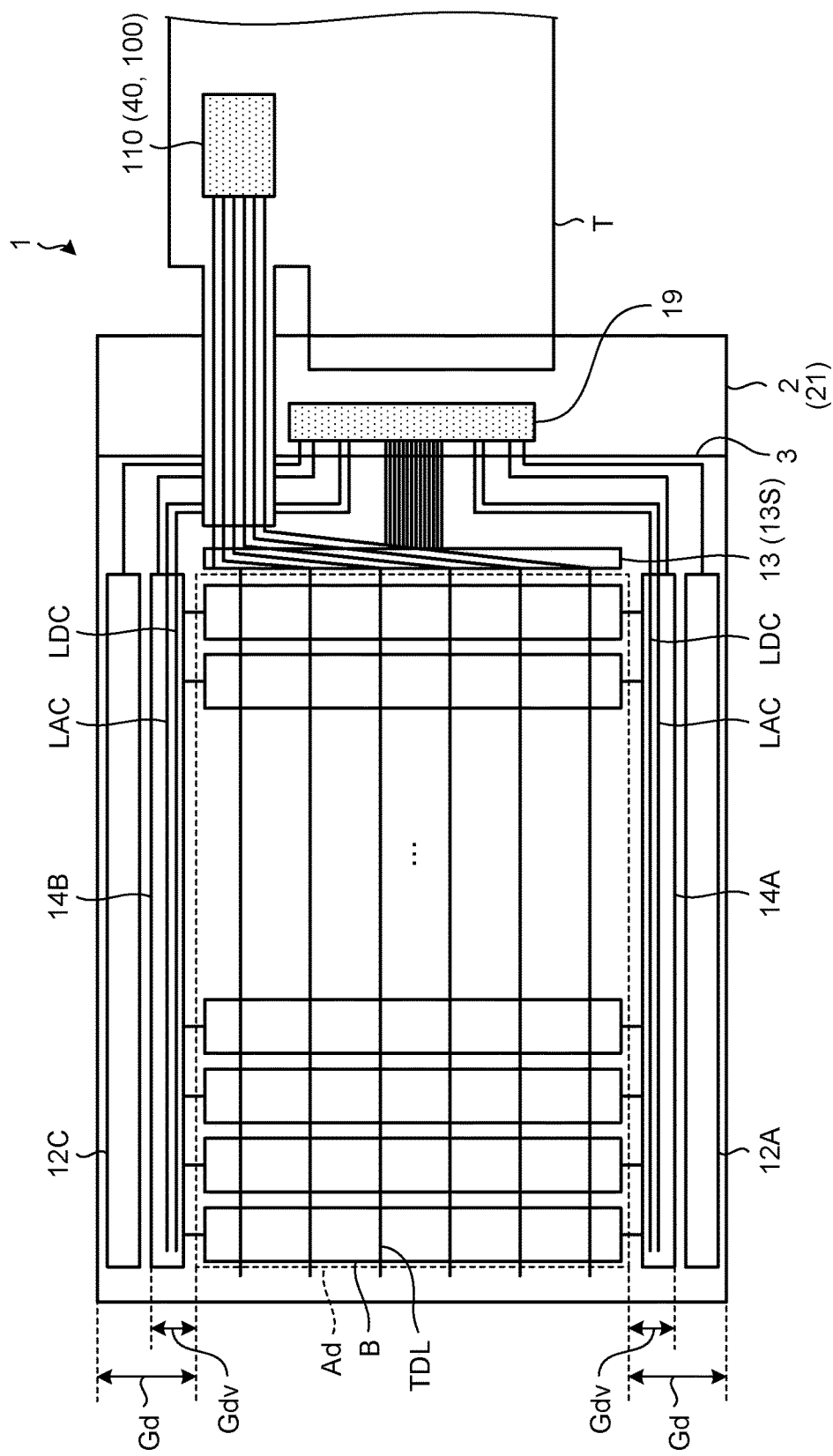
FIG. 51 is a diagram of a display device with a touch detection function according to a third embodiment.

A display device with a touch detection function according to a third embodiment will be explained next. FIG. 51 is a diagram of an example of a module that mounts thereon the display device with a touch detection function according to the third embodiment. The same reference signs are assigned to the same components as these explained in the first embodiment, and overlapping explanation is therefore omitted.

As illustrated in FIG. 51, the display device with a touch detection function 1 according to the third embodiment includes a gate driver 12C instead of the gate driver 12B and the gate driver 100D of the display device with a touch detection function 1 according to the first embodiment. The gate driver 12C is a circuit that can operate at both the power supply voltage Vcc and the power supply voltage Vdd. In the sleep mode, the gate driver 12C operates at the power supply voltage Vcc (e.g., about 3V to 5V) and the power supply voltage −Vcc (e.g., about −3V to −5V) which are constantly supplied, and applies the scan signal Vscan to the scan line GCL. In the normal operation mode, the gate driver 12C operates at the power supply voltage Vdd (e.g., about 5V to 10V) and the power supply voltage −Vdd (e.g., about −5V to −10V) which are generated by the booster circuit 70, and applies the scan signal Vscan to the scan line GCL.

Effects

The display device with a touch detection function 1 according to the third embodiment includes the gate driver 12C instead of the gate driver 12B and the gate driver 100D of the display device with a touch detection function 1 according to the first embodiment. This enables the display device with a touch detection function 1 according to the third embodiment to narrow the frame Gd, thus downsizing the electronic apparatus.

1-4. Fourth Embodiment

Figure 52:
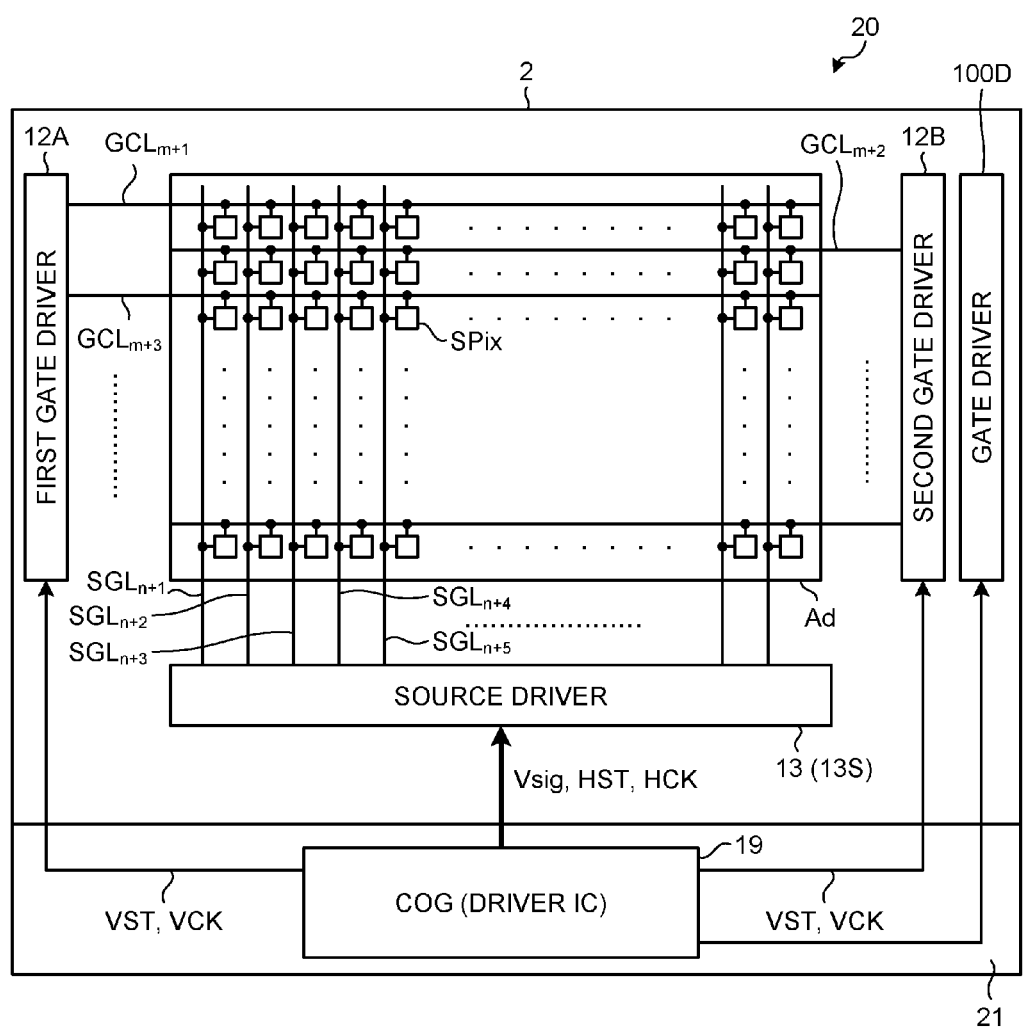
FIG. 52 is a diagram of an example of a control device of a display device with a touch detection function according to a fourth embodiment.
Figure 53:
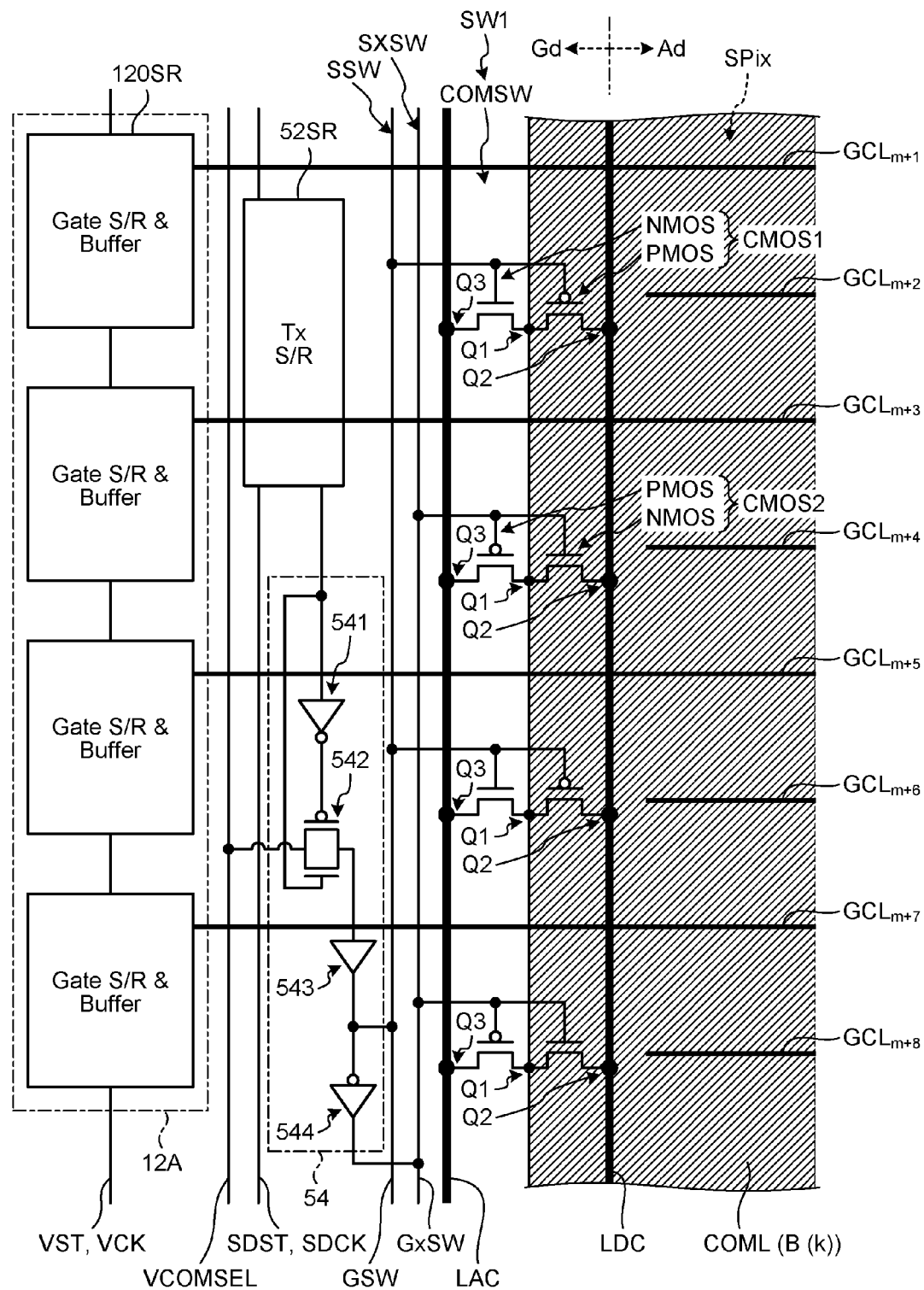
FIG. 53 is a block diagram of a drive unit of a drive electrode driver according to the fourth embodiment.
Figure 54:
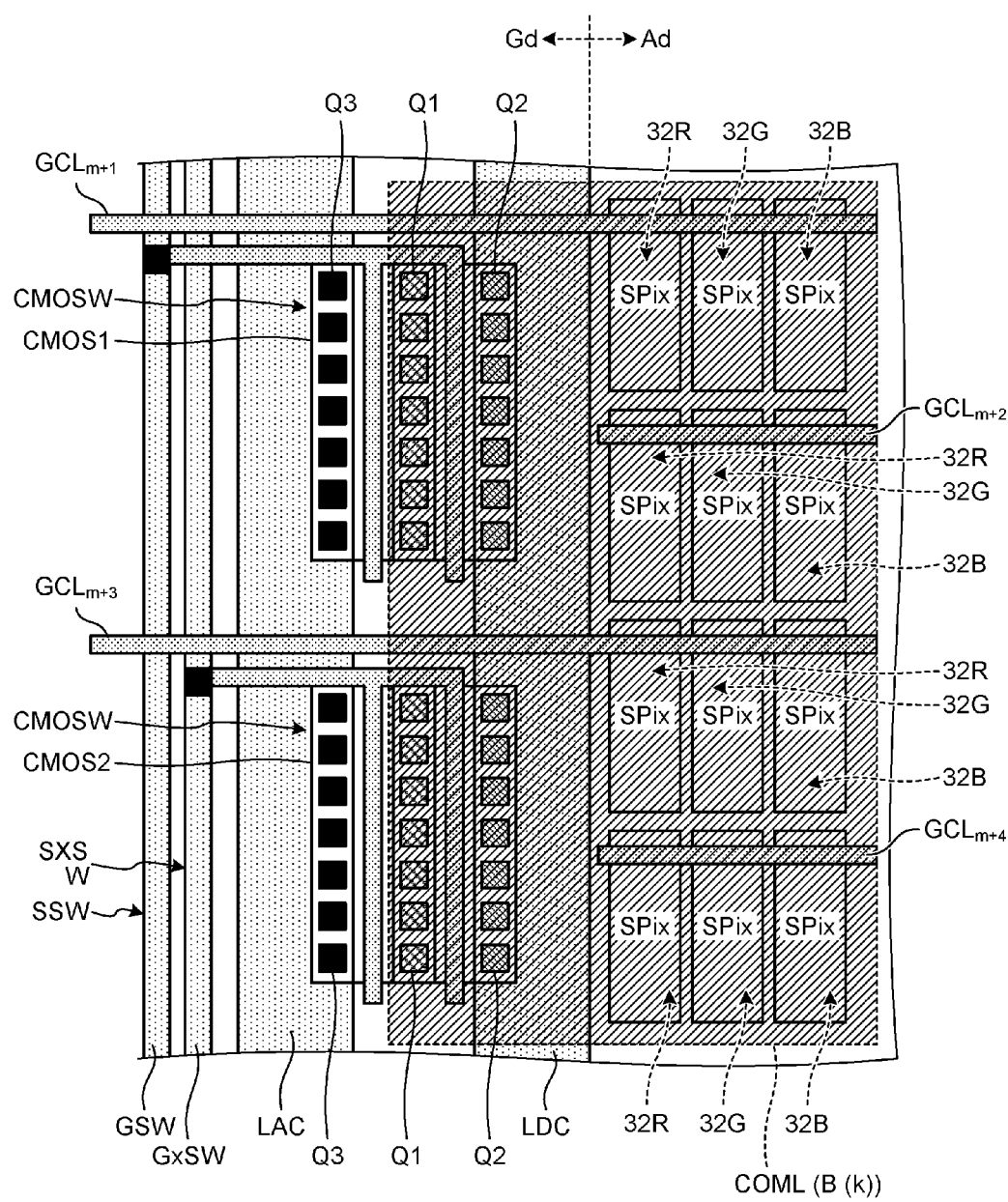
FIG. 54 is a block diagram of an arrangement example of selection switches of the drive electrode driver according to the fourth embodiment.

A display device with a touch detection function 1 according to a fourth embodiment will be explained next. FIG. 52 is a diagram of an example of a control device of the display device with a touch detection function according to the fourth embodiment. FIG. 53 is a block diagram of a drive unit of a drive electrode driver according to the fourth embodiment. FIG. 54 is a block diagram of an arrangement example of selection switches of the drive electrode driver according to the fourth embodiment. The same reference signs are assigned to the same components as these explained in the first embodiment, and overlapping explanation is therefore omitted. FIG. 53 and FIG. 54 explain the configuration of the first gate driver 12A side, and the same goes for the configuration of the second gate driver 12B.

As illustrated in FIG. 52, the pixel substrate 2 includes the display area Ad which is provided on the surface of the TFT substrate 21 of a translucent insulating substrate (e.g., a glass substrate) and on which a number of pixels including liquid crystal cells are arranged in a matrix (in the form of rows and columns), the source driver (horizontal drive circuit) 13, and the gate drivers (vertical drive circuits) 12A, 12B, and 100D. The gate drivers (vertical drive circuits) 12A and 12B are arranged across the display area Ad, as the first gate driver 12A and the second gate driver 12B respectively. In the normal operation mode, the first gate driver 12A and the second gate driver 12B alternately apply the vertical scan pulse to the scan lines GCL in the scan direction, and select sub-pixels SPix in the display area Ad row by row. The first gate driver 12A and the second gate driver 12B are arranged at respective ends of the scan line GCL in its longitudinal direction, alternately apply the vertical scan pulse to every other scan line GCL, and select pixels in the display area Ad row by row.

Therefore, as illustrated in FIG. 53, on the first gate driver 12A side or the second gate driver 12B side, the number of the scan lines GCL passing through the frame Gd across the display area Ad and reaching the first gate driver 12A or the second gate driver 12B becomes less. Consequently, in the frame Gd, an odd or an even number of scan lines GCL pass between the display area Ad and the first gate driver 12A/the second gate driver 12B. As a result, the CMOS switch CMOS1 of the selection switch SW1 is disposed in an area between scan lines GCL (e.g., between the scan line $GCL_{m+1}$ and the scan line $GCL_{m+3}$) that three-dimensionally intersect the touch wiring LAC (display wiring LDC). For example, the scan lines GCL (e.g., the scan line $GCL_{m+1}$ and the scan line $GCL_{m+3}$) coupled to the first gate driver 12A three-dimensionally intersect the touch wiring LAC on the first gate driver 12A side but do not three-dimensionally intersect the touch wiring LAC on the second gate driver 12B side. The scan lines (e.g., the scan line $GCL_{m+2}$ and the scan line $GCL_{m+4}$) coupled to the second gate driver 12B three-dimensionally intersect the touch wiring LAC on the second gate driver 12B side but do not three-dimensionally intersect the touch wiring LAC on the first gate driver 12A side. Therefore, a distance between the scan lines GCL three-dimensionally intersecting the touch wiring LAC (display wiring LDC) becomes wider than a distance between adjacent scan lines GCL in the display area Ad. In other words, the distance between the scan lines GCL in the frame Gd is wider than the distance between adjacent scan lines GCL in the display area Ad. Because the distance between the scan lines GCL in the frame Gd is widened, the area where the selection switches SW1 (CMOS switch CMOS1 and CMOS switch CMOS2) can be arranged is increased. For example, by increasing the number of the coupling conductors Q1, Q2, and Q3 or by increasing the area thereof, coupling resistance of the selection switch SW1 can be reduced.

The selection switch SW1 is disposed not only in a frame area Gd on the first gate driver 12A side but also in a frame area Gd on the second gate driver 12B side. The selection switch SW1 disposed in the frame area Gd on the second gate driver 12B side can select coupling between the touch wiring LAC arranged on the second gate driver 12B side and the drive electrode COML and coupling between the display wiring LDC and the drive electrode COML. In this case, selection switches coupled to the same drive electrode COML, of the selection switches on the first gate driver 12A side and the selection switches on the second gate driver 12B side, select wirings (touch wirings LAC or display wirings LDC) of the same type as each other respectively. For example, when the selection switch SW1 on the first gate driver 12A side selects coupling between the touch wiring LAC and the drive electrode COML, the selection switch SW1 on the second gate driver 12B side, which is coupled to the same drive electrode COML as the selection switch SW1 on the first gate driver 12A side, selects coupling between the touch wiring LAC and the drive electrode COML. When the selection switch SW1 on the first gate driver 12A side selects coupling between the display wiring LDC and the drive electrode COML, the selection switch SW1 on the second gate driver 12B side, which is coupled to the same drive electrode COML as the selection switch SW1 on the first gate driver 12A side, selects coupling between the display wiring LDC and the drive electrode COML.

Effects

As is the first embodiment, when the selection switch SW1 is disposed in between the scan lines GCL corresponding to one pitch of the sub-pixels SPix, and if the pixel pitch is narrowed in association with higher resolution, the coupling resistance of the selection switch SW1 is likely to increase. On the other hand, the display device with a touch detection function 1 according to the fourth embodiment can arrange the selection switch SW1 in a distance wider than the distance between the scan lines GCL corresponding to one pitch of the sub-pixels SPix. Therefore, even if the pixel pitch is made narrow due to higher resolution, the coupling resistance of the switch SW1 can be kept low. In addition, by increasing the number of the coupling conductors Q1, Q2, and Q3 supplying power, the coupling resistance of the selection switch SW1 can be reduced.

The touch wiring LAC has a predetermined coupling resistance component of the switch SW1 and a parasitic capacitance of the drive electrodes COML belonging to the drive electrode block B supplied with the drive signal VcomAC via the touch wiring LAC. Therefore, in the drive electrode block B arranged in a position apart from the COG 19 (drive-signal generating unit), the transition time of a pulse of the drive signal VcomAC may become long. On the other hand, the selection switch SW1 (SW2, SW3, SW4) according to the fourth embodiment has a plurality of CMOS switches CMOS1 and CMOS switches CMOS2 of the switch COMSW provided for each drive electrode COML. The CMOS switch CMOS1 and the CMOS switch CMOS2 are coupled in parallel to each other between the touch wiring LAC and the drive electrode COML, and therefore all the switches operate for each drive electrode COML according to the switch control signal as a selection signal to connect the touch wiring LAC and the drive electrode COML, thus applying the touch drive signal VcomAC thereto. In the display device with a touch detection function 1 according to the fourth embodiment, the coupling resistance of the switch S1 is reduced, and the possibility that the transition time of the pulse of the drive signal VcomAC may become long in the drive electrode block B arranged near the end portion of the touch wiring LAC is suppressed.

The switch SW1 according to the fourth embodiment can be made small in a direction parallel to the scan line and can be made large in a direction perpendicular to the scan line. This enables the display device with a touch detection function 1 according to the fourth embodiment to make small the width occupied by the switch SW1 in the direction parallel to the scan line within the frame Gd, i.e., the width Gdv illustrated in FIG. 7.

1-5. Fifth Embodiment

Figure 55:
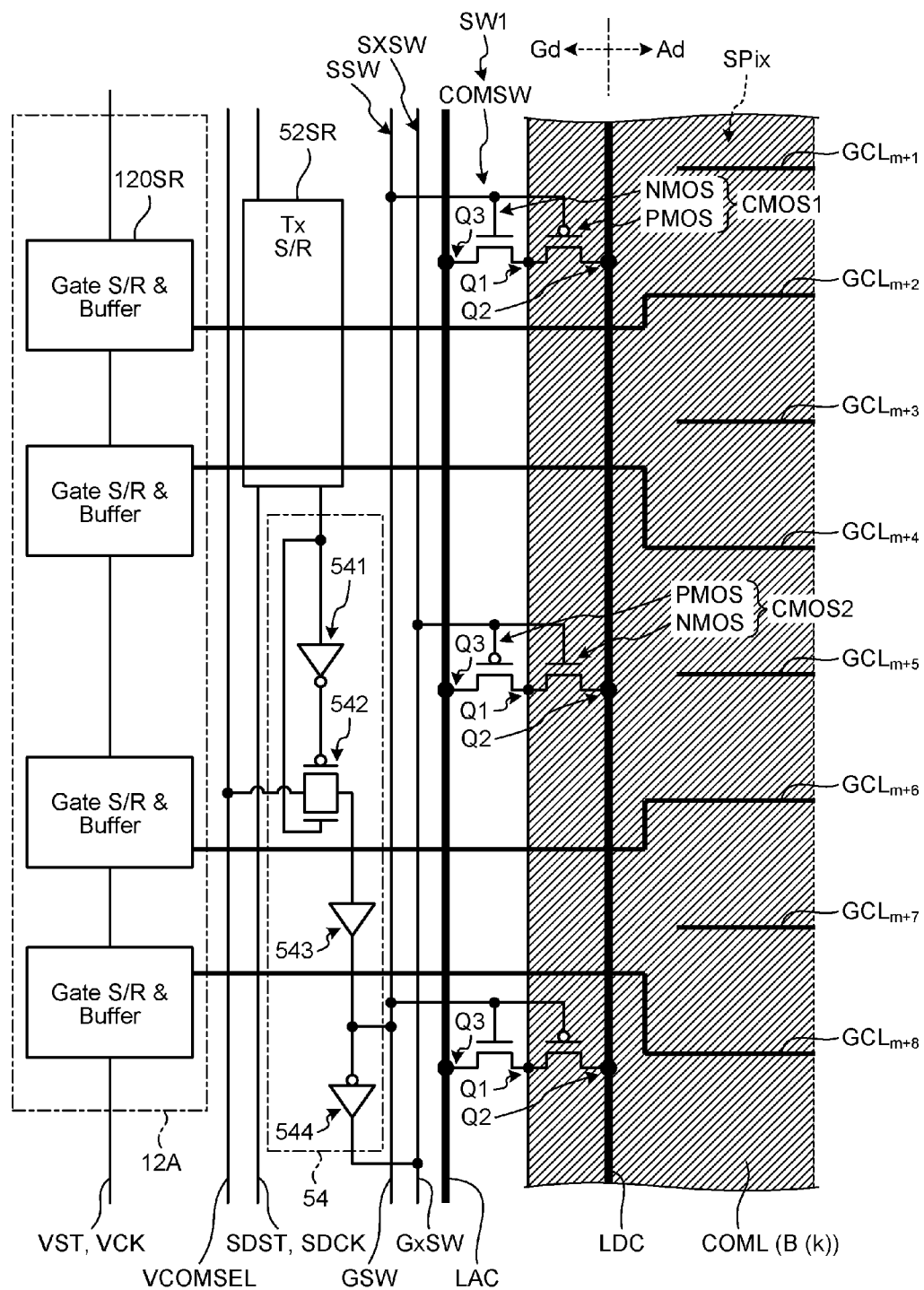
FIG. 55 is a block diagram of a drive unit of a drive electrode driver in a display device with a touch detection function according to a fifth embodiment.
Figure 56:
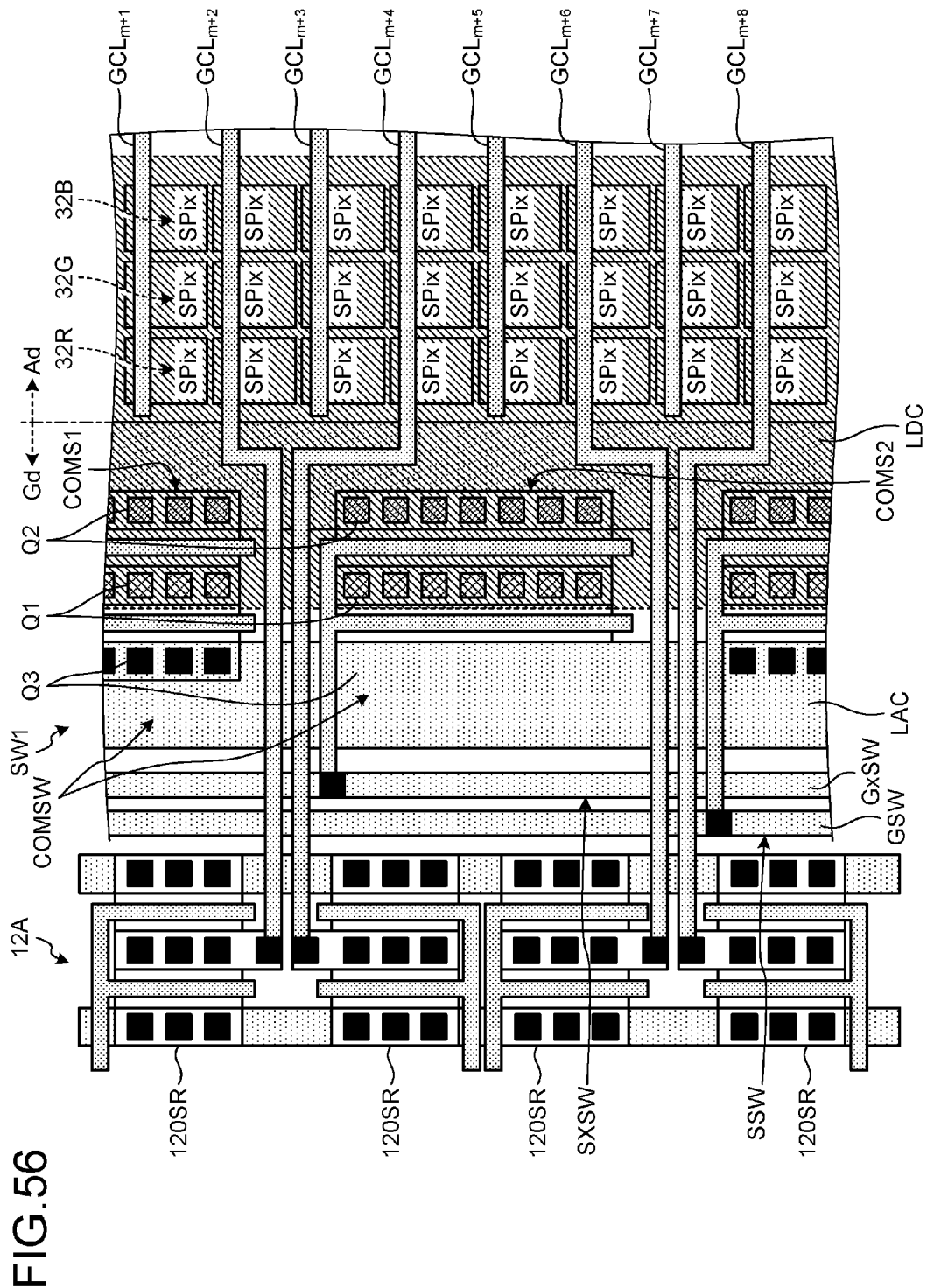
FIG. 56 is a block diagram of an arrangement example of selection switches of the drive electrode driver in the display device with a touch detection function according to the fifth embodiment.

A display device with a touch detection function 1 according to a fifth embodiment will be explained next. FIG. 55 is a block diagram of a drive unit of a drive electrode driver in the display device with a touch detection function according to the fifth embodiment. FIG. 56 is a block diagram of an arrangement example of selection switches of the drive electrode driver in the display device with a touch detection function according to the fifth embodiment. The same reference signs are assigned to the same components as these explained in the first to the fourth embodiments, and overlapping explanation is therefore omitted. FIG. 55 and FIG. 56 explain the drive electrode driver on the first gate driver 12A side, and the same goes for the configuration of the second gate driver 12B.

As illustrated in FIG. 52, also in the fifth embodiment, the pixel substrate 2 includes the display area Ad which is provided on the surface of the TFT substrate 21 of a translucent insulating substrate (e.g., a glass substrate) and on which a number of pixels including liquid crystal cells are arranged in a matrix (in the form of rows and columns), the source driver (horizontal drive circuit) 13, and the gate drivers (vertical drive circuits) 12A, 12B, and 100D. The gate drivers (vertical drive circuits) 12A and 12B are arranged across the display area Ad, as the first gate driver 12A and the second gate driver 12B respectively. In the normal operation mode, the first gate driver 12A and the second gate driver 12B alternately apply the vertical scan pulse to the scan lines in the scan direction, and select sub-pixels SPix in the display area Ad row by row.

As illustrated in FIG. 55, on the first gate driver 12A side or the second gate driver 12B side, the number of the scan lines GCL passing through the frame Gd across the display area Ad and reaching the first gate driver 12A or the second gate driver 12B becomes less. A plurality of scan lines $GCL_{m+2}$ and $GCL_{m+4}$ (a plurality of scan lines $GCL_{m+6}$ and $GCL_{m+8}$) are arranged in between adjacent switches COMSW. This arrangement coincides with one pitch between the gate shift registers 120SR of the first gate driver 12A (second gate driver 12B). The gate shift register 120SR controls the two scan lines GCL as a pair. Therefore, in the selection switch SW1, the switch COMSW corresponds to four pitches of the sub-pixels SPix, and a repetitive pitch corresponds to eight sub-pixels SPix. Consequently, in the frame Gd, an odd or an even number of scan lines GCL pass between the display area Ad and the first gate driver 12A/the second gate driver 12B. As a result, the CMOS switch CMOS2 three-dimensionally intersects the touch wiring LAC (display wiring LDC) and is disposed in an area between the scan lines GCL (e.g., between the scan line $GCL_{m+4}$ and the scan line $GCL_{m+6}$) adjacent to the CMOS switch CMOS1 and the CMOS switch CMOS2. For example, the scan lines GCL (e.g., the scan line $GCL_{m+2}$, the scan line $GCL_{m+4}$, the scan line $GCL_{m+6}$, and the scan line $GCL_{m+8}$) coupled to the first gate driver 12A three-dimensionally intersect the touch wiring LAC on the first gate driver 12A side but do not three-dimensionally intersect the touch wiring LAC on the second gate driver 12B side. The scan lines (e.g., the scan line $GCL_{m+1}$, the scan line $GCL_{m+3}$, the scan line $GCL_{m+5}$, and the scan line $GCL_{m+7}$) coupled to the second gate driver three-dimensionally intersect the touch wiring LAC on the second gate driver side but do not three-dimensionally intersect the touch wiring LAC on the first gate driver side. Therefore, a distance between the scan lines GCL three-dimensionally intersecting the touch wiring LAC (display wiring LDC) becomes wider than a distance between adjacent scan lines GCL in the display area Ad. Because the distance between the scan lines GCL in the frame Gd is widened, the area where the selection switches SW1 (CMOS switch CMOS1 and CMOS switch CMOS2) can be arranged is increased. For example, by increasing the number of the coupling conductors Q1, Q2, and Q3 or by increasing the area thereof, the coupling resistance of the selection switch SW1 can be reduced.

The selection switch SW1 is disposed not only in the frame area Gd on the first gate driver 12A side but also in the frame area Gd on the second gate driver 12B side. The selection switch SW1 disposed in the frame area Gd on the second gate driver 12B side can select coupling between the touch wiring LAC and the drive electrode COML and coupling between the display wiring LDC and the drive electrode COML, which are arranged on the second gate driver 12B side. In this case, selection switches coupled to the same drive electrode COML, of the selection switches on the first gate driver 12A side and the selection switches on the second gate driver 12B side, select wirings (touch wiring LAC or display wiring LDC) of the same type as each other respectively. For example, when the selection switch SW1 on the first gate driver 12A side selects coupling between the touch wiring LAC and the drive electrode COML, the selection switch SW1 on the second gate driver 12B side, which is coupled to the same drive electrode COML as the selection switch SW1 on the first gate driver 12A side, selects coupling between the touch wiring LAC and the drive electrode COML. When the selection switch SW1 on the first gate driver 12A side selects coupling between the display wiring LDC and the drive electrode COML, the selection switch SW1 on the second gate driver 12B side, which is coupled to the same drive electrode COML as the selection switch SW1 on the first gate driver 12A side, selects coupling between the display wiring LDC and the drive electrode COML.

Effects

As is the first embodiment, when the selection switch SW1 is disposed in between the scan lines GCL corresponding to one pitch of the sub-pixels, and if the pixel pitch is narrowed in association with higher resolution, the coupling resistance of the selection switch SW1 is likely to increase. On the other hand, in the display device with a touch detection function 1 according to the fifth embodiment, the selection switch SW1 can be arranged in a distance wider than the distance between the scan lines GCL corresponding to one pitch of the sub-pixels SPix. Therefore, even if the pixel pitch is made narrow due to higher resolution, the coupling resistance of the switch SW1 can be kept low. In addition, by increasing the number of the coupling conductors Q1, Q2, and Q3 supplying power, the coupling resistance of the selection switch SW1 can be reduced.

The touch wiring LAC has a predetermined coupling resistance component of the switch SW1 and a parasitic capacitance of the drive electrodes COML belonging to the drive electrode block B supplied with the drive signal VcomAC via the touch wiring LAC. Therefore, in the drive electrode block B arranged in a position apart from the COG 19 (drive-signal generating unit), the transition time of a pulse of the drive signal VcomAC may become long. On the other hand, the selection switch SW1 (SW2, SW3, SW4) according to the fifth embodiment has a plurality of CMOS switches CMOS1 and CMOS switches CMOS2 of the switch COMSW provided for each drive electrode COML. The CMOS switch CMOS1 and the CMOS switch CMOS2 are coupled in parallel to each other between the touch wiring LAC and the drive electrode COML, and therefore all the switches operate for each drive electrode COML according to the switch control signal as a selection signal to connect the touch wiring LAC and the drive electrode COML, so that the touch drive signal VcomAC can be applied thereto. The display device with a touch detection function 1 according to the fifth embodiment reduces the coupling resistance of the switch S1 and thereby suppresses the possibility that the transition time of the pulse of the drive signal VcomAC may become long in the drive electrode block B arranged near the end portion of the touch wiring LAC.

The switch SW1 according to the fifth embodiment can be made small in a direction parallel to the scan line and can be made large in a direction perpendicular to the scan line. This enables the display device with a touch detection function 1 according to the fifth embodiment to make small a width occupied by the switch SW1 in the direction parallel to the scan line within the frame Gd, i.e., the width Gdv illustrated in FIG. 7.

1-6. Sixth Embodiment

Figure 57:
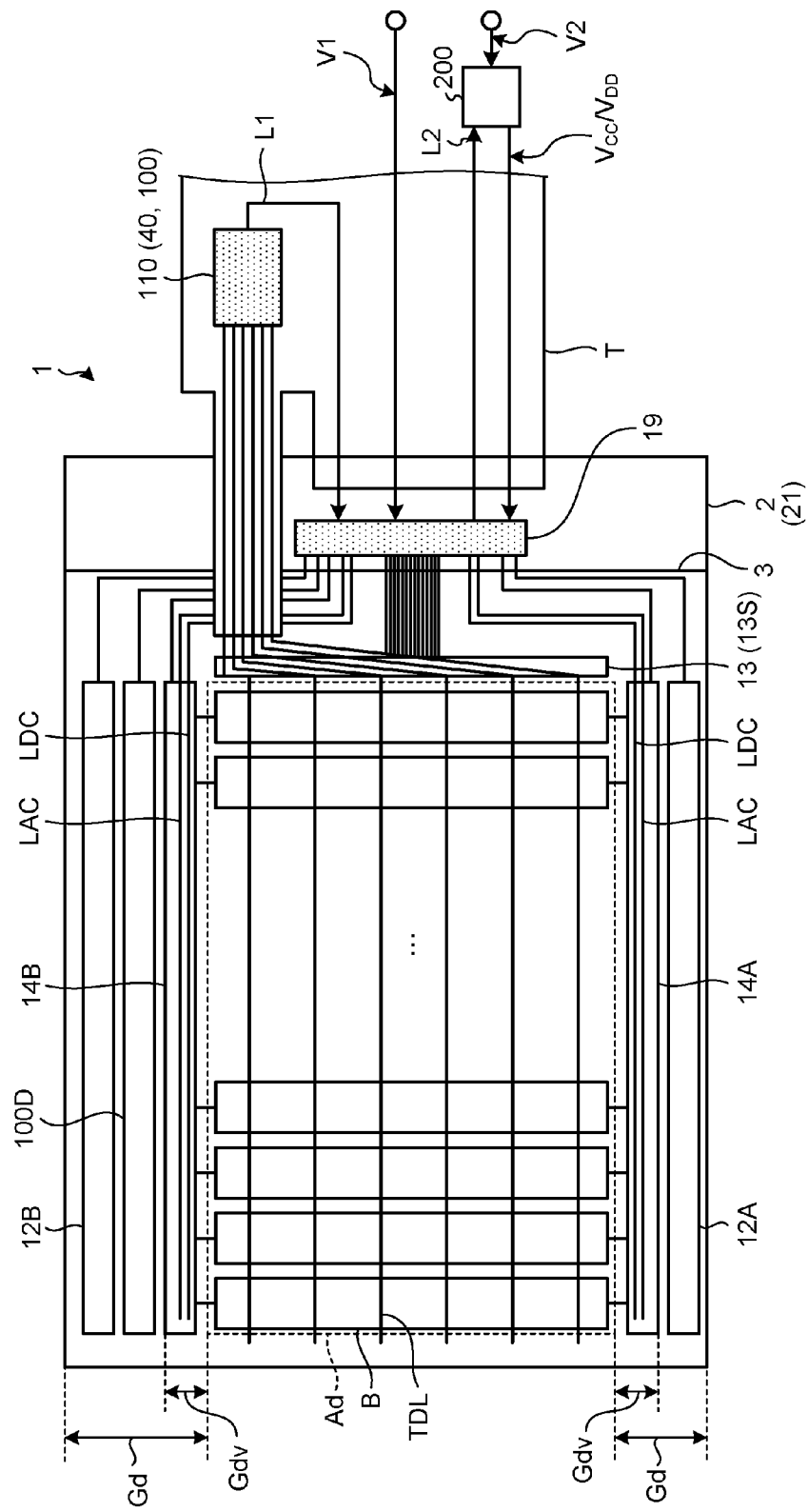
FIG. 57 is a diagram of an example of a module that mounts thereon a display device with a touch detection function according to a sixth embodiment.

A display device with a touch detection function according to a sixth embodiment will be explained next. FIG. 57 is a diagram of an example of a module that mounts thereon the display device with a touch detection function according to the sixth embodiment.

As illustrated in FIG. 57, the COG 19 is supplied with a power supply voltage V1 from a battery, a main substrate of the electronic apparatus, or the like. The power supply voltage V1 is not the power supply voltage for driving the display unit with a touch detection function 10 but is the power supply voltage as a low voltage (e.g., 1.8V) for an interface that receives a control signal from the touch IC 110 and outputs the control signal to an external power supply IC 200.

The COG 19 is also supplied with the power supply voltage Vcc or Vdd for driving the display unit with a touch detection function 10 from the power supply IC 200. The power supply IC 200 is supplied with a power supply voltage V2 (e.g., +3V, −3V) from the battery, the main substrate of the electronic apparatus, or the like. The power supply IC 200 has a function of the booster circuit 70 explained in the first embodiment, and boosts the power supply voltage V2 to generate a power supply voltage Vcc (e.g., about 3V to 5V) or Vdd (e.g., about 5V to 10V) and supplies the generated voltage to the COG 19.

The power supply IC 200 is disposed outside the module; however, it may be disposed inside the module. For example, the power supply IC 200 may be mounted on the flexible printed wiring board T.

Figure 58:
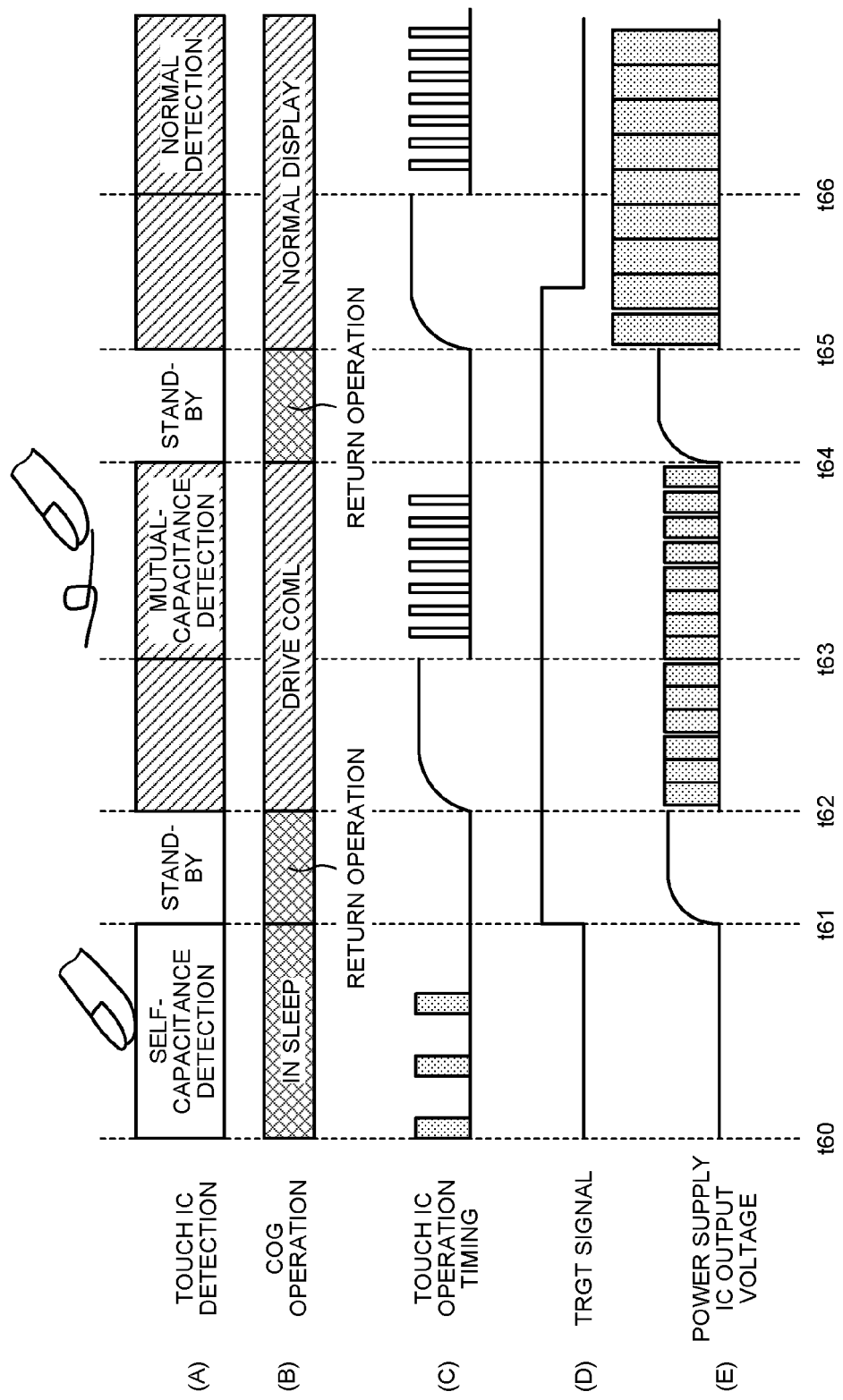
FIG. 58 is a timing chart of operation of the display device with a touch detection function according to the sixth embodiment.

FIG. 58 is a timing chart of operation of the display device with a touch detection function according to the sixth embodiment, where (A) represents a touch detection process of the touch IC, (B) represents operation of the COG, (C) represents operation timing of the touch IC, (D) represents a TRGT signal as a control signal output from the touch IC to the COG, and (E) represents an output voltage of the power supply IC.

At an initial timing t60, the touch IC 110 detects a touch using the self-capacitance method of the touch detection electrode TDL ((A) in FIG. 58). The COG 19 is in sleep and is not therefore driving the display unit with a touch detection function 10, but can receive the control signal from the touch IC 110 ((B) in FIG. 58). The TRGT signal is inactive (low level) ((D) in FIG. 58). The power supply IC 200 is in sleep and does not perform boosting, and therefore an output voltage is 0V.

As illustrated in (C) of FIG. 58, the touch IC 110 detects a touch at a predetermined interval using the self-capacitance method of the touch detection electrode TDL. The predetermined interval is, for example, about 4 milliseconds (ms). When detecting a touch, the touch IC 110 makes the TRGT signal active (high level) at a timing t61. The TRGT signal is transmitted from the touch IC 110 to the COG 19 via a signal line L1 in FIG. 57.

When the TRGT signal is made active at the timing t61, the COG 19 transmits the control signal to the power supply IC 200 via a signal line L2 in FIG. 57 and returns the power supply IC 200 from the sleep. Because the image display is not performed herein, a high power supply voltage Vdd is not needed, and therefore the COG 19 causes the power supply IC 200 to output the power supply voltage Vcc.

When receiving the control signal from the COG 19 at the timing t61, the power supply IC 200 starts a return operation from the sleep at the timing t61, starts boosting, and supplies the power supply voltage Vcc to the COG 19 at a timing t62 after the elapse of a predetermined delay time. The predetermined delay time is, for example, about 8 ms to 32 ms.

At the timing t62, the COG 19 uses the power supply voltage Vcc supplied from the power supply IC 200 to start the drive of the drive electrode COML. That is, the COG 19 changes the scan signal Vscan from the low level to the high level. Before this operation, the COG 19 sets the pixel signal Vpix to a predetermined value, e.g., 0V. Thereby, the value 0V is written to the pixels Pix (sub-pixels SPix). More specifically, the pixel electrodes 22 are set to 0V. Thereafter, the COG 19 changes the scan signal Vscan from the high level to the low level. Thereby the values of the pixels Pix (sub-pixels SPix) are determined as 0V. More specifically, the potential of the pixel electrodes 22 is determined as 0V. Thereafter, the COG 19 supplies the touch drive signal VcomAC to the drive electrodes COML to start scanning of the drive electrodes COML.

At a timing t63 after the elapse of a predetermined time from the timing t62, the touch IC 110 detects a gesture at a predetermined interval using the mutual capacitance method between the touch detection electrode TDL and the drive electrode COML. The predetermined time is, for example, about 32 ms to 64 ms.

When detecting a predetermined gesture, the touch IC 110 transmits a command to the application processor at a timing t64. The application processor having received the command transmits a sleep release command to the COG 19.

At the timing t64, the COG 19 having received the sleep release command outputs the control signal for causing the power supply IC 200 to output the power supply voltage Vdd to the power supply IC 200. Herein, the high power supply voltage Vdd is needed in order to perform image display at a high speed, and therefore the COG 19 outputs the control signal for causing the power supply IC 200 to output the power supply voltage Vdd to the power supply IC 200.

The power supply IC 200 starts, at the timing t64, a return operation from the sleep and starts boosting, and supplies the power supply voltage Vdd at a timing t65 after the elapse of a predetermined delay time to the COG 19. The predetermined delay time is, for example, about 100 ms. At this time, the COG 19 starts operation of the backlight. This enables the display device with a touch detection function 1 to perform image display.

At the timing t65, the COG 19 uses the power supply voltage Vdd supplied from the power supply IC 200 to start the drive of the display unit with a touch detection function 10, i.e., the drive of the drive electrode COML in order to display of an image and detect a touch. At a timing t66 after the elapse of a predetermined time from the timing t65, the touch IC 110 detects a gesture at a predetermined interval using the mutual capacitance method between the touch detection electrode TDL and the drive electrode COML. The predetermined time is, for example, about 32 ms to 64 ms.

As explained above, the display device with a touch detection function 1 returns from the sleep mode to the normal operation mode. If there is no touch input for a predetermined time in the normal operation mode, the application processor transmits a sleep command to the COG 19. When receiving the sleep command from the application processor, the COG 19 stops the drive of the display unit with a touch detection function 10 and terminates the image display and the drive of the drive electrode COML, and then causes the power supply IC 200 to sleep (stop boosting).

Effects

According to the present embodiment, the display device with a touch detection function 1 can directly return the power supply IC 200 from the sleep state to the normal state or from the normal state to the sleep state. This enables the display device with a touch detection function 1 to appropriately control the operation of the power supply IC 200 and to adequately reduce the power consumption.

Some embodiments and modifications have been explained so far; however, the present disclosure is not limited thereto, and therefore various modifications are possible.

Figure 59:
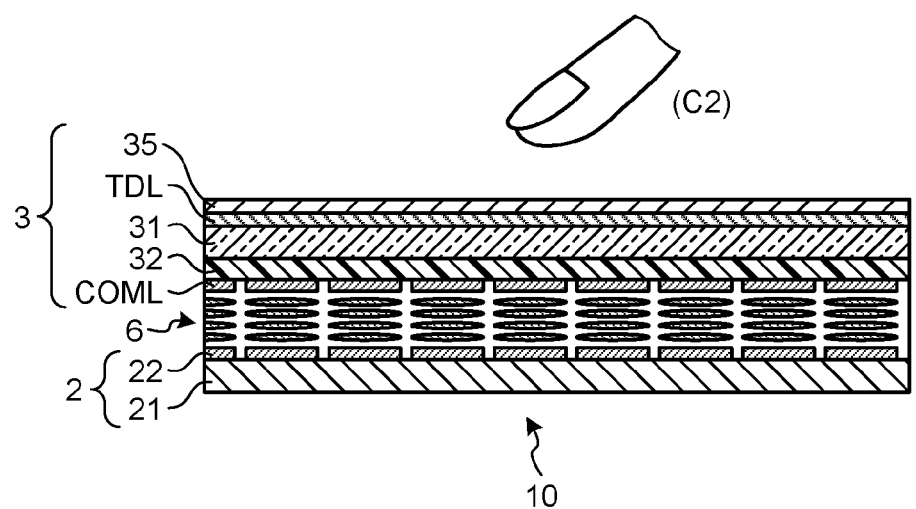
FIG. 59 is a cross-sectional view of a schematic cross-sectional structure of a display unit with a touch detection function according to a modification.

The display device with a touch detection function 1 according to the embodiments and modifications can integrate the liquid crystal display unit 20 using liquid crystal in various modes such as FFS and IPS with the touch detecting unit 30 to form the display unit with a touch detection function 10. FIG. 59 is a cross-sectional view of a schematic cross-sectional structure of a display unit with a touch detection function according to a modification. Instead of this, the display unit with a touch detection function 10 according to the modification illustrated in FIG. 59 may integrate liquid crystal in various modes such as twisted nematic (TN), vertical alignment (VA), and electrically controlled birefringence (ECB) with the touch detecting unit.

As illustrate in FIG. 59, when the drive electrodes COML are provided in the counter substrate 3, the touch wiring LAC and the display wiring LDC may be provided on the counter substrate 3. With this structure, the distance between the drive electrodes COML and the touch wiring LAC (display wiring LDC) is reduced. The scan line GCL provided on the TFT substrate 21 three-dimensionally intersects the touch wiring LAC and the display wiring LDC similarly to the first to the fifth embodiments. As a result, the touch wiring LAC is disposed in the frame area Gd located outside the display area Ad in the direction perpendicular to the TFT substrate 21.

In the embodiments, the so-called in-cell type device, in which the liquid crystal display unit 20 is integrated with the capacitive type touch detecting unit 30, is provided; however, the embodiments are not limited thereto. Instead of this type, for example, the on-cell type device on which the liquid crystal display unit 20 and the capacitive type touch detecting unit 30 are mounted may be provided. In the case of the on-cell type, the drive electrodes COML of the pixel substrate 2 illustrated in FIG. 13 are first drive electrodes COML, and, in addition to this, second drive electrodes COML are provided on the surface of the glass substrate 31 in the counter substrate 3, and the first drive electrodes COML and the second drive electrodes COML are electrically coupled to each other. In this case, also, the configuration as explained above is formed, so that touch detection can be performed while suppressing the influence of the external noise and the noise (which corresponds to the internal noise in the embodiments) transmitted from the liquid crystal display unit.

2. Application Examples

Application examples of the display device with a touch detection function 1 as explained in the embodiments and their modifications will be explained below with reference to FIG. 60 to FIG. 72. FIG. 60 to FIG. 72 are diagrams of examples of an electronic apparatus to which the display device with a touch detection function according to one of the embodiments and modifications thereof is applied. The display device with a touch detection function 1 according to the first to the fifth embodiments and the modifications can be applied to electronic apparatuses in all areas such as television devices, digital cameras, notebook personal computers, portable electronic apparatuses such as mobile telephones, or video cameras. In other words, the display device with a touch detection function 1 according to the first to the fifth embodiments and the modifications can be applied to electronic apparatuses in all areas that display an externally input video signal or an internally generated video signal as an image or a video.

Application Example 1

Figure 60:
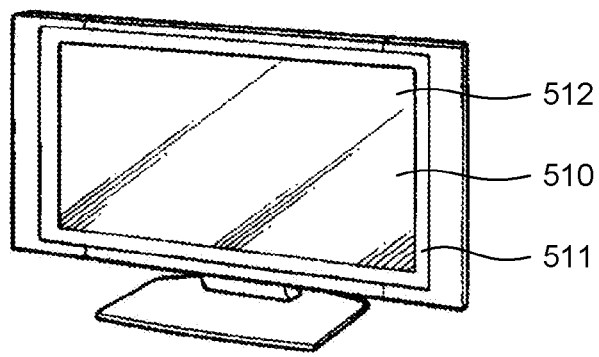
FIG. 60 is a diagram of an example of an electronic apparatus to which the display device with a touch detection function according to one of the embodiments and modifications thereof is applied.

The electronic apparatus illustrated in FIG. 60 is a television device to which the display device with a touch detection function 1 according to the first to the fifth embodiments and the modifications is applied. Examples of the television device include, but are not limited to, a video display screen unit 510 including a front panel 511 and a filter glass 512. The video display screen unit 510 is the display device with a touch detection function according to the first to the fifth embodiments and the modifications.

Application Example 2

Figure 61:
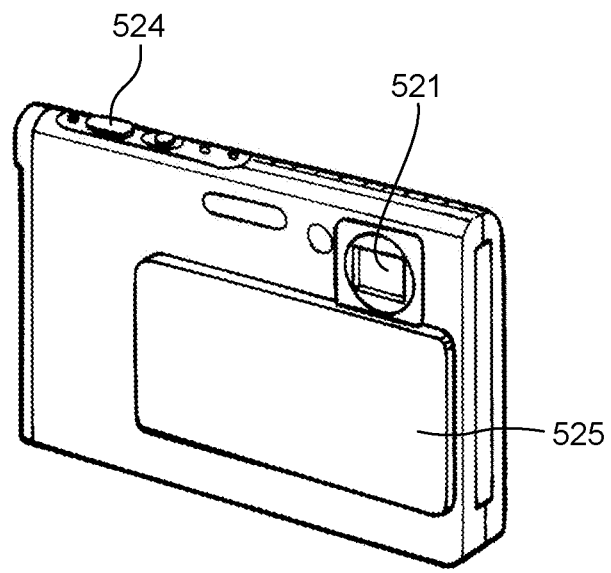
FIG. 61 is a diagram of an example of an electronic apparatus to which the display device with a touch detection function according to one of the embodiments and modifications thereof is applied.
Figure 62:
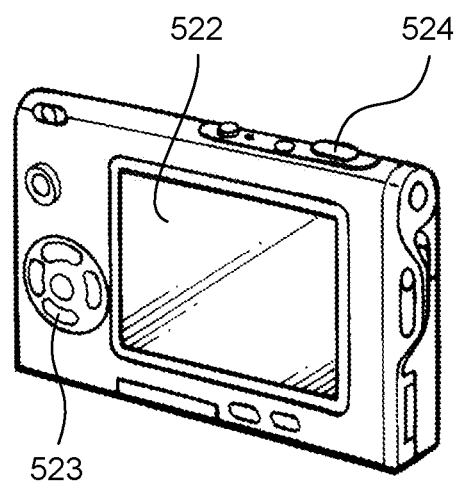
FIG. 62 is a diagram of an example of the electronic apparatus to which the display device with a touch detection function according to one of the embodiments and modifications thereof is applied.

The electronic apparatus illustrated in FIG. 61 and FIG. 62 is a digital camera to which the display device with a touch detection function 1 according to the first to the fifth embodiments and the modifications is applied. Examples of the digital camera include, but are not limited to, a light emitting unit 521 for a flash, a display unit 522, a menu switch 523, and a shutter button 524. The display unit 522 is the display device with a touch detection function according to the first to the fifth embodiments and the modifications. As illustrated in FIG. 61, the digital camera has a lens cover 525, and by sliding the lens cover 525, a photographing lens comes out. The digital camera is capable of taking digital photos by capturing light incident through the photographing lens.

Application Example 3

Figure 63:
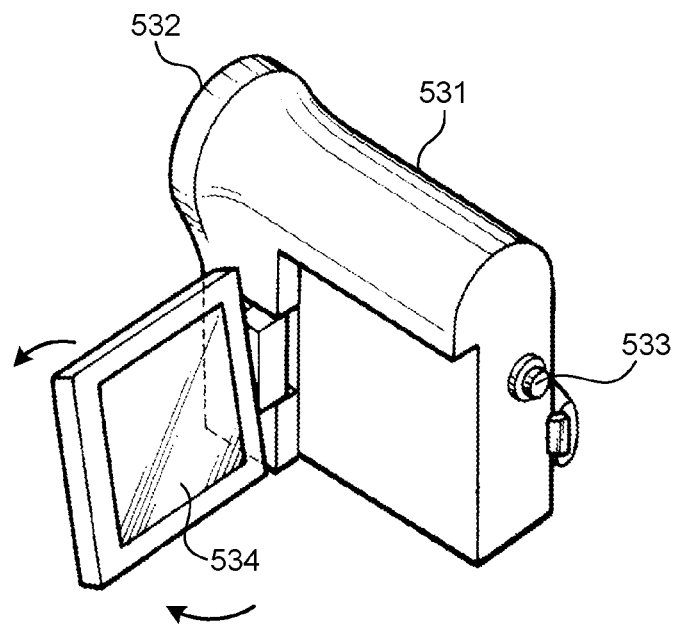
FIG. 63 is a diagram of an example of an electronic apparatus to which the display device with a touch detection function according to one of the embodiments and modifications thereof is applied.

The electronic apparatus illustrated in FIG. 63 represents an appearance of a video camera to which the display device with a touch detection function 1 according to the first to the fifth embodiments and the modifications is applied. Examples of the video camera include, but are not limited to, a main body 531, a lens 532 for photographing a subject provided on the front side face of the main body 531, a start/stop switch 533 in photographing, and a display unit 534. The display unit 534 is the display device with a touch detection function according to the first to the fifth embodiments and the modifications.

Application Example 4

Figure 64:
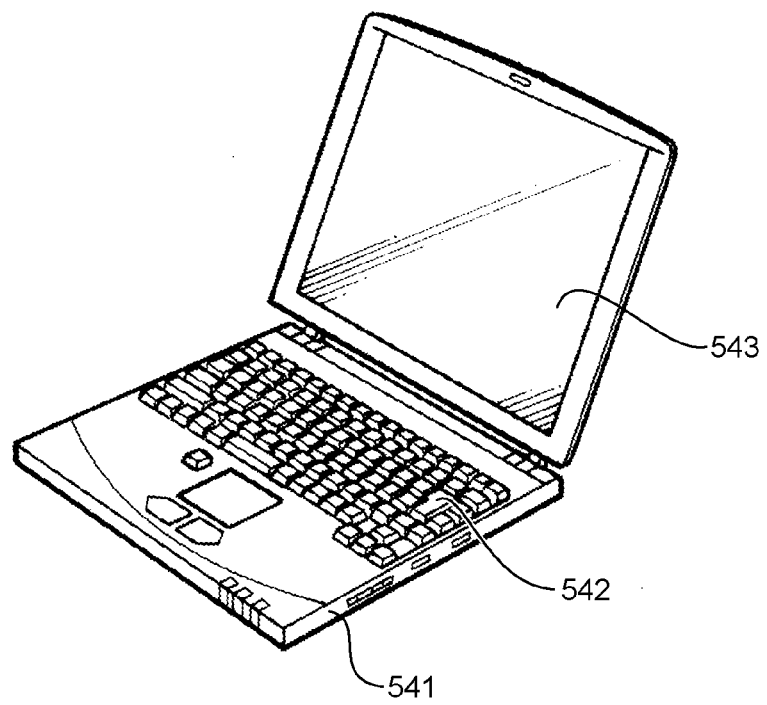
FIG. 64 is a diagram of an example of an electronic apparatus to which the display device with a touch detection function according to one of the embodiments and modifications thereof is applied.
Figure 65:
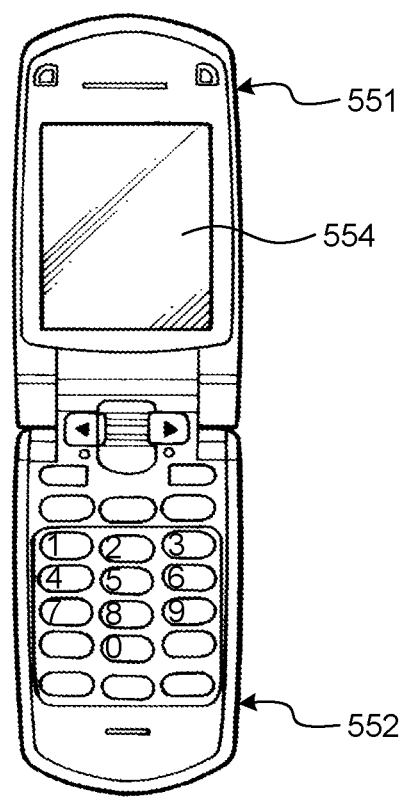
FIG. 65 is a diagram of an example of an electronic apparatus to which the display device with a touch detection function according to one of the embodiments and modifications thereof is applied.
Figure 66:
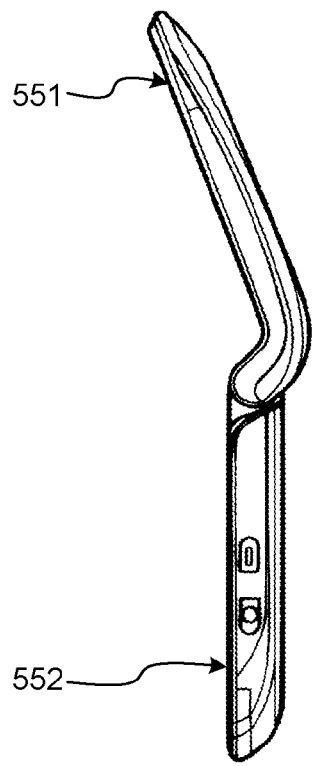
FIG. 66 is a diagram of an example of the electronic apparatus to which the display device with a touch detection function according to one of the embodiments and modifications thereof is applied.
Figure 67:
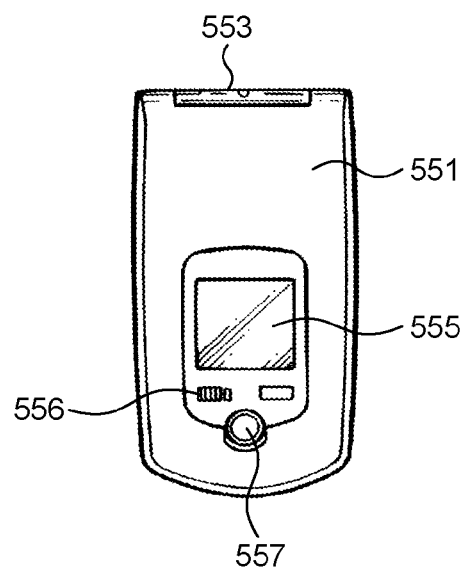
FIG. 67 is a diagram of an example of the electronic apparatus to which the display device with a touch detection function according to one of the embodiments and modifications thereof is applied.
Figure 68:
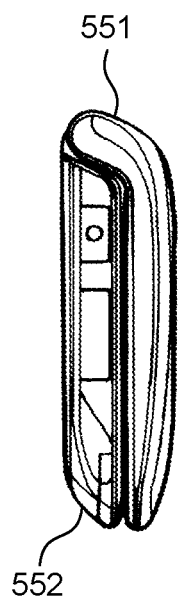
FIG. 68 is a diagram of an example of the electronic apparatus to which the display device with a touch detection function according to one of the embodiments and modifications thereof is applied.
Figure 69:
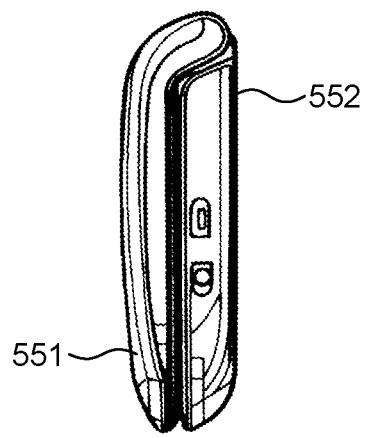
FIG. 69 is a diagram of an example of the electronic apparatus to which the display device with a touch detection function according to one of the embodiments and modifications thereof is applied.
Figure 70:
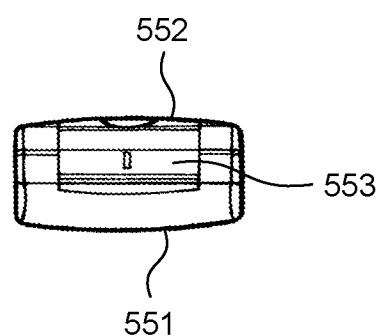
FIG. 70 is a diagram of an example of the electronic apparatus to which the display device with a touch detection function according to one of the embodiments and modifications thereof is applied.
Figure 71:
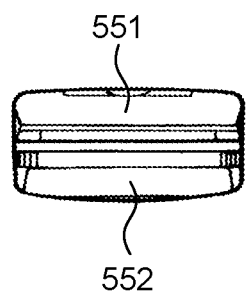
FIG. 71 is a diagram of an example of the electronic apparatus to which the display device with a touch detection function according to one of the embodiments and modifications thereof is applied.

The electronic apparatus illustrated in FIG. 64 is a notebook personal computer to which the display device with a touch detection function 1 according to the first to the fifth embodiments and the modifications is applied. Examples of the notebook personal computer include, but are not limited to, a main body 541, a keyboard 542 for performing an input operation of text and the like, and a display unit 543 that displays an image. The display unit 543 is the display device with a touch detection function according to the first to the fifth embodiments and the modifications.

Application Example 5

The electronic apparatus illustrated in FIG. 65 to FIG. 71 is a mobile phone to which the display device with a touch detection function 1 according to the first to the fifth embodiments and the modifications is applied. The mobile phone is the one that has, for example, an upper housing 551 and a lower housing 552 coupled to each other with a connecting portion (hinge portion) 553, and that includes a display 554, a sub-display 555, a picture light 556, and a camera 557. The display 554 or the sub-display 555 is the display device with a touch detection function according to the first to the fifth embodiments and the modifications.

Application Example 6

Figure 72:
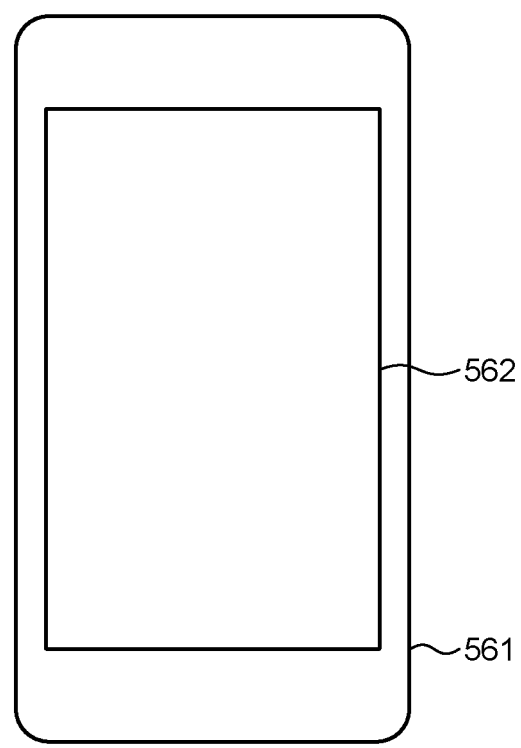
FIG. 72 is a diagram of an example of an electronic apparatus to which the display device with a touch detection function according to one of the embodiments and modifications thereof is applied.

The electronic apparatus illustrated in FIG. 72 is a portable information terminal that operates as a portable computer, a multifunctional mobile phone, a portable computer capable of performing voice communication, or as a portable computer capable of performing communication, and that is sometimes referred to as so-called a smartphone or a tablet terminal. The portable information terminal has a display unit 562 on the surface of, for example, a housing 561. The display unit 562 is the display device with a touch detection function 1 according to the first to the fifth embodiments and the modifications.

3. Configuration of Present Disclosure

The present disclosure can also be configured as follows.
(1) A display device with a touch detection function that has a normal operation mode for performing image display and touch detection and a sleep mode for performing touch detection without performing the image display, comprising:
a display area in which a plurality of pixel electrodes are arranged in a matrix on a substrate;
a drive electrode that is arranged opposite to the pixel electrodes and is divided into a plurality of portions;
a touch detection electrode that is arranged opposite to the drive electrode and forms a capacitance with the drive electrode;
a display function layer that has an image display function for displaying an image in the display area;
a control device that performs image display control, in the normal operation mode, so as to apply a display drive voltage between the pixel electrode and the drive electrode based on an image signal to exhibit the image display function of the display function layer, and performs touch detection control so as to supply a touch drive signal to the drive electrode;
a touch detecting unit that detects, in the normal operation mode, a position of an object in proximity to or in contact with the touch detection electrode based on a detection signal transmitted from the touch detection electrode; and
a touch-detection controller that detects, in the sleep mode, the proximity of the object to or the contact thereof with the touch detection electrode, wherein,
when the touch-detection controller detects the proximity of the object to or the contact thereof with the touch detection electrode in the sleep mode, the control device controls the pixel electrode to a predetermined potential, and thereafter supplies the touch drive signal to the drive electrode.
(2) The display device with a touch detection function according to (1), further comprising:
a booster circuit that boosts a first power supply voltage constantly supplied from an external device in the normal operation mode to generate a second power supply voltage, and that suspends the operation in the sleep mode, wherein
the control device uses the second power supply voltage in the normal operation mode to apply the display drive voltage between the pixel electrode and the drive electrode, and uses the first power supply voltage in the sleep mode to set the pixel electrode to the predetermined potential.
(3) The display device with a touch detection function according to (2), further comprising:
a plurality of scan lines that are provided in the display area so as to be extended in a first direction and are supplied with a scan signal;
a plurality of pixel signal lines that are provided in the display area so as to be extended in a second direction intersecting the first direction and are supplied with a pixel signal; and
a plurality of transistors that are provided at respective intersections between the scan lines and the pixel signal lines, each one of sources or of drains of the transistors being coupled to the pixel signal line, each gate thereof being coupled to the scan line, the other one of the sources or of the drains being coupled to the pixel electrode, wherein the control device supplies, in the sleep mode, the predetermined potential to the pixel signal line and uses the first power supply voltage to supply the scan signal to the scan line, and supplies, in the normal operation mode, the pixel signal to the pixel signal line and uses the second power supply voltage to supply the scan signal to the scan line.

(4) The display device with a touch detection function according to (3), wherein the control device includes:

a first gate driver that uses the second power supply voltage to supply the scan signal to the scan line in the normal operation mode, and a second gate driver that uses the first power supply voltage to supply the scan signal to the scan line in the sleep mode.

(5) The display device with a touch detection function according to (3), wherein the control device includes:

a gate driver that uses the second power supply voltage to supply the scan signal to the scan line in the normal operation mode, and uses the first power supply voltage to supply the scan signal to the scan line in the sleep mode.

(6) The display device with a touch detection function according to (1), wherein, when the touch-detection controller detects the proximity of the object to or the contact thereof with the touch detection electrode in the sleep mode, the control device controls a power supply circuit so as to boost a first power supply voltage constantly supplied from an external device and start generation of a second power supply voltage, and controls the pixel electrode to a predetermined potential using the second power supply voltage and thereafter supplies the touch drive signal to the drive electrode.

(7) The display device with a touch detection function according to (6), wherein in the normal operation mode, the control device controls the power supply circuit so as to boost the first power supply voltage to generate a third power supply voltage that is a higher voltage than the second power supply voltage, and uses the third power supply voltage to apply the display drive voltage between the pixel electrode and the drive electrode.

(8) The display device with a touch detection function according to (1), wherein in the sleep mode, the touch-detection controller detects the proximity of the object to or the contact thereof with the touch detection electrode using self-capacitance of the touch detection electrode.

(9) The display device with a touch detection function according to (1), wherein the touch detection electrode is set as a plurality of pairs, and the touch-detection controller detects, in the sleep mode, the proximity of the object to or the contact thereof with the touch detection electrode using mutual capacitance between a pair of the touch detection electrodes.

(10) The display device with a touch detection function according to (1), wherein, when a predetermined gesture performed by the object is detected in the sleep mode, the sleep mode is shifted to the normal operation mode.

(11) An electronic apparatus including a display device with a touch detection function that has a normal operation mode for performing image display and touch detection and a sleep mode for performing touch detection without performing the image display, wherein the display device with a touch detection function is the display device with a touch detection function according to any one of (1) to (10).

According to the display device with a touch detection function and the electronic apparatus of the present disclosure, it is possible to prevent the burn-in occurring on the display screen.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function that has a normal operation mode for performing image display and touch detection and a sleep mode for performing touch detection without performing the image display, comprising:

a display area in which a plurality of pixel electrodes are arranged in a matrix on a substrate;

a drive electrode that is arranged opposite to the pixel electrodes and is divided into a plurality of portions;

a touch detection electrode that is arranged opposite to the drive electrode and forms a capacitance;

a display function layer that has an image display function for displaying an image in the display area;

a control device that performs image display control, in the normal operation mode, so as to apply a display drive voltage between the pixel electrodes and the drive electrode based on an image signal to exhibit the image display function of the display function layer, and performs touch detection control so as to supply a touch drive signal to the drive electrode;

a touch detecting unit that detects, in the normal operation mode, a position of an object in proximity to or in contact with the touch detection electrode based on a detection signal transmitted from the touch detection electrode; and a touch-detection controller that detects, in the sleep mode, the proximity of the object to or the contact thereof with the touch detection electrode that is applied with a drive signal, using self-capacitance of the touch detection electrode, wherein, when the touch-detection controller detects the proximity of the object to or the contact thereof with the touch detection electrode in the sleep mode, the control device controls the pixel electrodes to a predetermined constant potential, and thereafter supplies the touch drive signal to the drive electrode.

2. The display device with a touch detection function according to claim 1, further comprising:

a booster circuit that increases a first power supply voltage constantly supplied from an external device in the normal operation mode to generate a second power supply voltage, and that stops switching operation of the booster circuit and outputs a reference voltage lower than the first voltage in the sleep mode, wherein the control device uses the second power supply voltage in the normal operation mode to apply the display drive voltage between the pixel electrodes and the drive electrode, and uses the first power supply voltage in the sleep mode to set the pixel electrodes to a predetermined constant potential.

3. The display device with a touch detection function according to claim 2, further comprising:
- a plurality of scan lines that are provided in the display area so as to be extended in a first direction and are supplied with a scan signal;
- a plurality of pixel signal lines that are provided in the display area so as to be extended in a second direction intersecting the first direction and are supplied with a pixel signal; and
- a plurality of transistors that are provided at respective intersections between the scan lines and the pixel signal lines, each one of sources or of drains of the transistors being coupled to the pixel signal line, each gate thereof being coupled to the scan line, the other one of the sources or of the drains being coupled to the pixel electrodes, wherein
- the control device supplies, in the sleep mode, the predetermined constant potential to the pixel signal line and uses the first power supply voltage to supply the scan signal to the scan line, and supplies, in the normal operation mode, the pixel signal to the pixel signal line and uses the second power supply voltage to supply the scan signal to the scan line.

4. The display device with a touch detection function according to claim 3, wherein
the control device includes:
- a first gate driver that uses the second power supply voltage to supply the scan signal to the scan line in the normal operation mode, and
- a second gate driver that uses the first power supply voltage to supply the scan signal to the scan line in the sleep mode.

5. The display device with a touch detection function according to claim 3, wherein
the control device includes:
- a gate driver that uses the second power supply voltage to supply the scan signal to the scan line in the normal operation mode, and uses the first power supply voltage to supply the scan signal to the scan line in the sleep mode.

6. The display device with a touch detection function according to claim 1, wherein, when the touch-detection controller detects the proximity of the object to or the contact thereof with the touch detection electrode in the sleep mode,
the control device controls a power supply circuit so as to increase a first power supply voltage constantly supplied from an external device and start generation of a second power supply voltage, and controls the pixel electrodes to a predetermined constant potential using the second power supply voltage and thereafter supplies the touch drive signal to the drive electrode.

7. The display device with a touch detection function according to claim 6 wherein
in the normal operation mode, the control device controls the power supply circuit so as to boost the first power supply voltage to generate a third power supply voltage that is a higher voltage than the second power supply voltage, and uses the third power supply voltage to apply the display drive voltage between the pixel electrodes and the drive electrode.

8. The display device with a touch detection function according to claim 1, wherein
the touch detection electrode is set as a plurality of pairs, and
the touch-detection controller detects, in the sleep mode, the proximity of the object to or the contact thereof with the touch detection electrode using mutual capacitance between a pair of the touch detection electrodes.

9. The display device with a touch detection function according to claim 1, wherein, when a swipe with a predetermined length in a predetermined direction performed by the object is detected in the sleep mode, the sleep mode is shifted to the normal operation mode.

10. An electronic apparatus including a display device with a touch detection function that has a normal operation mode for performing image display and touch detection and a sleep mode for performing touch detection without performing the image display, the display device with a touch detection function comprising:
- a display area in which a plurality of pixel electrodes are arranged in a matrix on a substrate;
- a drive electrode that is arranged opposite to the pixel electrodes and is divided into a plurality of portions;
- a touch detection electrode that is arranged opposite to the drive electrode and forms a capacitance with the drive electrode;
- a display function layer that has an image display function for displaying an image in the display area;
- a control device that performs image display control, in the normal operation mode, so as to apply a display drive voltage between the pixel electrodes and the drive electrode based on an image signal to exhibit the image display function of the display function layer, and performs touch detection control so as to supply a touch drive signal to the drive electrode;
- a touch detecting unit that detects a position of an object in proximity to or in contact with the touch detection electrode based on a detection signal transmitted from the touch detection electrode; and
- a touch-detection controller that detects, in the sleep mode, the proximity of the object to or the contact thereof with the touch detection electrode that is applied with a drive signal, using self-capacitance of the touch detection electrode, wherein,
when the touch-detection controller detects the proximity of the object to or the contact thereof with the touch detection electrode in the sleep mode, the control device controls the pixel electrodes to a predetermined constant potential, and thereafter supplies the touch drive signal to the drive electrode.

* * * * *